(12) United States Patent
Hosseini et al.

(10) Patent No.: US 11,910,429 B2
(45) Date of Patent: Feb. 20, 2024

(54) FEEDBACK REPORTING FOR SIDELINK

(71) Applicant: QUALCOMM Incorporated, San Diego, CA (US)

(72) Inventors: Seyedkianoush Hosseini, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 17/082,852

(22) Filed: Oct. 28, 2020

(65) Prior Publication Data

US 2021/0136781 A1    May 6, 2021

Related U.S. Application Data

(60) Provisional application No. 62/928,142, filed on Oct. 30, 2019.

(51) Int. Cl.
*H04W 72/56* (2023.01)
*H04W 72/21* (2023.01)
*H04W 72/23* (2023.01)

(52) U.S. Cl.
CPC .......... *H04W 72/56* (2023.01); *H04W 72/21* (2023.01); *H04W 72/23* (2023.01)

(58) Field of Classification Search
CPC .......... H04W 72/0413; H04W 72/042; H04W 72/10; H04W 72/1242; H04L 1/1854; H04L 1/1861
See application file for complete search history.

(56) References Cited

U.S. PATENT DOCUMENTS

| | | | | |
|---|---|---|---|---|
| 2020/0008183 | A1* | 1/2020 | Chen | H04W 76/34 |
| 2020/0404684 | A1* | 12/2020 | Lee | H04L 1/1854 |

(Continued)

OTHER PUBLICATIONS

Asia Pacific Telecom: "Discussion on SL Mode-1 Resource Allocation", 3GPP Draft, 3GPP TSG-RAN WG1 Meeting #98bis, R1-1910848 Mode-1_SL_V01, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019 Oct. 8, 2019 (Oct. 8, 2019), XP051809222, 4 Pages, Retrieved from the Internet: URL:https://ftp.3gpp.org/tsg_ran/WG1_RL1/TSGR1_98b/Docs/R1-1910848.zip R1-1910848 Mode-1_SL_v01.docx [retrieved on Oct. 8, 2019] paragraph [0003].

(Continued)

*Primary Examiner* — Bo Hui A Zhu
(74) *Attorney, Agent, or Firm* — Holland & Hart LLP

(57) ABSTRACT

Methods, systems, and devices for wireless communications are described. A user equipment (UE) may determine that it has first feedback data for downlink communications and second feedback data for sidelink communications. The UE may receive from a base station an indication of resources for the feedback and transmit the first feedback data, the second feedback data, or both, in the resources. In some examples, the UE may transmit the first feedback data in a first set of the resources and transmit the second feedback data in a second set of the resources. In some examples, the UE may drop one of the first or second feedback data based on priorities associated with the feedback data. In some examples, the UE may multiplex the first and second feedback data for transmission in the resources.

30 Claims, 24 Drawing Sheets

(56) References Cited

U.S. PATENT DOCUMENTS

| | | | |
|---|---|---|---|
| 2020/0413425 A1* | 12/2020 | Lin | H04L 5/0055 |
| 2021/0105126 A1* | 4/2021 | Yi | H04L 1/1854 |
| 2021/0112544 A1* | 4/2021 | Chen | H04W 52/242 |
| 2021/0127402 A1* | 4/2021 | Lee | H04W 72/10 |
| 2021/0345384 A1 | 11/2021 | Zhang et al. | |
| 2021/0385845 A1* | 12/2021 | Zhao | H04W 72/1278 |
| 2022/0053537 A1 | 2/2022 | Lei et al. | |
| 2022/0053551 A1* | 2/2022 | Ko | H04L 5/00 |
| 2022/0224452 A1* | 7/2022 | Huang | H04L 1/1812 |
| 2022/0264590 A1 | 8/2022 | Han et al. | |

OTHER PUBLICATIONS

Huawei et al., "Sidelink Resource Allocation Mode 1", 3GPP Draft, 3GPP TSG RAN WG1 Meeting #98bis, R1-1910055, 3rd Generation Partnership Project (3GPP), Mobile Competence Centre, 650, Route Des Lucioles, F-06921 Sophia-Anti Polis Cedex, France, vol. RAN WG1, No. Chongqing, China, Oct. 14, 2019-Oct. 20, 2019 Oct. 8, 2019 (Oct. 8, 2019), XP051809065, 19 Pages, Retrieved from the Internet: URL:https://ftp.3gpp.org/tsg_ran/WG1_RL1/TSGR1_98b/Docs/R1-1910055.zip R1-1910055.docx [retrieved on Oct. 8, 2019] paragraph [0003].
International Search Report and Written Opinion—PCT/US2020/057993—ISA/EPO—dated Feb. 8, 2021.

\* cited by examiner

Dropping solution

FEEDBACK REPORTING FOR SIDELINK

CROSS REFERENCE

The present application for patent claims the benefit of U.S. Provisional Patent Application No. 62/928,142 by HOSSEINI et al., entitled "FEEDBACK REPORTING FOR SIDELINK," filed Oct. 30, 2019, assigned to the assignee hereof, and expressly incorporated by reference herein.

FIELD OF TECHNOLOGY

The following relates generally to wireless communications and more specifically to feedback reporting for sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Communications from a base station to a UE may be referred to as downlink communications and communications from a UE to a base station may be referred to as uplink communications. In addition to communicating with a base station, a UE may communicate other UEs using sidelink techniques.

In some cases, a UE may implement a feedback process to increase the reliability of its communications with another device. Complications may arise when a UE has pending feedback for downlink communications from a base station and feedback for sidelink communications from another UE.

SUMMARY

The described techniques relate to improved methods, systems, devices, and apparatuses that support feedback reporting for sidelink. A user equipment (UE) may determine that it has first feedback data for downlink communications and second feedback data for sidelink communications. The UE may receive from a base station an indication of resources for the feedback and transmit the first feedback data, the second feedback data, or both, in the resources. In some examples, the UE may transmit the first feedback data in a first set of the resources and transmit the second feedback data in a second set of the resources. In some examples, the UE may drop one of the first or second feedback data based on priorities associated with the feedback data. In some examples, the UE may multiplex the first and second feedback data for transmission in the resources.

A method of wireless communication at a UE is described. The method may include receiving, from a base station, an indication of a first set of resources within an uplink control channel that are reserved for providing feedback for downlink communications to the UE, receiving, from the base station, an indication of a second set of resources within the uplink control channel that are reserved for providing feedback for sidelink communications between the UE and a second UE, and transmitting, to the base station, at least one of feedback for downlink communications in the first set of resources of the uplink control channel or feedback for sidelink communications in the second set of resources of the uplink control channel.

An apparatus for wireless communication at a UE is described. The apparatus may include a processor, memory coupled with the processor, and instructions stored in the memory. The instructions may be executable by the processor to cause the apparatus to receive, from a base station, an indication of a first set of resources within an uplink control channel that are reserved for providing feedback for downlink communications to the UE, receive, from the base station, an indication of a second set of resources within the uplink control channel that are reserved for providing feedback for sidelink communications between the UE and a second UE, and transmit, to the base station, at least one of feedback for downlink communications in the first set of resources of the uplink control channel or feedback for sidelink communications in the second set of resources of the uplink control channel.

Another apparatus for wireless communication at a UE is described. The apparatus may include means for receiving, from a base station, an indication of a first set of resources within an uplink control channel that are reserved for providing feedback for downlink communications to the UE, receiving, from the base station, an indication of a second set of resources within the uplink control channel that are reserved for providing feedback for sidelink communications between the UE and a second UE, and transmitting, to the base station, at least one of feedback for downlink communications in the first set of resources of the uplink control channel or feedback for sidelink communications in the second set of resources of the uplink control channel.

A non-transitory computer-readable medium storing code for wireless communication at a UE is described. The code may include instructions executable by a processor to receive, from a base station, an indication of a first set of resources within an uplink control channel that are reserved for providing feedback for downlink communications to the UE, receive, from the base station, an indication of a second set of resources within the uplink control channel that are reserved for providing feedback for sidelink communications between the UE and a second UE, and transmit, to the base station, at least one of feedback for downlink communications in the first set of resources of the uplink control channel or feedback for sidelink communications in the second set of resources of the uplink control channel.

Some examples of the method, apparatuses, and non-transitory computer-readable medium described herein may further include operations, features, means, or instructions for determining that the first and second sets of resources do not overlap in the time domain, where transmitting includes transmitting the feedback for downlink communications in the first set of resources and transmitting the feedback for sidelink communications in the second set of resources.

Some examples of the method, apparatuses, and non-transitory computer-readable medium described herein may further include operations, features, means, or instructions for determining that a periodic signal may be scheduled for transmission in the second set of resources, and refraining from transmitting the periodic signal in the second set of resources.

Some examples of the method, apparatuses, and non-transitory computer-readable medium described herein may further include operations, features, means, or instructions for determining that feedback for sidelink communications may be scheduled for transmission in the second set of resources, where refraining from transmitting the periodic signal may be based on determining that the feedback for the sidelink communications may be scheduled.

Some examples of the method, apparatuses, and non-transitory computer-readable medium described herein may further include operations, features, means, or instructions for determining that the first and second sets of resources overlap in the time domain, and refraining from transmitting feedback for downlink communications in the first set of resources or refraining from transmitting feedback for sidelink communications in the second set of resources.

Some examples of the method, apparatuses, and non-transitory computer-readable medium described herein may further include operations, features, means, or instructions for determining that feedback for downlink communications are scheduled for transmission in the first set of resources and that feedback for sidelink communications are scheduled for transmission in the second set of resources, and flagging the scheduling of the feedback for downlink communications or the scheduling of the feedback for sidelink communications as an error based on the determining that feedback for downlink communications are scheduled for transmission in the first set of resources and that feedback for sidelink communications are scheduled for transmission in the second set of resources.

Some examples of the method, apparatuses, and non-transitory computer-readable medium described herein may further include operations, features, means, or instructions for receiving an indication that the second set of resources includes a first subset of resources and a second subset of resources, determining that the first subset of resources is associated with sidelink communications between the UE and the second UE, and determining that the second subset of resources is associated with sidelink communications between the UE and a third UE.

In some examples of the method, apparatuses, and non-transitory computer-readable medium described herein, transmitting may include operations, features, means, or instructions for transmitting feedback for sidelink communications between the UE and the second UE in the first subset of resources, and transmitting feedback for sidelink communications between the UE and the third UE in the second subset of resources.

Some examples of the method, apparatuses, and non-transitory computer-readable medium described herein may further include operations, features, means, or instructions for receiving an indication that the second set of resources includes a first subset of resources and a second subset of resources, determining that the first subset of resources is associated with a first cast type, and determining that the second subset of resources is associated with a second cast type.

In some examples of the method, apparatuses, and non-transitory computer-readable medium described herein, transmitting may include operations, features, means, or instructions for transmitting feedback for sidelink communications of the first cast type in the first subset of resources, and transmitting feedback for sidelink communications of the second cast type in the second subset of resources.

A method of wireless communication at a UE is described. The method may include receiving, from a base station, an indication of a set of resources within an uplink control channel that are reserved for providing feedback for communications to the UE, determining a first priority of feedback for downlink communications and a second priority of feedback for sidelink communications, and transmitting, to the base station, feedback for a downlink communication in the set of resources or feedback for a sidelink communication in the set of resources based on the first and second priorities.

An apparatus for wireless communication at a UE is described. The apparatus may include a processor, memory coupled with the processor, and instructions stored in the memory. The instructions may be executable by the processor to cause the apparatus to receive, from a base station, an indication of a set of resources within an uplink control channel that are reserved for providing feedback for communications to the UE, determine a first priority of feedback for downlink communications and a second priority of feedback for sidelink communications, and transmit, to the base station, feedback for a downlink communication in the set of resources or feedback for a sidelink communication in the set of resources based on the first and second priorities.

Another apparatus for wireless communication at a UE is described. The apparatus may include means for receiving, from a base station, an indication of a set of resources within an uplink control channel that are reserved for providing feedback for communications to the UE, determining a first priority of feedback for downlink communications and a second priority of feedback for sidelink communications, and transmitting, to the base station, feedback for a downlink communication in the set of resources or feedback for a sidelink communication in the set of resources based on the first and second priorities.

A non-transitory computer-readable medium storing code for wireless communication at a UE is described. The code may include instructions executable by a processor to receive, from a base station, an indication of a set of resources within an uplink control channel that are reserved for providing feedback for communications to the UE, determine a first priority of feedback for downlink communications and a second priority of feedback for sidelink communications, and transmit, to the base station, feedback for a downlink communication in the set of resources or feedback for a sidelink communication in the set of resources based on the first and second priorities.

Some examples of the method, apparatuses, and non-transitory computer-readable medium described herein may further include operations, features, means, or instructions for determining that the first priority is a higher priority or a lower priority relative to the second priority, and transmitting the feedback for the downlink communication when the first priority is a higher priority than the second priority and transmitting the feedback for the sidelink communication when the first priority is a lower priority than the second priority.

Some examples of the method, apparatuses, and non-transitory computer-readable medium described herein may further include operations, features, means, or instructions for refraining from transmitting the feedback for the sidelink communication when the first priority is a higher priority than the second priority and refraining from transmitting the feedback for the downlink communication when the first priority is a lower priority than the second priority.

Some examples of the method, apparatuses, and non-transitory computer-readable medium described herein may further include operations, features, means, or instructions for determining that the first priority and the second priority are the same, and refraining from transmitting feedback for the downlink communication or feedback for the sidelink communication based on a configuration of the UE.

Some examples of the method, apparatuses, and non-transitory computer-readable medium described herein may further include operations, features, means, or instructions for receiving a DCI message from the base station that schedules the downlink communication or sidelink communication, and determining the first priority or the second priority based on a bit included in the DCI message, a size of the DCI message, or a format of the DCI message.

Some examples of the method, apparatuses, and non-transitory computer-readable medium described herein may further include operations, features, means, or instructions for determining a first cast type for the downlink communication and a second cast type for the sidelink communication, and determining the first priority or the second priority based on the first cast type or second cast type.

Some examples of the method, apparatuses, and non-transitory computer-readable medium described herein may further include operations, features, means, or instructions for determining a priority of a logical channel associated with the sidelink communication, and determining the second priority based on the priority of the logical channel.

Some examples of the method, apparatuses, and non-transitory computer-readable medium described herein may further include operations, features, means, or instructions for determining a configuration of a set of sidelink resources used to convey the sidelink communication, and determining the second priority based on the configuration of the set of sidelink resources.

Some examples of the method, apparatuses, and non-transitory computer-readable medium described herein may further include operations, features, means, or instructions for identifying a control region of the uplink control channel, a downlink control channel, or a sidelink control channel, and determining the first priority or the second priority based on the control region.

Some examples of the method, apparatuses, and non-transitory computer-readable medium described herein may further include operations, features, means, or instructions for identifying a search space within a downlink control channel or sidelink control channel, and determining the first priority or the second priority based on the search space.

Some examples of the method, apparatuses, and non-transitory computer-readable medium described herein may further include operations, features, means, or instructions for identifying a first codebook used for feedback for downlink communications and a second codebook used for feedback for sidelink communications, and determining the first priority or the second priority based on the first and second codebooks.

A method of wireless communication at a UE is described. The method may include receiving, from a base station, an indication of a set of resources that are reserved for an uplink transmission from the UE, determining a first priority of information related to downlink communications and a second priority of information related to sidelink communications, and transmitting, to the base station in the set of resources based at least in part on the first and second priorities, information related to a downlink communication in the set of resources or information related to a sidelink communication.

An apparatus for wireless communication at a UE is described. The apparatus may include a processor, memory coupled with the processor, and instructions stored in the memory. The instructions may be executable by the processor to cause the apparatus to receive, from a base station, an indication of a set of resources that are reserved for an uplink transmission from the UE, determine a first priority of information related to downlink communications and a second priority of information related to sidelink communications, and transmit, to the base station in the set of resources based at least in part on the first and second priorities, information related to a downlink communication in the set of resources or information related to a sidelink communication.

Another apparatus for wireless communication at a UE is described. The apparatus may include means for receiving, from a base station, an indication of a set of resources that are reserved for an uplink transmission from the UE, determining a first priority of information related to downlink communications and a second priority of information related to sidelink communications, and transmitting, to the base station in the set of resources based at least in part on the first and second priorities, information related to a downlink communication in the set of resources or information related to a sidelink communication.

A non-transitory computer-readable medium storing code for wireless communication at a UE is described. The code may include instructions executable by a processor to receive, from a base station, an indication of a set of resources that are reserved for an uplink transmission from the UE, determine a first priority of information related to downlink communications and a second priority of information related to sidelink communications, and transmit, to the base station in the set of resources based at least in part on the first and second priorities, information related to a downlink communication in the set of resources or information related to a sidelink communication.

Some examples of the method, apparatuses, and non-transitory computer-readable medium described herein may further include operations, features, means, or instructions for determining that the first priority is a higher priority or a lower priority relative to the second priority, and transmitting the information related to the downlink communication when the first priority is a higher priority than the second priority and transmitting the information related to the sidelink communication when the first priority is a lower priority than the second priority.

Some examples of the method, apparatuses, and non-transitory computer-readable medium described herein may further include operations, features, means, or instructions for refraining from transmitting the information related to the sidelink communication when the first priority is a higher priority than the second priority and refraining from transmitting the information related to the downlink communication when the first priority is a lower priority than the second priority.

Some examples of the method, apparatuses, and non-transitory computer-readable medium described herein may further include operations, features, means, or instructions for determining that the first priority and the second priority are the same, and refraining from transmitting information related to the downlink communication or information related to the sidelink communication based on a configuration of the UE.

Some examples of the method, apparatuses, and non-transitory computer-readable medium described herein may further include operations, features, means, or instructions for receiving a DCI message from the base station that schedules the downlink communication or the sidelink communication, and determining the first priority or the second priority based on a bit included in the DCI message, a size of the DCI message, or a format of the DCI message.

Some examples of the method, apparatuses, and non-transitory computer-readable medium described herein may further include operations, features, means, or instructions for determining a first cast type for the downlink communication and a second cast type for the sidelink communication, and determining the first priority or the second priority based on the first cast type or second cast type.

Some examples of the method, apparatuses, and non-transitory computer-readable medium described herein may further include operations, features, means, or instructions for determining a priority of a logical channel associated with the sidelink communication, and determining the second priority based on the priority of the logical channel.

Some examples of the method, apparatuses, and non-transitory computer-readable medium described herein may further include operations, features, means, or instructions for determining a configuration of a set of sidelink resources used to convey the sidelink communication, and determining the second priority based on the configuration of the set of sidelink resources.

Some examples of the method, apparatuses, and non-transitory computer-readable medium described herein may further include operations, features, means, or instructions for identifying a control region of an uplink control channel that includes the set of resources, a downlink control channel, or a sidelink control channel, and determining the first priority or the second priority based on the control region.

Some examples of the method, apparatuses, and non-transitory computer-readable medium described herein may further include operations, features, means, or instructions for identifying a search space within a downlink control channel or sidelink control channel, and determining the first priority or the second priority based on the search space.

Some examples of the method, apparatuses, and non-transitory computer-readable medium described herein may further include operations, features, means, or instructions for identifying a first codebook used for information related to downlink communications and a second codebook used for information related to sidelink communications, and determining the first priority or the second priority based on the first and second codebooks.

A method of wireless communication at a UE is described. The method may include determining that feedback for a downlink communication is scheduled in a first set of uplink control channel resources, determining that feedback for a sidelink communication is scheduled in a second set of uplink control channel resources that overlap at least partially in time with the first set of uplink control channel resources, determining that a timing condition is satisfied based on the first or second set of uplink control channel resources, and multiplexing the feedback for the downlink communication and the feedback for the sidelink communication based on determining that the timing condition is satisfied.

An apparatus for wireless communication at a UE is described. The apparatus may include a processor, memory coupled with the processor, and instructions stored in the memory. The instructions may be executable by the processor to cause the apparatus to determine that feedback for a downlink communication is scheduled in a first set of uplink control channel resources, determine that feedback for a sidelink communication is scheduled in a second set of uplink control channel resources that overlap at least partially in time with the first set of uplink control channel resources, determine that a timing condition is satisfied based on the first or second set of uplink control channel resources, and multiplex the feedback for the downlink communication and the feedback for the sidelink communication based on determining that the timing condition is satisfied.

Another apparatus for wireless communication at a UE is described. The apparatus may include means for determining that feedback for a downlink communication is scheduled in a first set of uplink control channel resources, determining that feedback for a sidelink communication is scheduled in a second set of uplink control channel resources that overlap at least partially in time with the first set of uplink control channel resources, determining that a timing condition is satisfied based on the first or second set of uplink control channel resources, and multiplexing the feedback for the downlink communication and the feedback for the sidelink communication based on determining that the timing condition is satisfied.

A non-transitory computer-readable medium storing code for wireless communication at a UE is described. The code may include instructions executable by a processor to determine that feedback for a downlink communication is scheduled in a first set of uplink control channel resources, determine that feedback for a sidelink communication is scheduled in a second set of uplink control channel resources that overlap at least partially in time with the first set of uplink control channel resources, determine that a timing condition is satisfied based on the first or second set of uplink control channel resources, and multiplex the feedback for the downlink communication and the feedback for the sidelink communication based on determining that the timing condition is satisfied.

Some examples of the method, apparatuses, and non-transitory computer-readable medium described herein may further include operations, features, means, or instructions for transmitting the multiplexed feedback in the first set of uplink control channel resources, the second set of uplink control channel resources, or a combination thereof.

Some examples of the method, apparatuses, and non-transitory computer-readable medium described herein may further include operations, features, means, or instructions for determining that a second timing condition may be satisfied based on the first or second set of uplink control channel resources, where the feedback may be multiplexed based on determining that the second timing condition may be satisfied.

In some examples of the method, apparatuses, and non-transitory computer-readable medium described herein, the timing condition may be based on a processing time of the UE for sidelink communications, and where the second timing condition may be based on a processing time of the UE for downlink communications and a preparation time of the UE for uplink communications.

Some examples of the method, apparatuses, and non-transitory computer-readable medium described herein may further include operations, features, means, or instructions for receiving an indication of the feedback for the sidelink communication in a sidelink control channel, and determining a temporal gap between a last symbol of the sidelink control channel and a first symbol of the first set of uplink control channel resources or the second set of uplink control channel resources, whichever occurs earlier.

In some examples of the method, apparatuses, and non-transitory computer-readable medium described herein, determining that the timing condition may be satisfied may include operations, features, means, or instructions for determining that the temporal gap may be greater than a threshold duration.

A method of wireless communication at a base station is described. The method may include transmitting, to a UE, an indication of a first set of resources within an uplink control channel that are reserved for providing feedback for downlink communications to the UE, transmitting, to the UE, an indication of a second set of resources within the uplink control channel that are reserved for providing feedback for sidelink communications between the UE and a second UE, and receiving, at the base station, at least one of feedback for downlink communications in the first set of resources of the uplink control channel or feedback for sidelink communications in the second set of resources of the uplink control channel.

An apparatus for wireless communication at a base station is described. The apparatus may include a processor, memory coupled with the processor, and instructions stored in the memory. The instructions may be executable by the processor to cause the apparatus to transmit, to a UE, an indication of a first set of resources within an uplink control channel that are reserved for providing feedback for downlink communications to the UE, transmit, to the UE, an indication of a second set of resources within the uplink control channel that are reserved for providing feedback for sidelink communications between the UE and a second UE, and receive, at the base station, at least one of feedback for downlink communications in the first set of resources of the uplink control channel or feedback for sidelink communications in the second set of resources of the uplink control channel.

Another apparatus for wireless communication at a base station is described. The apparatus may include means for transmitting, to a UE, an indication of a first set of resources within an uplink control channel that are reserved for providing feedback for downlink communications to the UE, transmitting, to the UE, an indication of a second set of resources within the uplink control channel that are reserved for providing feedback for sidelink communications between the UE and a second UE, and receiving, at the base station, at least one of feedback for downlink communications in the first set of resources of the uplink control channel or feedback for sidelink communications in the second set of resources of the uplink control channel.

A non-transitory computer-readable medium storing code for wireless communication at a base station is described. The code may include instructions executable by a processor to transmit, to a UE, an indication of a first set of resources within an uplink control channel that are reserved for providing feedback for downlink communications to the UE, transmit, to the UE, an indication of a second set of resources within the uplink control channel that are reserved for providing feedback for sidelink communications between the UE and a second UE, and receive, at the base station, at least one of feedback for downlink communications in the first set of resources of the uplink control channel or feedback for sidelink communications in the second set of resources of the uplink control channel.

Some examples of the method, apparatuses, and non-transitory computer-readable medium described herein may further include operations, features, means, or instructions for determining that the first and second sets of resources do not overlap in the time domain, where receiving including receiving the feedback for downlink communications in the first set of resources and receiving the feedback for sidelink communications in the second set of resources.

Some examples of the method, apparatuses, and non-transitory computer-readable medium described herein may further include operations, features, means, or instructions for determining that the first and second sets of resources overlap in the time domain, where receiving includes receiving only the feedback for downlink communications or receiving only the feedback for sidelink communications.

Some examples of the method, apparatuses, and non-transitory computer-readable medium described herein may further include operations, features, means, or instructions for transmitting an indication that the second set of resources includes a first subset of resources and a second subset of resources.

Some examples of the method, apparatuses, and non-transitory computer-readable medium described herein may further include operations, features, means, or instructions for transmitting an indication that the first subset of resources may be associated with sidelink communications between the UE and the second UE, and transmitting an indication that the second subset of resources may be associated with sidelink communications between the UE and a third UE.

In some examples of the method, apparatuses, and non-transitory computer-readable medium described herein, receiving may include operations, features, means, or instructions for receiving feedback for sidelink communications between the UE and the second UE in the first subset of resources, and receiving feedback for sidelink communications between the UE and the third UE in the second subset of resources.

Some examples of the method, apparatuses, and non-transitory computer-readable medium described herein may further include operations, features, means, or instructions for transmitting an indication that the first subset of resources may be associated with a first cast type, and transmitting an indication that the second subset of resources may be associated with a second cast type.

In some examples of the method, apparatuses, and non-transitory computer-readable medium described herein, receiving may include operations, features, means, or instructions for receiving feedback for sidelink communications of the first cast type in the first subset of resources, and receiving feedback for sidelink communications of the second cast type in the second subset of resources.

A method of wireless communication at a base station is described. The method may include transmitting, to a UE, an indication of a set of resources within an uplink control channel that are reserved for providing feedback for communications to the UE, transmitting an indication of a first priority of feedback for downlink communications to the UE, transmitting an indication of a second priority of feedback for sidelink communications between the UE and a second UE, and receiving feedback for a downlink communication or feedback for a sidelink communication in the set of resources based on indicating the first and second priorities.

An apparatus for wireless communication at a base station is described. The apparatus may include a processor, memory coupled with the processor, and instructions stored in the memory. The instructions may be executable by the processor to cause the apparatus to transmit, to a UE, an indication of a set of resources within an uplink control channel that are reserved for providing feedback for communications to the UE, transmit an indication of a first priority of feedback for downlink communications to the UE, transmit an indication of a second priority of feedback for sidelink communications between the UE and a second UE, and receive feedback for a downlink communication or feedback for a sidelink communication in the set of resources based on indicating the first and second priorities.

Another apparatus for wireless communication at a base station is described. The apparatus may include means for transmitting, to a UE, an indication of a set of resources within an uplink control channel that are reserved for providing feedback for communications to the UE, transmitting an indication of a first priority of feedback for downlink communications to the UE, transmitting an indication of a second priority of feedback for sidelink communications between the UE and a second UE, and receiving feedback for a downlink communication or feedback for a sidelink communication in the set of resources based on indicating the first and second priorities.

A non-transitory computer-readable medium storing code for wireless communication at a base station is described. The code may include instructions executable by a processor to transmit, to a UE, an indication of a set of resources within an uplink control channel that are reserved for providing feedback for communications to the UE, transmit an indication of a first priority of feedback for downlink communications to the UE, transmit an indication of a second priority of feedback for sidelink communications between the UE and a second UE, and receive feedback for a downlink communication or feedback for a sidelink communication in the set of resources based on indicating the first and second priorities.

Some examples of the method, apparatuses, and non-transitory computer-readable medium described herein may further include operations, features, means, or instructions for determining that the first priority may be a higher priority or a lower priority relative to the second priority, and receiving the feedback for the downlink communication when the first priority may be a higher priority than the second priority and receiving the feedback for the sidelink communication when the first priority may be a lower priority than the second priority.

In some examples of the method, apparatuses, and non-transitory computer-readable medium described herein, transmitting the indication of the first priority or transmitting the indication of the second priority may include operations, features, means, or instructions for transmitting a DCI message to the UE that schedules the downlink communication or sidelink communication, where a bit included in the DCI message, a size of the DCI message, or a format of the DCI message may be indicative of the first or second priority.

Some examples of the method, apparatuses, and non-transitory computer-readable medium described herein may further include operations, features, means, or instructions for associating the first priority with a first cast type for downlink communications, where the indication of the first priority includes an indication of the association of the first priority with the first cast type, and associating the second priority with a second cast type for sidelink communications, where the indication of the second priority includes an indication of the association of the second priority with the second cast type.

Some examples of the method, apparatuses, and non-transitory computer-readable medium described herein may further include operations, features, means, or instructions for associating the second priority with a configuration of a set of sidelink resources used to convey the sidelink communication, where the indication of the second priority includes an indication of the configuration.

Some examples of the method, apparatuses, and non-transitory computer-readable medium described herein may further include operations, features, means, or instructions for associating the first or second priority with a control region of the uplink control channel, a downlink control channel, or a sidelink control channel, where the indication of the first or second priority includes an indication of the association of the first or second priority with the control region.

Some examples of the method, apparatuses, and non-transitory computer-readable medium described herein may further include operations, features, means, or instructions for associating the first priority or the second priority with a search space of a control channel, where the indication of the first or second priority includes an indication of the association of the first or second priority with the search space.

Some examples of the method, apparatuses, and non-transitory computer-readable medium described herein may further include operations, features, means, or instructions for associating the first priority with a first codebook where the indication of the first priority includes an indication of the association of the first priority with the first codebook, and associating the second priority with a second codebook, where an indication of the second priority includes an indication of the association of the second priority with the second codebook.

A method of wireless communication at a base station is described. The method may include scheduling a UE to transmit feedback for a downlink communication in a first set of uplink control channel resources, scheduling the UE to transmit feedback for a sidelink communication in a second set of uplink control channel resources, and receiving multiplexed feedback for the downlink communication and the sidelink communication in the first set of uplink control channel resources, the second set of uplink control channel resources, or a combination thereof, based on a timing condition being satisfied.

An apparatus for wireless communication at a base station is described. The apparatus may include a processor, memory coupled with the processor, and instructions stored in the memory. The instructions may be executable by the processor to cause the apparatus to schedule a UE to transmit feedback for a downlink communication in a first set of uplink control channel resources, schedule the UE to transmit feedback for a sidelink communication in a second set of uplink control channel resources, and receive multiplexed feedback for the downlink communication and the sidelink communication in the first set of uplink control channel resources, the second set of uplink control channel resources, or a combination thereof, based on a timing condition being satisfied.

Another apparatus for wireless communication at a base station is described. The apparatus may include means for scheduling a UE to transmit feedback for a downlink communication in a first set of uplink control channel resources, scheduling the UE to transmit feedback for a sidelink communication in a second set of uplink control channel resources, and receiving multiplexed feedback for the downlink communication and the sidelink communication in the first set of uplink control channel resources, the second set of uplink control channel resources, or a combination thereof, based on a timing condition being satisfied.

A non-transitory computer-readable medium storing code for wireless communication at a base station is described. The code may include instructions executable by a processor to schedule a UE to transmit feedback for a downlink communication in a first set of uplink control channel resources, schedule the UE to transmit feedback for a sidelink communication in a second set of uplink control channel resources, and receive multiplexed feedback for the downlink communication and the sidelink communication in the first set of uplink control channel resources, the second set of uplink control channel resources, or a combination thereof, based on a timing condition being satisfied.

Some examples of the method, apparatuses, and non-transitory computer-readable medium described herein may further include operations, features, means, or instructions for determining that the timing condition may be satisfied based on the first or second set of uplink control channel resources.

In some examples of the method, apparatuses, and non-transitory computer-readable medium described herein, the determining may include operations, features, means, or instructions for determining a last symbol of a sidelink control channel reserved for providing feedback for sidelink communications, and determining a temporal gap between the last symbol of the sidelink control channel and a first symbol of the first set of uplink control channel resources or the second set of uplink control channel resources, whichever occurs earlier.

Some examples of the method, apparatuses, and non-transitory computer-readable medium described herein may further include operations, features, means, or instructions for determining that the timing condition may be satisfied based on the temporal gap being greater than a threshold duration.

Some examples of the method, apparatuses, and non-transitory computer-readable medium described herein may further include operations, features, means, or instructions for determining that a second timing condition may be satisfied based on the first or second set of uplink control channel resources, where the multiplexed feedback may be received based on determining that the second timing condition may be satisfied.

In some examples of the method, apparatuses, and non-transitory computer-readable medium described herein, the timing condition may be based on a processing time of the UE for sidelink communications, and where the second timing condition may be based on a processing time of the UE for downlink communications and a preparation time of the UE for uplink communications.

DETAILED DESCRIPTION

Figure 1:
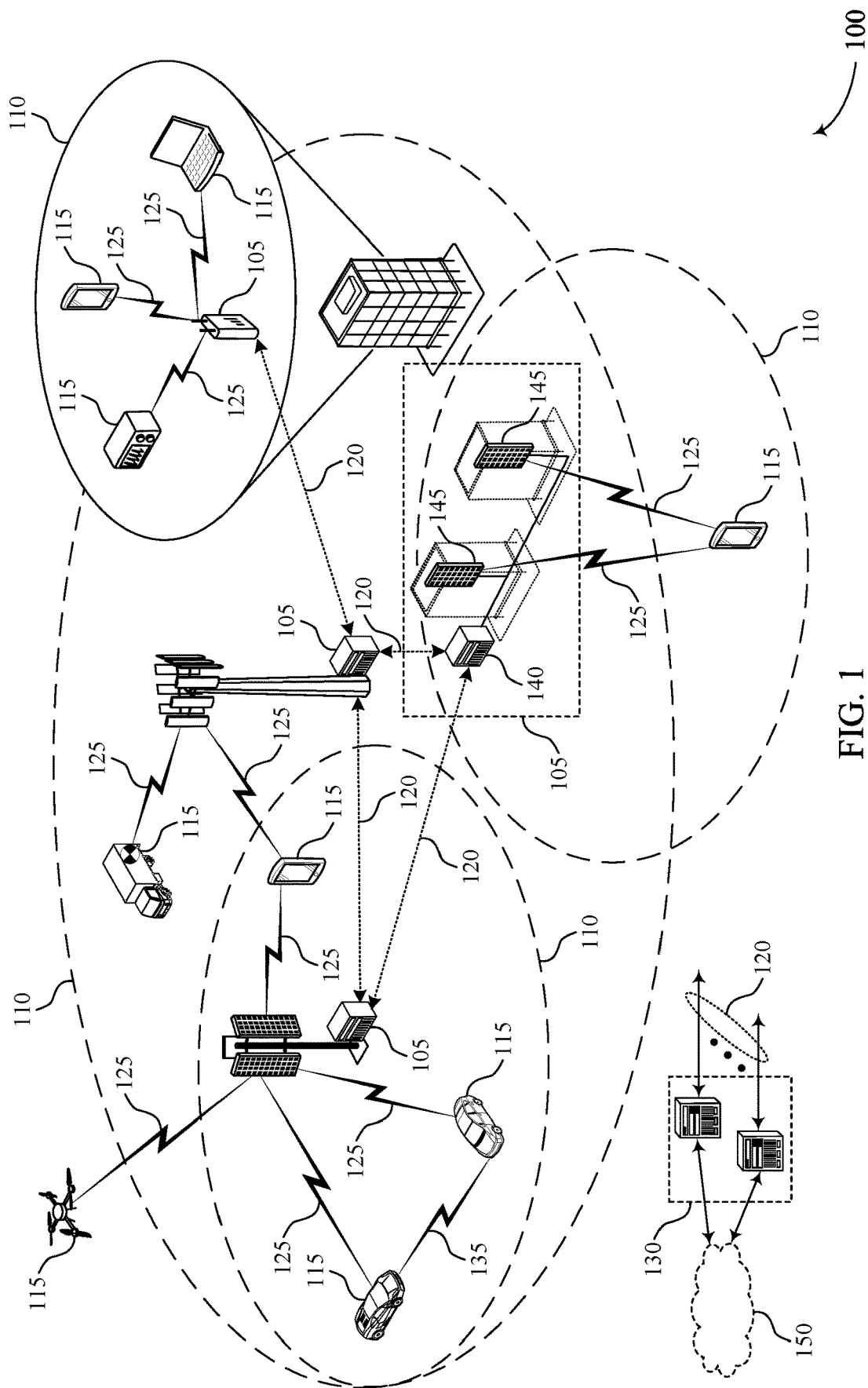
FIG. 1 illustrates an example of a system for wireless communications that supports feedback reporting for sidelink in accordance with aspects of the present disclosure.

A user equipment (UE) may be capable of directly communicating with a base station and other UEs. For example, the UE may communicate with a second UE via sidelink and communicate with a base station via uplink and downlink. In some cases, the UE may implement a feedback process (e.g., a hybrid automatic repeat request (HARQ) process) to increase the reliability of communications between the UE and another device. For example, when a device transmits data to the UE, the UE may send information to the transmitting device about the reception status of the data, such as an indication of whether the data was successfully decoded. This type of information may be referred to as feedback or HARQ feedback. In some cases, a UE may have HARQ feedback for downlink communications from a base station and HARQ feedback for sidelink communications with a second UE, but the UE may not know how to handle the HARQ feedback when both types are pending for transmission.

According to the techniques described herein, a UE with co-pending feedback data for different types of communications may resolve the conflict by implementing one or more solutions. In a first solution, the UE may determine that a first set of control channel resources is reserved for feedback for downlink communication and a second set of control channel resources is reserved for feedback for sidelink communications. If the first and second sets of resources are non-overlapping, the UE may transmit the feedback for the downlink communications in the first set of resources and transmit the feedback for the sidelink communications in the second set of resources. If the first and second sets of resources are overlapping, the UE may transmit either the feedback for the downlink communications or the feedback for the sidelink communications in the respective set of resources (and refrain from transmitting the other feedback).

In a second solution, the UE may determine that a single set of control channel resources is reserved for feedback. The UE may also determine the priority for each type of feedback. For example, the UE may determine the priority of the feedback for downlink communication and the priority of the feedback for sidelink communications. Once the priorities are determined, the UE may drop the feedback with the lower priority and transmit the feedback with the higher priority in the set of control channel resources.

In a third solution, the UE may determine that a first set of control channel resources reserved for feedback for downlink communications and a second set of control channel resources reserved for feedback for sidelink communications overlap in time. When such an overlap occurs and certain timing conditions are satisfied, the UE may multiplex the feedback for the downlink communications and the feedback for the sidelink communications and transmit the multiplexed feedback in the first set of resources, the second set of resources, or both.

Aspects of the disclosure are initially described in the context of wireless communications systems. Aspects of the disclosure are further illustrated by and described with reference to apparatus diagrams, system diagrams, and flowcharts that relate to feedback reporting for sidelink.

FIG. 1 illustrates an example of a wireless communications system 100 that supports feedback reporting for sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may have pending HARQ feedback for downlink communications and pending HARQ feedback for sidelink communications. In such cases, the UE 115 may implement one of several solutions. In a first solution, the UE 115 may determine whether the downlink HARQ feedback and the sidelink HARQ feedback are scheduled in temporally-distinct control channel resources. If so, the UE 115 may transmit both types of HARQ feedback in the respective non-overlapping control channel resources. If not, the UE 115 may drop of type of HARQ feedback and transmit the other in the corresponding control channel resources. In a second solution, a single set of control channel resources may be reserved for HARQ feedback. The UE 115 may determine the priority of each type of HARQ feedback and transmit the HARQ feedback with the higher priority in the set of control channel resources. In a third solution, the UE 115 may determine that downlink HARQ feedback and sidelink HARQ feedback are scheduled in overlapping resources. The UE 115 may determine that a timing condition is satisfied and transmit multiplexed downlink and sidelink HARQ feedback in a portion of the scheduled resources.

Figure 2:
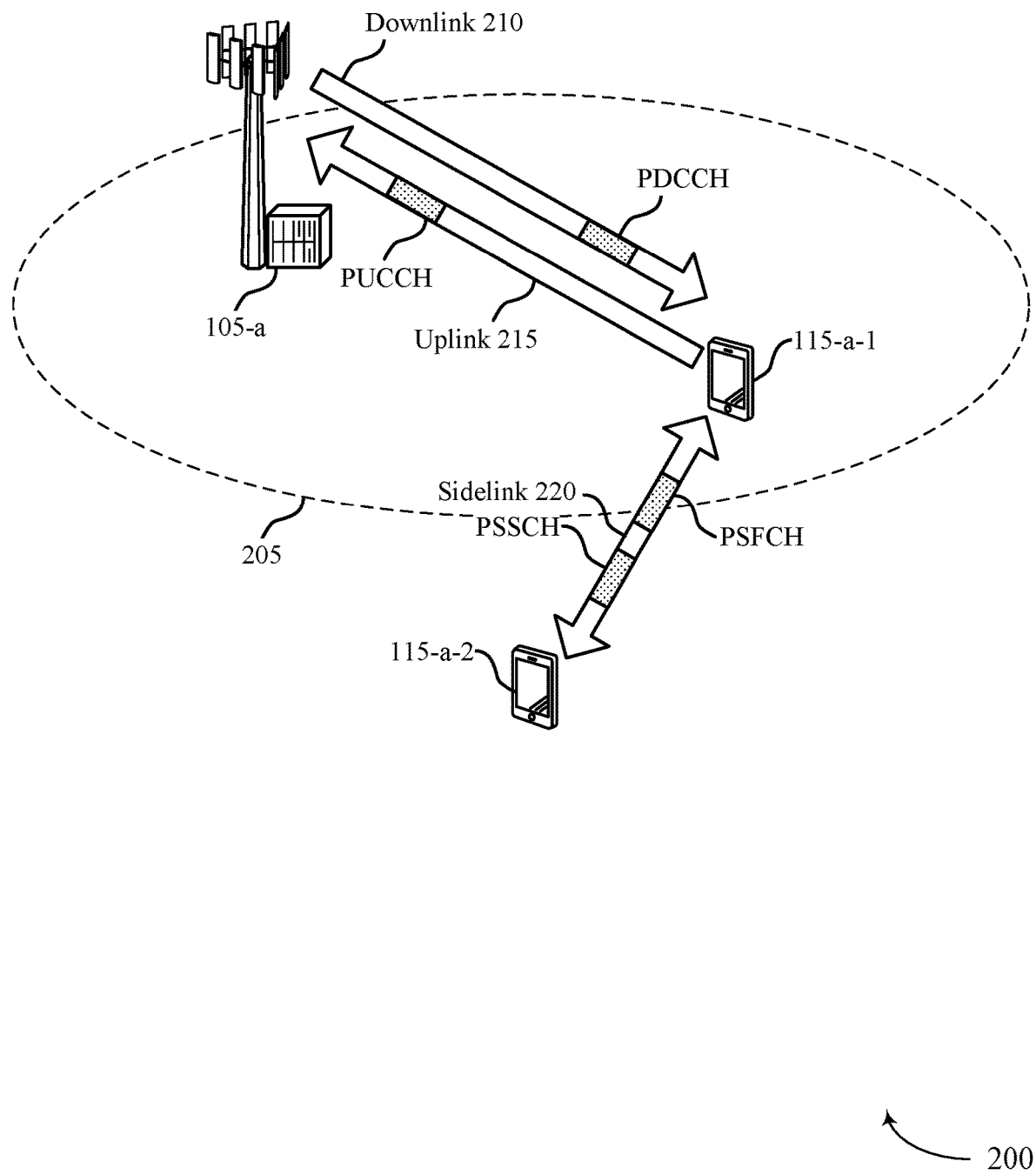
FIG. 2 illustrates an example of a wireless communications system that supports feedback reporting for sidelink in accordance with aspects of the present disclosure.

FIG. 2 illustrates an example of a wireless communications system 200 that supports feedback reporting for sidelink in accordance with aspects of the present disclosure. Wireless communications system 200 may include a base station 105-*a*, UE 115-*a*-1, and UE 115-*a*-2, which may be examples of a base station 105 and UE 115, respectively, as described with reference to FIG. 1. UE 115-*a*-1 may use one or more techniques for transmitting HARQ feedback when both sidelink HARQ feedback and downlink HARQ feedback are pending at UE 115-*a*. Although described with reference to HARQ feedback, the techniques described herein may be implemented for any type of feedback between a UE 115 and another device.

Base station 105-*a* may with communicate wireless devices that are within coverage area 205. For example, base station 105-*a* may transmit downlink communications to UE 115-*a*-1 via downlink 210 and base station 105-*a* may receive uplink communications from UE 115-*a*-1 via uplink 215. In some cases, the communications between base station 105-*a* and UE 115-*a*-1 may be referred to as Uu communications because they are conveyed over the Uu interface between base station 105-*a* and UE 115-*a*-1. Similarly, HARQ feedback for Uu communications may be referred to as Uu HARQ feedback.

Base station 105-*a* may transmit data to UE 115-*a*-1 in the resources of one or more downlink channels. For example, base station 105-*a* may transmit downlink data to UE 115-*a*-1 in the resources (e.g., time and frequency resources) of a physical downlink shared channel (PDSCH). To increase reliability, UE 115-*a* may transmit HARQ feedback to base station 105-*a* that indicates the reception status of the downlink data at UE 115-*a*-1. For example, UE 115-*a*-1 may send an acknowledgement (ACK) to base station 105-*a* when UE 115-*a*-1 successfully receives (e.g., decodes) the downlink data and UE 115-*a*-1 may send a negative acknowledgement (NACK) to base station 105-*a* when UE 115-*a*-1 does not successfully receive the downlink data. The HARQ feedback may be transmitted over a physical uplink control channel (PUCCH) or physical uplink shared channel (PUSCH) between UE 115-*a*-1 and base station 105-*a*.

In addition to communicating with base station 105-*a*, UE 115-*a*-1 may be capable of communicating with UE 115-*a*-2 via sidelink 220. UE 115-*a*-1 may engage in sidelink communications with UE 115-*a*-2 when either UE 115-*a* has data for the other UE 115-*a* or when data needs to be relayed between base station 105-*a* and UE 115-*a*-2 (e.g., UE 115-*a*-1 may act as an intermediary between base station 105-*a* and UE 115-*a*-2). In some cases, the sidelink communications may be V2X communications between wireless communications device that are incorporated into or coupled with vehicles.

UE 115-*a*-1 may support multiple resource allocation modes for sidelink communications. For example, UE 115-*a*-1 may implement sidelink communications with UE 115-*a*-2 in Mode 1 or in Mode 2. In Mode 1, UE 115-*a*-1 may be scheduled sidelink resources (e.g., for sidelink transmissions) by base station 105-*a*. In one implementation of Mode 1, the base station 105-*a* may send UE 115-*a*-1 downlink control information (DCI) that includes a dynamic grant indicating the resources (e.g., time and frequency) for one or more sidelink transmissions by UE 115-*a*-1 (e.g., the dynamic grant may indicate the resources for a sidelink transmission of one or more transport blocks (TBs) that include the same data). In some cases, the dynamic grant may indicate the quantity of slots between reception of the DCI and the first sidelink transmission. The temporal gap (or "slot offset") between the DCI and the first sidelink transmission may be based on (e.g., greater than) the processing time of UE 115-*a*-1. The processing time of UE 115-*a*-1 may refer to the amount of time (e.g., in symbols) that UE 115-*a*-1 uses for processing in between reception of scheduling information and transmission according to the scheduling information. In another implementation of Mode 1, the base station 105-*a* may send UE 115-*a*-1 a configured grant (e.g., type 1 or type 2) that indicates a set of periodic sidelink resources from which UE 115-*a*-1 can select a subset of resources to transmit over (e.g., UE 115-*a*-1 may select a subset of resources to transmit one or more TBs).

In Mode 2, UE 115-*a*-1 may determine sidelink resources for use independent of scheduling from base station 105-*a*. For example, UE 115-*a*-1 may be configured (e.g., preconfigured) with sidelink resources by base station 105-*a* or the network so that UE 115-*a*-1 is able to autonomously select a set of the configured resources for transmission. Thus, UE 115-*a*-1 may be configured with a configured grant similar to a type-1 grant used for Uu communications. In some cases, a UE 115 operating in Mode 2 may assist other UEs 115 with sidelink resource selection for sidelink communications. Additionally or alternatively, the UE 115 may schedule sidelink transmissions by the other UE(s) 115 over resources selected by the UE 115.

Similar to Uu communications, sidelink communications may involve HARQ feedback processes for reliability purposes. For example, UE 115-*a*-1 may receive HARQ feedback for a sidelink transmission conveyed to UE 115-*a*-2 in the physical sidelink shared channel (PSSCH). The sidelink transmission may be a unicast transmission intended for a single UE 115 (e.g., UE 115-*a*-2) or a multicast or groupcast transmission intended for multiple receiving UEs 115. In some cases, the physical sidelink control channel (PSCCH) may be used to indicate the PSSCH resources used to carry the sidelink transmission. The HARQ feedback for PSSCH may be conveyed in the physical sidelink feedback channel (PSFCH). Although shown separately for ease of illustration, the PSFCH may be within in a resource pool that includes the PSSCH that was used to convey the data associated with the HARQ feedback. Put another way, the PSFCH that includes the HARQ feedback may be sent in the same resource pool as the PSSCH that conveyed the corresponding sidelink transmission.

The PSFCH may occur periodically (e.g., within a resource pool configured for sidelink) and may include N slots. Additionally, each PSFCH may be mapped to a time, frequency, and code resource. When the PSFCH in a slot is in response to a single PSSCH, an implicit mechanism may be used to determine the frequency and/or code domain resource of the PSFCH within a configured resource pool. The parameters involved in the implicit mechanism may include the slot index associated with the PSCCH, PSSCH, and/or PSFCH, sub-channels associated with PSSCH and/or PSSCH, identifiers to distinguish each receiving UE 115 in a group (e.g., for Option 2 groupcast HARQ feedback), Layer-1 source ID, location information, sidelink signal-to-interference-plus-noise ratio (SINR), and/or sidelink reference signal received power (RSRP).

The HARQ feedback process for sidelink communications may be enabled or disabled by configuration and may vary with the cast type. For example, when UE 115-*a*-2 receives a unicast sidelink transmission, UE 115-*a*-2 may send a HARQ ACK for each successfully decoded TB and send a HARQ NACK for each unsuccessfully decoded TB. Thus, the HARQ feedback for a sidelink transmission (e.g., for a sidelink TB) may include a bit that represents a HARQ ACK or a HARQ NACK. UE 115-*a*-2 may have its own separate PSFCH resources for conveying sidelink HARQ feedback for unicast transmissions.

When UE 115-*a*-2 receives a groupcast or multicast sidelink transmission, UE 115-*a*-2 may implement one of multiple options for its HARQ feedback process. In a first option, UE 115-*a*-2 may send HARQ NACKs for unsuccessfully decoded TBs and refrain from transmitting HARQ ACKs for successfully decoded TBs (so that UE 115-*a*-1 is not overwhelmed with HARQ ACKs from the UEs in the groupcast). When UE 115-*a*-2 implements the first option, UE 115-*a*-2 may share the PSFCH will all the other UEs 115 targeted for the groupcast/multicast (because only a few HARQ NACKS are expected). In a second option, UE 115-*a*-2 may transmit HARQ ACKs for successfully decoded TBs and transmit HARQ NACKs for unsuccessfully decoded TBs. When UE 115-*a*-2 implements the second option, UE 115-*a*-2 may have its own separate PSFCH that is different from the PSFCHs used by other UE 115 targeted in the groupcast/multicast (because a large amount of HARQ feedback is expected). Although described with reference to TBs, a HARQ process may be implemented on a code block (CB) or code block group (CBG) basis.

It should be appreciated that sidelink HARQ feedback may be transmitted by UE 115-*a*-1 as well received by UE 115-*a*-1. This means that in some cases, the PSFCH for HARQ feedback from UE 115-*a*-1 and the PSFCH for HARQ feedback intended for UE 115-*a*-1 may collide (e.g., overlap). In such a scenario, UE 115-*a*-1 may opt to either transmit the HARQ feedback or receive the HARQ based on a priority rule that prioritizes one HARQ feedback over the other. In some examples, the priority rule may be based on the priority of the associated PSSCH or PSCCH. In other examples, the priority rule may prioritize HARQ feedback based on the direction (e.g., transmission or reception) of the HARQ feedback, the type of cast associated with the HARQ feedback (e.g., unicast or groupcast), the HARQ state (e.g., ACK or NACK), the collision status of the associated PSSCH or PSCCH, the HARQ feedback option, or the number of transmissions/retransmissions of PSSCH or PSCCH, among other parameters.

UE 115-*a*-1 may also experience a collision when UE 115-*a*-1 is communicating with multiple UEs 115 or when UE 115-*a*-1 has received multiple transmissions from another UE 115. For example, a collision may arise when UE 115-*a*-1 is supposed to transmit HARQ feedback to multiple UEs 115 in a single PSFCH. In such cases, UE 115-*a*-1 may select N of the HARQ feedback transmissions for the PSFCH based on a priority rule and discard the rest. In another example, a collision may arise when UE 115-*a*-1 has multiple HARQ feedback bits for UE 115-*a*-2. In such cases, UE 115-*a*-1 may multiplex the HARQ feedback bits for transmission during the PSFCH or select N HARQ feedback bits for transmission based on a priority rule.

After receiving sidelink HARQ feedback from UE 115-*a*-2, UE 115-*a*-1 may transmit an indication of the sidelink HARQ feedback to base station 105-*a* (e.g., UE 115-*a*-1 may relay sidelink HARQ feedback to base station 105-*a*). For instance, when operating in Mode 1 UE 115-*a*-1 may relay a HARQ NACK received from UE 115-*a*-2 to base station 105-*a* so that base station 105-*a* can schedule a sidelink retransmission of the corresponding data. The resources used to convey the sidelink HARQ feedback to base station 105-*a* may be PUCCH resources that may be based on an indication in the physical downlink control channel (PDCCH) that was used to schedule the original sidelink transmission.

Given that UE 115-*a*-1 may report sidelink HARQ feedback and Uu HARQ feedback to base station 105-*a*-1, it follows that in some cases UE 115-*a*-1 may have both types of HARQ feedback pending at the same time. For example, UE 115-*a*-1 may determine that it is to transmit both sidelink HARQ feedback and Uu HARQ feedback to base station 105-*a*. According to the techniques described herein, UE 115-*a*-1 may implement one of several techniques for transmitting the HARQ feedback when such a scenario arises. It should be appreciated that in some cases reporting uplink control information (UCI) such as HARQ feedback may be based on using a different PUCCH codebook for each.

In a first solution, base station 105-*a* may define (e.g., configure or reserve) PUCCH resources for HARQ feedback that are time division multiplexed (TDM'ed). For example, base station 105-*a* may configure a first pool of resources within the PUCCH for transmission of Uu HARQ feedback and base station 105-*a* may configure a second pool of resources within the PUCCH for transmission of sidelink HARQ feedback. Thus, base station 105-*a* may reserve a first set of resources for HARQ feedback for downlink transmissions and a second set of resources for HARQ feedback for sidelink transmissions. If the resource pools overlap in the time domain, UE 115-*a*-*a* may transmit either the Uu HARQ feedback or the sidelink HARQ feedback during the respective resource pool and refrain from transmitting the other type of HARQ feedback. If the resource pools do not overlap in the time domain, UE 115-*a*-1 may transmit both types of HARQ feedback in the respective resource pools.

In a second solution, base station 105-*a* may define (e.g., configure) a same set of PUCCH resources for Uu HARQ feedback and sidelink HARQ feedback. In this solution, base station 105-*a* may avoid scheduling both types of HARQ feedback in a single a PUCCH. But, if UE 115-*a*-1 is scheduled to transmit both Uu HARQ feedback and sidelink HARQ feedback in a given PUCCH, UE 115-*a*-1 may transmit one type of HARQ feedback and drop the other type. UE 115-*a*-1 may determine which type of HARQ feedback to drop based on the relative priorities of the HARQ feedback types. For example, if the Uu HARQ feedback has a higher priority than the sidelink HARQ feedback, UE 115-*a*-1 may transmit the Uu HARQ feedback in the set of PUCCH resources and refrain from transmitting the sidelink HARQ feedback.

In a third solution, base station 105-*a* may schedule sidelink HARQ feedback in a set of PUCCH resources that overlap with PUCCH or PUSCH resources that are scheduled for Uu HARQ feedback. If UE 115-*a*-1 determines that timing conditions are satisfied, UE 115-*a*-1 may multiplex the sidelink HARQ feedback with the Uu sidelink feedback and transmit both in the PUCCH or PUSCH resources scheduled for the Uu HARQ feedback.

Although described with reference to HARQ feedback, the solutions described herein may be implemented for any type of feedback. Additionally, aspects of one or more solutions may be combined aspects of one or more other solutions. In some cases, a UE 115 may dynamically switch between solutions based on the communication environment and other factors, such as latency tolerances and timing conditions.

Figure 3A:
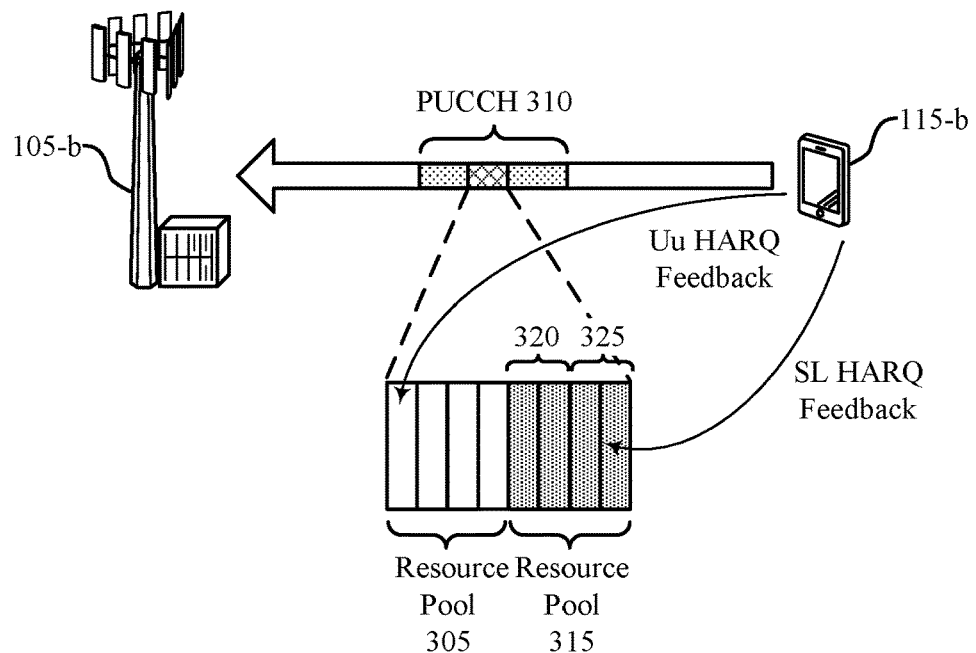
FIGS. 3A and 3B illustrate example of a wireless communications system that supports feedback reporting for sidelink in accordance with aspects of the present disclosure.

FIG. 3A illustrates an example of a wireless communications system 300-*a* that supports feedback reporting for sidelink in accordance with aspects of the present disclosure. Wireless communications system 300-*a* may include a base station 105-*b* and a UE 115-*b*, which may be examples of a base station 105 and UE 115, respectively, as described with reference to FIG. 1. Wireless communications system 300-*a* may illustrate aspects of the first solution for transmitting HARQ feedback as described herein and with reference to FIG. 2. In some cases, the first solution may be selected for use when Uu and sidelink communications are delay-tolerant. This is because the first solution uses a fraction of available PUCCH resources for each type of HARQ feedback, which may increase latency.

Base station 105-*b* may identify and configure a first resource pool 305 within PUCCH 310 for Uu HARQ feedback and base station 105-*b* may identify and configure a second resource pool 315 within PUCCH 310 for sidelink HARQ feedback. The resource pools may be time division multiplexed and each may include a quantity of slots. Base station 105-*b* may indicate the first resource pool 305 and the second resource pool 315 to UE 115-*b* (e.g., in DCI or a configuration message). Additionally, base station 105-*b* may indicate the type of HARQ feedback for which each resource pool is reserved (e.g., base station 105-*b* may indicate that first resource pool 305 is reserved for Uu HARQ feedback and that resource pool 310 is reserved for sidelink HARQ feedback). Accordingly, UE 115-*b* may transmit Uu HARQ feedback in the resource pool (e.g., resource pool 305) configured for Uu HARQ feedback and UE 115-*b* may transmit sidelink HARQ feedback in the resource pool (e.g., resource pool 315) configured for sidelink HARQ feedback. Using temporally distinct (e.g., non-overlapping) resource pools for different types of HARQ feedback may enable transmission of both types in the same PUCCH.

In some cases, UE 115-*a* may determine that it has a periodic signal (e.g., periodic channel state information (P-CSI)) scheduled during the resource pool reserved for sidelink HARQ feedback. In such cases, UE 115-*a* may resolve the conflict by automatically dropping the periodic signal, regardless of whether UE 115-*a* has sidelink HARQ feedback to transmit in resource pool 315. Alternatively, UE 115-*a* may resolve the conflict by first determining whether it has sidelink HARQ feedback to transmit in resource pool 315. If UE 115-*a* has sidelink HARQ feedback to transmit, UE 115-*a* may drop the periodic signal; but if UE 115-*a* does not have sidelink HARQ feedback to transmit, UE 115-*a* may transmit the periodic signal in resource pool 315.

In some cases, a resource pool may include or be made up of multiple smaller resource pools (e.g., sub-pools). For example, resource pool 315 may include resource pool 320 and resource pool 325, each of which may be associated with (e.g., reserved for or dedicated to) a corresponding sidelink. For instance, resource pool 320 may be associated with a first sidelink (e.g., between UE 115-*a* and UE 115-*b*) and resource pool 325 may be associated with a second sidelink (e.g., UE 115-*a* and UE other than UE 115-*b*). Accordingly, resource pool 320 may carry sidelink HARQ feedback for a data transmissions between UE 115-*a* and a first UE and resource pool 325 may carry sidelink HARQ feedback for a data transmission between UE 115-*a* and a second UE. To facilitate such an implementation, base station 105-*a* may indicate to UE 115-*a* that resource pool 320 is reserved for sidelink HARQ feedback for the first sidelink between UE 115-*a* and the first UE and base station 105-*a* may indicate to UE 115-*a* that resource pool 325 is reserved for sidelink HARQ feedback for the second sidelink between UE 115-*a* and the second UE.

In another example, resource pool 320 and resource pool 325 may each be associated with a type of sidelink cast (e.g., unicast, groupcast). For instance, resource pool 320 may be associated unicast sidelink transmissions and resource pool 325 may be associated with groupcast sidelink transmissions. To facilitate such an implementation, base station 105-*a* may indicate to UE 115-*a* that resource pool 320 is reserved for HARQ feedback for unicast sidelink transmissions and base station 105-*a* may indicate to UE 115-*a* that resource pool 325 is reserved for HARQ feedback for group cast sidelink transmissions.

Resource pool 320 and resource pool 325 may be time division multiplexed so that that are distinct in the time domain or resource pool 320 and resource pool 325 may overlap in the time domain. When resource pool 320 and resource pool 325 overlap in the time domain conflicts between the pools may be avoided via scheduling. If a conflict does occur, UE 115-*b* may treat the scheduling of one or both of the resource pools as an error.

Figure 3B:
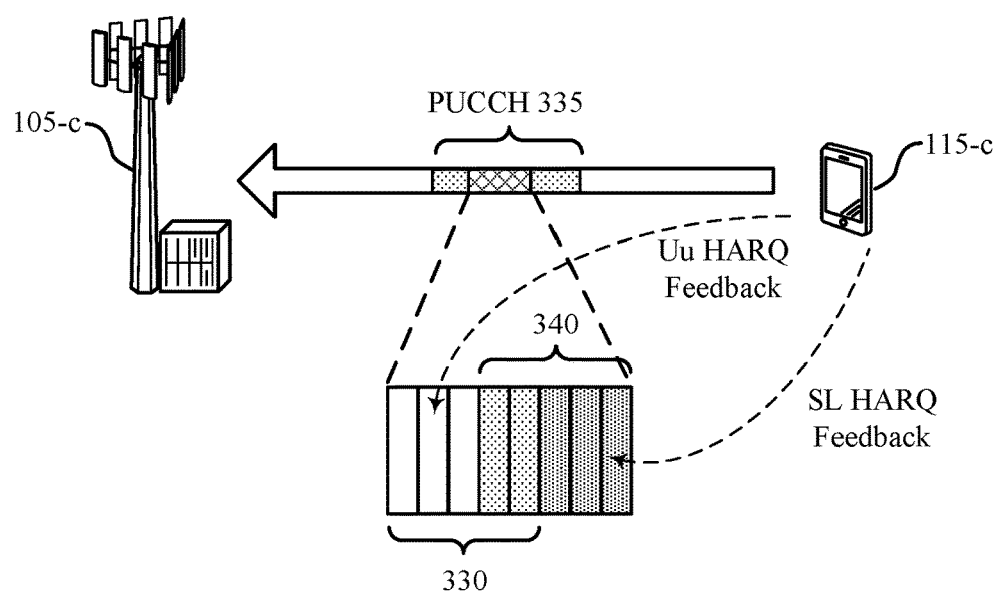

FIG. 3B illustrates an example of a wireless communications system 300-*b* that supports HARQ feedback reporting for sidelink in accordance with aspects of the techniques described herein. Wireless communications system 300-*b* may include a base station 105-*c* and a UE 115-*c*, which may be examples of a base station 105 and UE 115, respectively, as described with reference to FIG. 1. Wireless communications system 300-b may illustrate aspects of the first solution for transmitting HARQ feedback as described herein and with reference to FIG. 2.

Base station 105-c may configure a first resource pool 330 within PUCCH 335 for Uu HARQ transmissions and base station 105-c may configure a second resource pool 340 within PUCCH 335 for sidelink HARQ transmissions. In some cases, resource pool 340 may include multiple smaller resource pools and each smaller resource pool may be associated with a cast type or sidelink resource pool. The resource pools 330 and 340 may overlap in the time domain and each may include a quantity of slots. Base station 105-c may indicate the first resource pool 330 and the second resource pool 340 to UE 115-c. Additionally, base station 105-c may indicate the type of HARQ feedback associated with each resource pool. Using overlapping resource pools for different types of HARQ feedback may increase the quantity of a particular type of HARQ feedback that can be communicated in a given PUCCH.

Because the resource pools 330 and 340 overlap, base station 105-c may avoid scheduling both Uu HARQ feedback and sidelink HARQ feedback in PUCCH 335. However, if both types of HARQ feedback are scheduled in PUCCH 335 (e.g., by base station 105-c or UE 115-c), UE 115-c may treat the scheduling of one type of HARQ feedback as an error and refrain from transmitting that type of HARQ feedback in the PUCCH. For example, UE 115-c may drop the transmission of the Uu HARQ feedback and transmit sidelink HARQ feedback in the resource pool (e.g., resource pool 340) configured for sidelink HARQ feedback. Alternatively, UE 115-c may drop the transmission of the sidelink HARQ feedback and transmit Uu HARQ feedback in the resource pool (e.g., resource pool 330) configured for Uu HARQ feedback. Dropping a transmission may include ignoring or discarding the data for the transmission, refraining from the transmission, and/or delaying the transmission. In some cases, UE 115-c may determine which type of HARQ feedback to drop based on the relative priorities of the HARQ feedback types.

Figure 4:
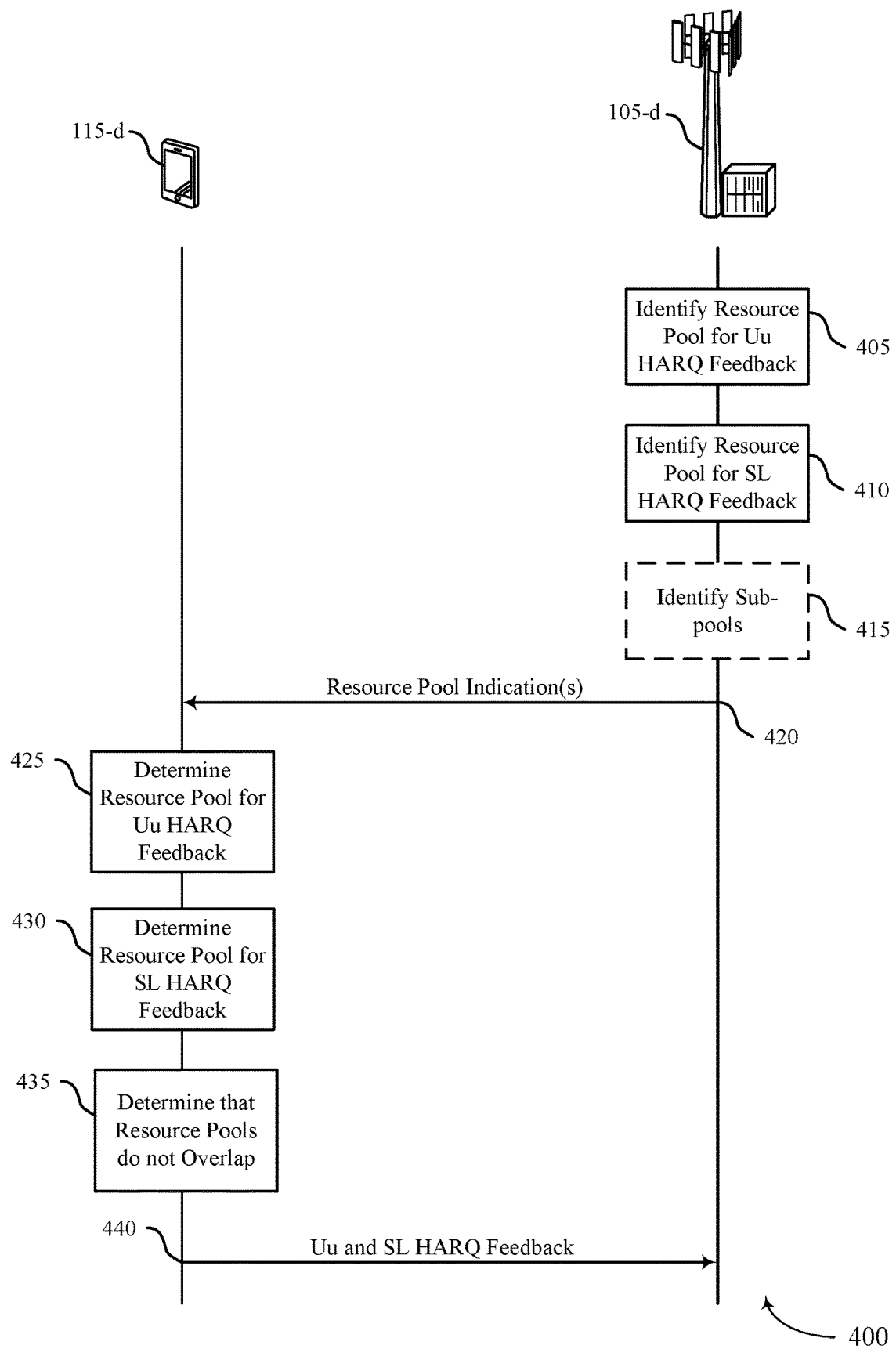
FIG. 4 illustrates an example of an example of a process flow that supports feedback reporting for sidelink in accordance with aspects of the present disclosure.

FIG. 4 illustrates an example of a process flow 400 that supports feedback reporting for sidelink in accordance with aspects of the present disclosure. In some examples, process flow 400 may implement aspects of wireless communications systems 100, 200, and 300-a. For example, process flow 400 may include UE 115-d and base station 105-d, and these devices may implement aspects of the first solution as described herein and with respect to FIG. 3A. In the following description of the process flow 400, the operations between base station 105-d and UE 115-d may occur in a different order than the exemplary order shown, or the operations performed by the devices may be performed in different orders or at different times. Certain operations may also be left out of the process flow 400, or other operations may be added to the process flow 400.

At 405, base station 105-d may identify a first resource pool (e.g., a first set of resources) within a PUCCH for Uu HARQ feedback. At 410, base station 105-d may identify a second resource pool (e.g., a second set of resources) within the PUCCH for sidelink HARQ feedback. The first and second resource pools may be distinct in the time domain (e.g., the first and second resource pools may not-overlap in the time domain). Thus, the first resource pool may include a first set of symbols that are different from a second set of symbols included in the second resource pool.

In some examples, base station 105-d may, at 415, identify multiple sub-pools within the resource pool for sidelink HARQ feedback. For example, base station 105-d may identify a first sub-pool and a second sub-pool. Base station 105-d may associate each sub-pool with a particular cast type or pair of sidelink devices. For example, base station 105-d may associate the first sub-pool with a first cast type (e.g., unicast) and associate the second sub-pool with a second cast type (e.g., multicast). Or base station 105-d may associate the first sub-pool with a first pair of sidelink devices (e.g., UE 115-d and a second UE) and associate the second sub-pool with a second pair of sidelink devices (e.g., UE 115-d and a third UE).

At 420, base station 105-d may send, and UE 115-d may receive, an indication of the resource pools identified at 405, 410, and or 415. For example, base station 105-d may send an indication of the first resource pool for Uu HARQ feedback and base station 105-d may send an indication of the second resource pool for sidelink HARQ feedback. Base station 105-d may also send an indication of the type of feedback to be transmitted in each resource pool. Thus, base station 105-d may send an indication of the type of feedback base station 105-d expects to receive in each resource pool. In some cases, base station 105-d may also include an indication of the sub-pools identified at 415, as well as an indication of the cast type or sidelink pairing associated with each sub-pool. In some cases, the indication of the sidelink pairing may include a sidelink identifier (ID) that is assigned to two devices involved in the sidelink pairing.

The various indications transmitted at 420 may be included in a single message or multiple distinct messages. In some cases, the message(s) may be a configuration message that sets up the resource pools to occur periodically. In other cases, the message(s) may be a DCI message that sets up the resources pools for a particular uplink transmission.

At 425, UE 115-d may determine the resource pool for Uu HARQ feedback based on a first indication received from base station 105-d. At 430, UE 115-d may determine the resource pool for sidelink HARQ feedback based on a second indication received from base station 105-d. At 435, UE 115-d may determine that the resource pools do not overlap in the time domain. Accordingly, at 440, UE 115-d may transmit Uu HARQ feedback in the resource pool for Uu HARQ feedback and UE 115-d may transmit sidelink HARQ feedback in the resource pool for sidelink HARQ feedback.

In some examples, UE 115-d may transmit sidelink HARQ feedback for the first cast type (e.g., unicast) in the first sub-pool of the second resource pool and UE 115-d may transmit sidelink HARQ feedback for a second cast type (e.g., multicast) in the second sub-pool of the second resource pool. In other examples, UE 115-d may transmit sidelink HARQ feedback for the first pair of sidelink devices (e.g., UE 115-d and a second UE) in the first sub-pool of the second resource pool and UE 115-d may transmit sidelink HARQ feedback for a pair of sidelink devices (e.g., UE 115-d and a third UE) in the second sub-pool of the second resource pool.

Figure 5:
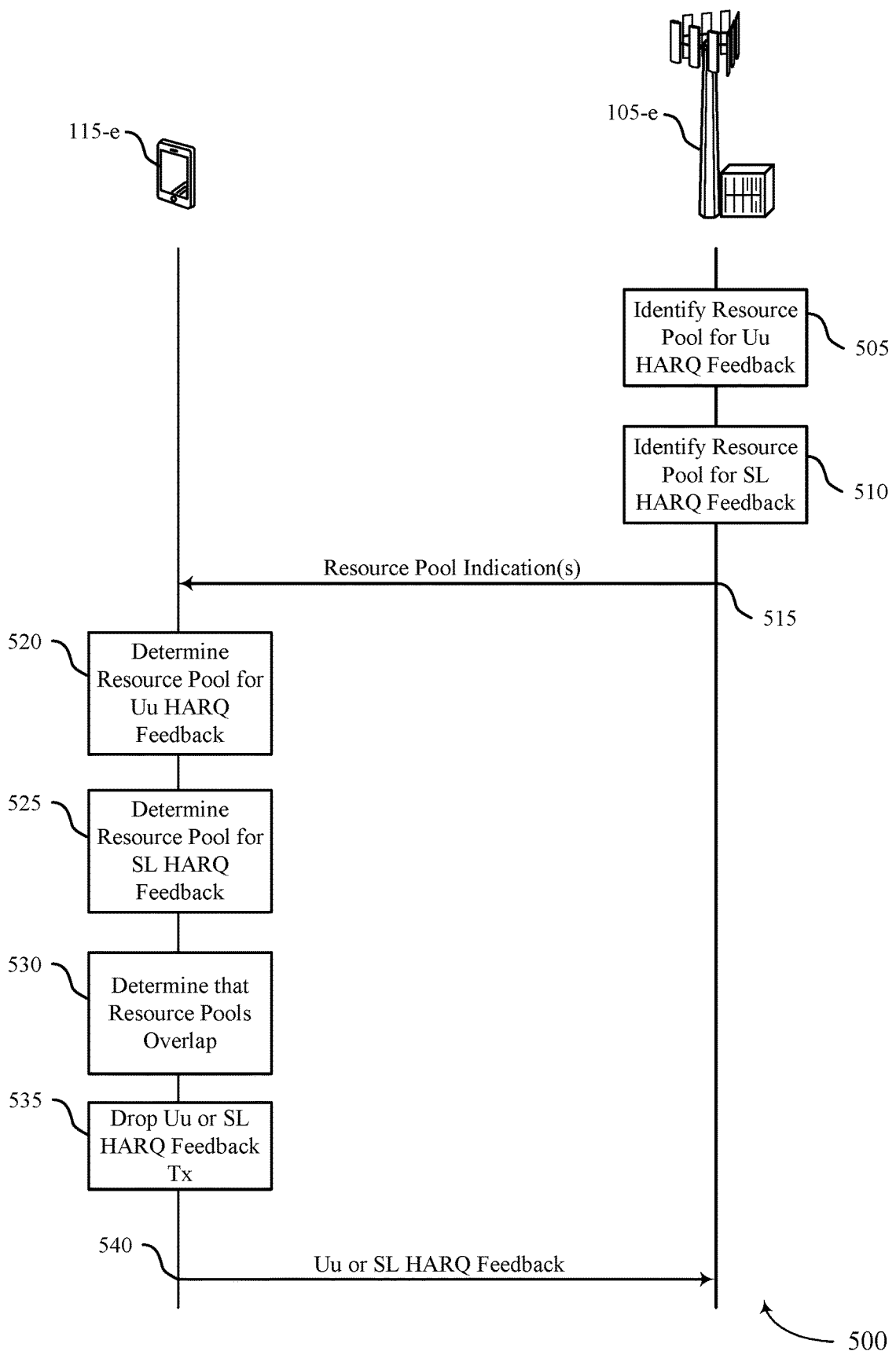
FIG. 5 illustrates an example of a process flow that supports feedback reporting for sidelink in accordance with aspects of the present disclosure.

FIG. 5 illustrates an example of a process flow 500 that supports feedback reporting for sidelink in accordance with aspects of the present disclosure. In some examples, process flow 500 may implement aspects of wireless communications systems 100, 200, and 300-b. For example, process flow 500 may include UE 115-e and base station 105-e, and these devices may implement aspects of the first solution as described herein and with respect to FIG. 3B. In the following description of the process flow 500, the operations between base station 105-*e* and UE 115-*e* may occur in a different order than the exemplary order shown, or the operations performed by the devices may be performed in different orders or at different times. Certain operations may also be left out of the process flow 500, or other operations may be added to the process flow 500.

At 505, base station 105-*e* may identify a first resource pool (e.g., a first set of resources) within a PUCCH for Uu HARQ feedback. At 510, base station 105-*e* may identify a second resource pool (e.g., a second set of resources) within the PUCCH for sidelink HARQ feedback. The first and second resource pools may be overlap in the time domain. So, one or more symbols included in the first resource pool may also be included in the second resource pool.

In some examples, base station 105-*e* may identify multiple sub-pools within the resource pool for sidelink HARQ feedback. For example, base station 105-*e* may identify a first sub-pool and a second sub-pool within the second resource pool. Base station 105-*e* may associate each sub-pool with a particular cast type or pair of sidelink devices.

At 515, base station 105-*e* may send, and UE 115-*e* may receive, an indication of the resource pools identified at 505 and 510. For example, base station 105-*e* may send an indication of the first resource pool for Uu HARQ feedback and base station 105-*e* may send an indication of the second resource pool for sidelink HARQ feedback. Base station 105-*e* may also send an indication of the type of feedback to be transmitted in each resource pool. Thus, base station 105-*e* may send an indication of the type of feedback base station 105-*e* expects to receive in each resource pool. In some cases, base station 105-*e* may also include an indication of any sub-pools in the second resource pool, as well as an indication of the cast type or sidelink pairing associated with each sub-pool.

The various indications transmitted at 515 may be included in a single message or multiple distinct messages. In some cases, the message(s) may be a configuration message that sets up the resource pools to occur periodically. In other cases, the message(s) may be a DCI message that sets up the resources pools for a particular uplink transmission.

At 520, UE 115-*e* may determine the resource pool for Uu HARQ feedback based on a first indication received from base station 105-*e*. At 525, UE 115-*e* may determine the resource pool for sidelink HARQ feedback based on a second indication received from base station 105-*e*. At 530, UE 115-*e* may determine that the resource pools overlap in the time domain. Accordingly, at 535, UE 115-*e* may drop either the Uu HARQ feedback or the sidelink HARQ feedback. UE 115-*e* may determine which type of HARQ feedback to drop based on a configuration of UE 115-*e* or based on the priorities of the HARQ feedback types. At 540, UE 115-*e* may transmit the type of HARQ feedback that was not dropped at 535. For example, when UE 115-*e* drops sidelink HARQ feedback at 535, UE 115-*e* may transmit Uu HARQ feedback in the resource pool for Uu HARQ feedback. Alternatively, when UE 115-*e* drops Uu HARQ feedback at 535, UE 115-*e* may transmit sidelink HARQ feedback in the resource pool for sidelink HARQ feedback.

Figure 6:
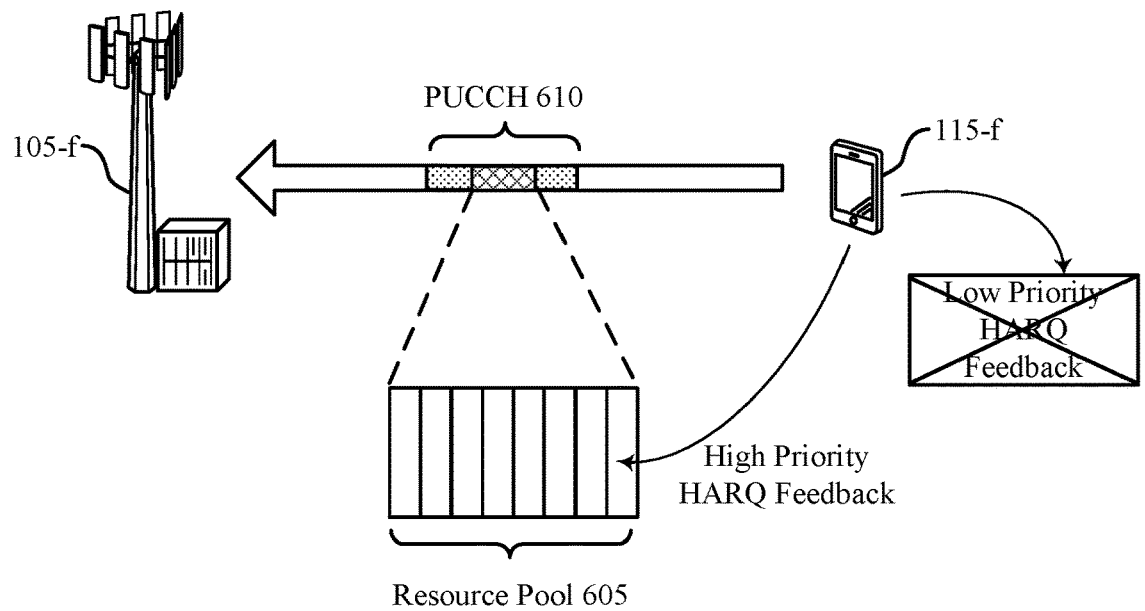
FIG. 6 illustrates an example of a wireless communications system that supports feedback reporting for sidelink in accordance with aspects of the present disclosure.

FIG. 6 illustrates an example of a wireless communications system 600 that supports feedback reporting for sidelink in accordance with aspects of the present disclosure. Wireless communications system 600 may include a base station 105-*f* and a UE 115-*f*, which may be examples of a base station 105 and UE 115, respectively, as described with reference to FIG. 1. Wireless communications system 600 may illustrate aspects of the second solution for transmitting HARQ feedback as described herein and with reference to FIG. 2. The second solution may be selected for use when Uu or sidelink communications are delay-sensitive. This is because the entirety of available PUCCH can be used for transmitting the HARQ feedback for the communications that are delay-sensitive, which may reduce latency in the HARQ process.

Base station 105-*f* may identify and configure a resource pool 605 within PUCCH 610 for HARQ feedback of any type (e.g., Uu HARQ feedback and sidelink HARQ feedback). In some examples, base station 105-*f* may schedule HARQ feedback in resource pool 605 without first configuring resource pool 605. When only one type of HARQ feedback is scheduled in PUCCH 610, UE 115-*f* may transmit the HARQ feedback for that type in resource pool 605 (e.g., in the available transmission occasions). But if both types of HARQ feedback are scheduled in PUCCH 610, UE 115-*f* may determine to transmit one type of HARQ feedback in resource pool 605 and drop the other type of HARQ feedback.

UE 115-*f* may determine which type of HARQ feedback to transmit (and which to drop) based on the relative priorities associated with or assigned to the types of HARQ feedback. For example, UE 115-*f* may transmit the higher priority HARQ feedback in resource pool 605 and drop the lower priority HARQ feedback. If the HARQ feedback priorities are the same, UE 115-*f* may be configured to drop one and transmit the other. For example, UE 115-*f* may be configured to drop Uu HARQ feedback and transmit sidelink HARQ feedback in resource pool 605. Or UE 115-*f* may be configured to drop sidelink HARQ feedback and transmit Uu HARQ feedback in resource pool 605. Alternatively, UE 115-*f* may determine which type of equally-prioritized HARQ feedback based on configuration information from base station 105-*f*.

The priority of HARQ feedback may be indicated in a variety of ways. For instance, the priority of HARQ feedback may be indicated by physical layer or higher layer signaling, and the priority may be indicated implicitly or explicitly. In one example, the priority of Uu HARQ feedback may be indicated by a bit in the DCI that scheduled the corresponding downlink data transmission. In another example, the size or format of the DCI may indicate the Uu HARQ feedback priority. In another example, a CORESET or search space may indicate the priority of the Uu HARQ feedback. Alternatively, the priority of the Uu HARQ feedback may be indicated by the HARQ-ACK codebook used for HARQ reporting.

The priority of sidelink HARQ feedback can be indicated in the same way as the priority of Uu HARQ feedback or in a different way. In one example, the priority of sidelink HARQ feedback may be indicated by a bit in the DCI that scheduled the corresponding sidelink data transmission. In another example, the size or format of the DCI may indicate the sidelink HARQ feedback priority. In another example, the priority of sidelink HARQ feedback may be indicated by a CORESET or search space. In another example, the priority of the sidelink HARQ feedback may be indicated by the HARQ-ACK codebook used for HARQ reporting. In another example, the configuration of a resource pool (e.g., the resource pool that included the PSSCH and PSFCH) may indicate the priority of the sidelink HARQ feedback. In another example, priority of sidelink HARQ feedback may be implicitly indicated by the priority of the logical channel from which the sidelink data was taken to be send on the PSSCH. In another example, the priority of sidelink HARQ feedback may be implicitly indicated by the cast type (e.g., unicast, multicast, groupcast, etc.) of the sidelink transmission.

Figure 7:
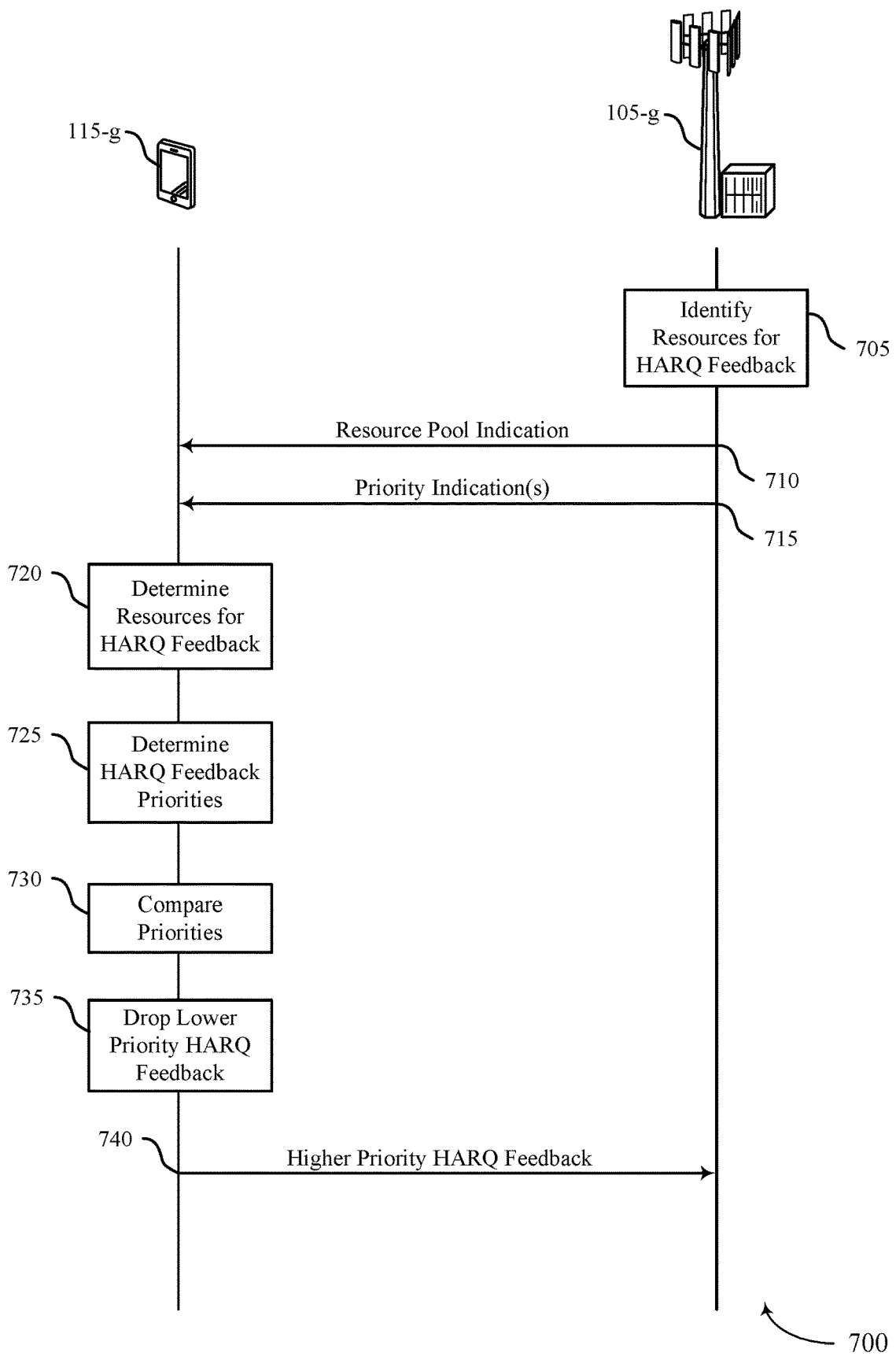
FIG. 7 illustrates an example of a process flow that supports feedback reporting for sidelink in accordance with aspects of the present disclosure.

FIG. 7 illustrates an example of a process flow 700 that supports feedback reporting for sidelink in accordance with aspects of the present disclosure. In some examples, process flow 700 may implement aspects of wireless communications systems 100, 200, and 600. For example, process flow 700 may include UE 115-g and base station 105-g, and these devices may implement aspects of the second solution as described herein and with respect to FIG. 6. In the following description of the process flow 700, the operations between base station 105-g and UE 115-g may occur in a different order than the exemplary order shown, or the operations performed by the devices may be performed in different orders or at different times. Certain operations may also be left out of the process flow 700, or other operations may be added to the process flow 700.

At 705, base station 105-g may identify PUCCH resources for providing HARQ feedback. At 710, base station 105-g may send, and UE 115-g may receive, an indication of the resources identified at 705. At 715, base station 105-g may transmit to UE 115-g an indication of one or more priorities. The priorities may be for particular types of HARQ feedback or for particular communications corresponding to HARQ feedback. For example, base station 105-g may transmit a first priority for Uu HARQ feedback and transmit a second priority for sidelink HARQ feedback. Alternatively, base station 105-g may transmit a first priority for a particular set of Uu HARQ feedback (e.g., a set of Uu HARQ feedback corresponding to a particular downlink data transmission) and transmit a second priority for a particular set of sidelink HARQ feedback (e.g., a set of sidelink HARQ feedback corresponding to a particular sidelink data transmission). Prior to transmitting the priorities, base station 105-g may determine the priorities (e.g., based on a configuration from the network or based on one or more criteria established by base station 105-g).

In one example, base station 105-g may indicate a priority using a bit in a DCI message that schedules a downlink or sidelink transmission. In such an example, UE 115-g may determine the priority for a type of HARQ feedback or a particular set of HARQ feedback data by referencing the bit in the DCI message. For instance, a set bit in the DCI message that schedules downlink data may indicate a first priority for Uu HARQ feedback and a null bit may indicate a second priority for Uu HARQ feedback. In some cases, the indicated priority may be for a particular set of Uu HARQ feedback rather than Uu HARQ feedback in general.

In another example, base station 105-g may indicate a priority by associating the priority with a size of a DCI message and then sending a DCI message of that size. In such an example, UE 115-g may determine the priority for a type of HARQ feedback or a particular set of HARQ feedback data by referencing the size of the DCI message. For instance, a first size of the DCI message that schedules downlink data may indicate a first priority for Uu HARQ feedback and a second size may indicate a second priority for Uu HARQ feedback. In some cases, the indicated priority may be for a particular set of Uu HARQ feedback rather than Uu HARQ feedback in general.

In another example, base station 105-g may indicate a priority by associating the priority with cast type and sending an indication of the association to UE 115-g. In such an example, UE 115-g may determine the priority for a particular set of HARQ feedback data based on the cast type of the corresponding data. For instance, base station 105-g may associate a first priority with unicast data and send an indication of the association to UE 115-g. When UE 115-g receives HARQ feedback corresponding to unicast data, UE 115-g may determine that the priority for the HARQ feedback is the priority associated with unicast data.

In another example, base station 105-g may indicate a priority by associating the priority with a configuration of a sidelink resource pool (e.g., a sidelink resource pool that includes PSSCH and a corresponding PSFCH) and sending an indication of the association to UE 115-g. In such an example, UE 115-g may determine the priority for a particular set of HARQ feedback data based on the configuration of the sidelink resource pool that conveyed the sidelink data corresponding to the HARQ feedback data.

In another example, base station 105-g may indicate a priority by associating the priority with a control region (e.g., a CORESET) of a control channel and sending an indication of the association to UE 115-g. In such an example, UE 115-g may determine the priority for a particular set of HARQ feedback data based on the control region that includes information for scheduling the data corresponding to the HARQ feedback data.

In another example, base station 105-g may indicate a priority by associating the priority with a search space of a control channel and sending an indication of the association to UE 115-g. In such an example, UE 115-g may determine the priority for a particular set of HARQ feedback data based on the search space that includes information for scheduling the data corresponding to the HARQ feedback data.

In another example, base station 105-g may indicate a priority by associating the priority with a codebook and sending an indication of the association to UE 115-g. In such an example, UE 115-g may determine the priority for a type of HARQ feedback data or a particular set of HARQ feedback data based on the codebook used for the data corresponding to the HARQ feedback.

At 720, UE 115-g may determine the resources for HARQ feedback based on the indication received at 710. At 725, UE 115-g may determine the priorities for the HARQ feedback. For example, UE 115-g may determine a first priority for Uu HARQ feedback and a second priority for sidelink HARQ feedback. In some cases, UE 115-g may determine the priorities based on one or more indications received from base station 105-g at 715. In other cases, UE 115-g may autonomously determine the priorities. In one example, UE 115-g may determine the priority for a set of sidelink HARQ feedback data by determining the priority of the logical channel that associated with the sidelink data corresponding to the set of sidelink HARQ feedback data.

At 730, UE 115-g may compare the first priority for the Uu HARQ feedback and the second priority for the sidelink HARQ feedback. At 735, UE 115-g may drop one type of HARQ feedback based on the comparison of the priorities. For example, if UE 115-g determines that the first priority for the Uu HARQ feedback is higher than the second priority for the sidelink HARQ feedback, UE 115-g may drop the sidelink HARQ feedback. If UE 115-g determines that the priorities are the same, UE 115-g may refer to a rule configured at UE 115-g that indicates which type of HARQ feedback should be dropped in such a situation. For instance, if the rule indicates that Uu HARQ feedback should be dropped when the priorities are equal, UE 115-g may drop the Uu HARQ feedback.

At 740, UE 115-g may transmit the type of HARQ feedback that UE 115-g did not drop at 735. For example, if UE 115-g dropped Uu HARQ feedback at 735, UE 115-g may transmit sidelink HARQ feedback over the resources for HARQ feedback. Alternatively, if UE 115-*g* dropped sidelink HARQ feedback at 735, UE 115-*g* may transmit Uu HARQ feedback over the resources. Thus, UE 115-*g* may transmit the HARQ feedback that has the higher priority relative to the other type of HARQ feedback.

Figure 8:
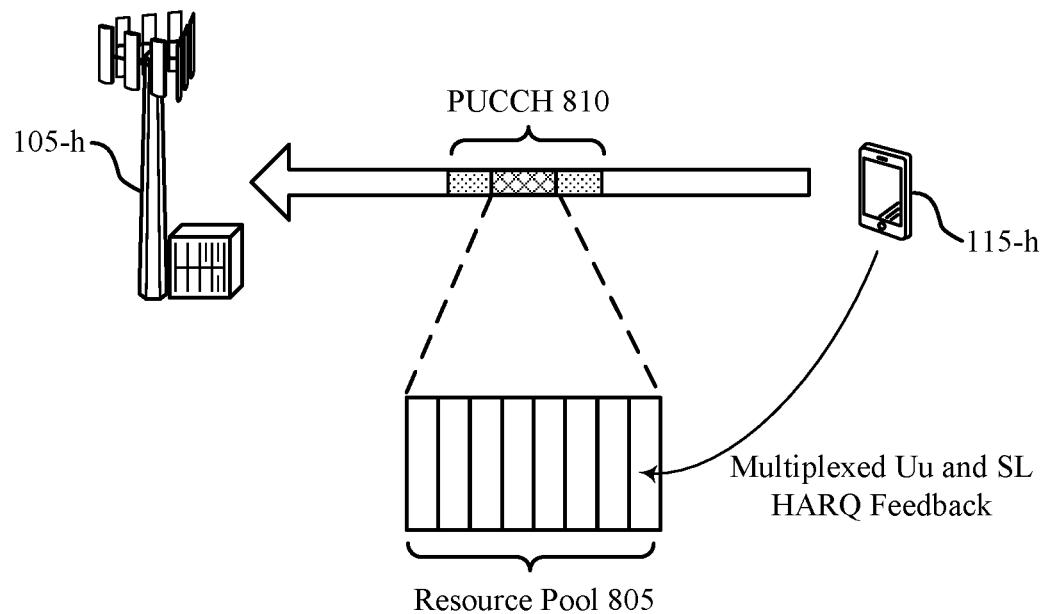
FIG. 8 illustrates an example of a wireless communications system that supports feedback reporting for sidelink in accordance with aspects of the present disclosure.

FIG. 8 illustrates an example of a wireless communications system 800 that supports feedback reporting for sidelink in accordance with aspects of the present disclosure. Wireless communications system 800 may include a base station 105-*h* and a UE 115-*h*, which may be examples of a base station 105 and UE 115, respectively, as described with reference to FIG. 1. Wireless communications system 800 may illustrate aspects of the third solution for transmitting HARQ feedback as described herein and with reference to FIG. 2.

Base station 105-*h* may reserve and/or schedule a resource pool 805 within PUCCH 810 for Uu HARQ feedback from UE 115-*h*. But the resource pool 805 may overlap at least partially in time with a resource pool reserved and/or scheduled for sidelink HARQ feedback from UE 115-*h*. In such cases, UE 115-*h* may detect the overlap and determine if timing conditions are met for transmitting multiplexed Uu and sidelink HARQ feedback in the resource pool 805 scheduled for Uu HARQ feedback. If the timing conditions are satisfied, UE 115-*h* may multiplex the Uu HARQ feedback with the sidelink HARQ feedback and send both types of HARQ feedback in the resource pool 805 scheduled for Uu HARQ feedback.

Figure 9:
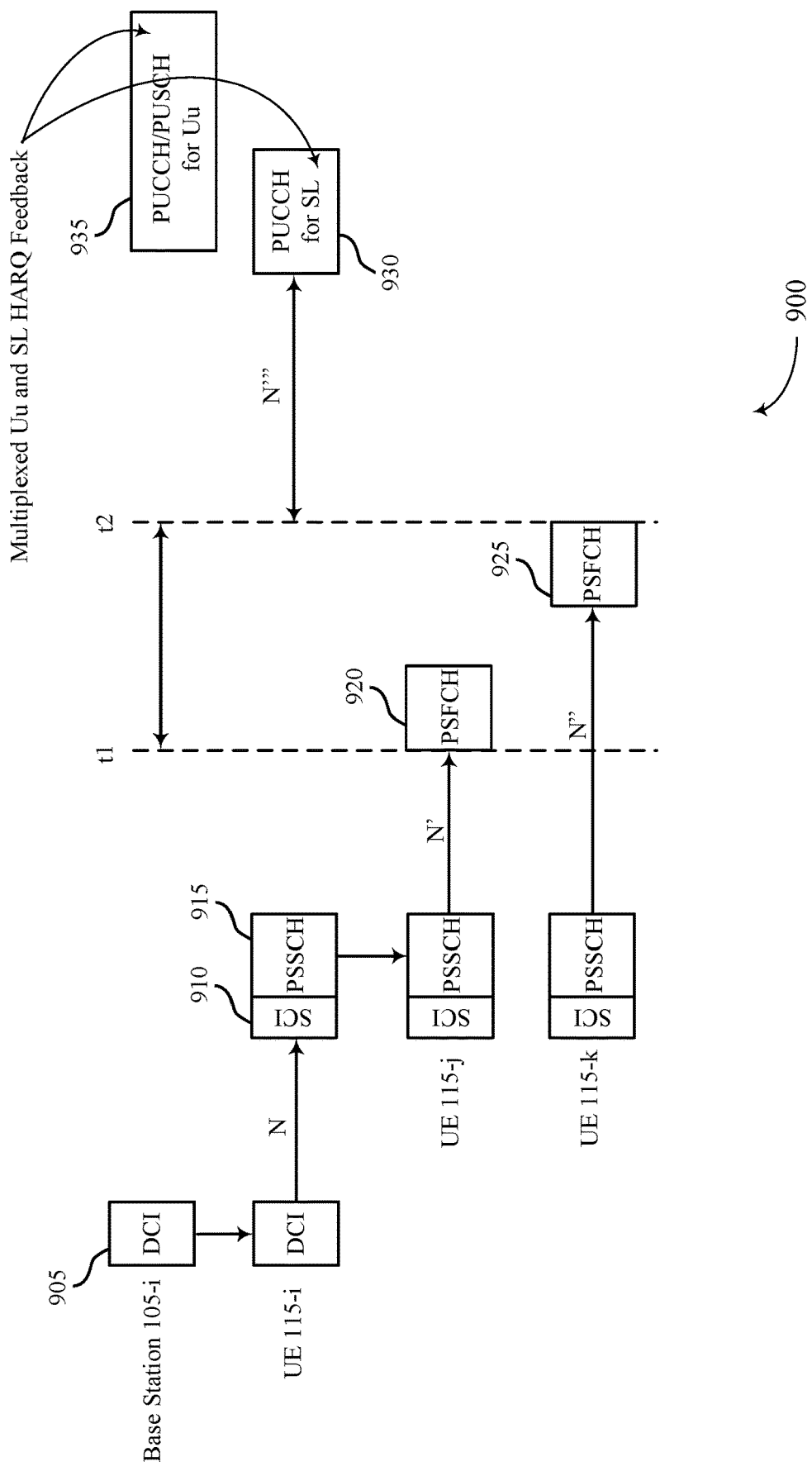
FIG. 9 illustrates an example of a wireless communications system that supports feedback reporting for sidelink in accordance with aspects of the present disclosure.

FIG. 9 illustrates an example of a wireless communications system 900 that supports feedback reporting for sidelink in accordance with aspects of the present disclosure. Wireless communications system 800 may include a base station 105-*i*, UE 115-*i*, UE 115-*j*, and UE 115-*k*, which may be examples of a base station 105 and UE 115, respectively, as described with reference to FIG. 1. Wireless communications system 900 may illustrate aspects of the third solution for transmitting HARQ feedback as described herein and with reference to FIG. 8.

Base station 105-*i* may transmit scheduling information in downlink control information (e.g., DCI 905) to UE 115-*i*. The downlink control information may indicate sidelink resources (e.g., PSSCH resources) UE 115-*i* is to use for sidelink transmissions to UE 115-*j* and UE 115-*k*. Accordingly, UE 115-*i* may determine PSSCH resources for sidelink transmission to UE 115-*j* and UE 115-*k* based on the downlink control information from base station 105-*i*. UE 115-*i* may indicate the determined PSSCH resources to UE 115-*j* and UE 115-*k* in sidelink control information (SCI) (e.g., SCI 910), and transmit the data to UE 115-*j* and UE 115-*k* in the indicated PSSCH resources (e.g., PSSCH 915).

Both UE 115-*j* and UE 115-*k* may send HARQ feedback for the sidelink data conveyed in the PSSCH resources. For example, UE 115-*j* may transmit HARQ feedback in PSFCH 920 and UE 115-*k* may transmit HARQ feedback in PSFCH 925. The transmission of PSFCH 920 may occur after a first duration of time (e.g., N') elapses from reception of the last symbol of PSSCH by UE 115-*j*. And transmission of PSFCH 925 may occur after a second duration of time (e.g., N") elapsed from reception of the last of PSSCH by UE 115-*k*.

As previously noted, each PSFCH carrying HARQ feedback for sidelink data may be transmitted in the same resource pool that includes the PSSCH carrying the sidelink data. So, if the resource pool that includes the PSSCH stops at time t2, any PSFCH conveying HARQ feedback must be transmitted before time t2. It should also be appreciated that a UE 115 may be delayed in transmitted PSFCH due to processing constraints at the UE 115. For example, the UE 115 may need x symbols of processing time in between receiving a data transmission via PSSCH and transmitting the corresponding HARQ feedback via PSFCH. Thus, the earliest opportunity for a HARQ feedback transmission may occur at time t1. With these two constraints in play, UE 115-*i* can expect to receive all PSFCHs carrying HARQ feedback between time t1 and time t2.

After receiving HARQ feedback from UE 115-*j* and UE 115-*k*, UE 115-*i* may determine to transmit to base station transmit 105-*i* sidelink HARQ feedback that indicates the HARQ feedback. For example, UE 115-*i* may determine that it is to transmit sidelink HARQ feedback in PUCCH resources 930 after duration N" has elapsed. Duration N" may represent a processing time of UE 115-*i* for sidelink communications (e.g., PSSCH or PSFCH communications). So, N" may be the processing time used by UE 115-*i* in between receiving the last symbol of the last PSFCH and transmitting corresponding HARQ feedback on the first symbol of PUCCH resources 930 or PUCCH/PUSCH resources 935.

But in some cases, the PUCCH resources 930 scheduled for sidelink HARQ feedback may overlap with PUCCH or PUSCH resources 935 scheduled for Uu HARQ feedback. In such cases, UE 115-*i* may determine if timing conditions are satisfied for multiplexing the sidelink HARQ feedback with the Uu HARQ feedback. For example, UE 115-*i* may determine whether the temporal gap between the last symbol of the last PSFCH and the leading symbol of the resources involved in the overlap is greater than or equal to duration N". If the temporal gap is greater than or equal duration N", UE 115-*i* may multiplex the sidelink HARQ feedback with the Uu HARQ feedback and transmit both on the resources scheduled for the sidelink HARQ feedback and/or the resources scheduled for Uu HARQ feedback. If the temporal gap is less than N", UE 115-*i* may drop either the Uu HARQ feedback or the sidelink HARQ feedback and transmit the other. Thus, UE 115-*i* may determine whether to multiplex HARQ feedback based on the last symbol of the last PSFCH received by UE 115-*i*, based on the processing time of UE 115-*i*, and based on the first symbol of the PUCCH or PUSCH on which the UE 115-*i* intends to transmit either type of HARQ feedback.

In another example, UE 115-*i* may determine whether the temporal gap between the last symbol of the last PSFCH and the leading symbol of the resources involved in the overlap is greater than duration N1 and N2, where N1 represents the processing time of UE 115-*i* for downlink communications (e.g., PDSCH communications) in a number of symbols and N2 represents the preparation time of UE 115-*i* for uplink communications (e.g., PUSCH communications) in a number of symbols. If the temporal gap is greater than or equal duration N1 and N2, UE 115-*i* may multiplex the sidelink HARQ feedback with the Uu HARQ feedback and transmit both on the resources scheduled for the sidelink HARQ feedback and/or on the resources scheduled for the Uu HARQ feedback. If the temporal gap is less than N1 or N2, UE 115-*i* may drop either the Uu HARQ feedback or the sidelink HARQ feedback and transmit the other.

Timing conditions may be one of multiple aspects considered by UE 115-*i* when determining whether to multiplex Uu and sidelink HARQ feedback. In some cases, UE 115-*i* may determine whether to multiplex the Uu and sidelink HARQ feedback based on the priority of each type of HARQ feedback. For example, UE 115-*i* may determine to multiplex Uu and sidelink HARQ feedback if the priorities associated with the Uu and sidelink HARQ feedback are the same. If the priorities are different, UE 115-*i* may opt to drop the transmission for the lower priority HARQ feedback and transmit the higher priority HARQ feedback. Alternatively, UE 115-*i* may declare an error for the lower priority HARQ feedback and/or the higher priority HARQ feedback.

Figure 10:
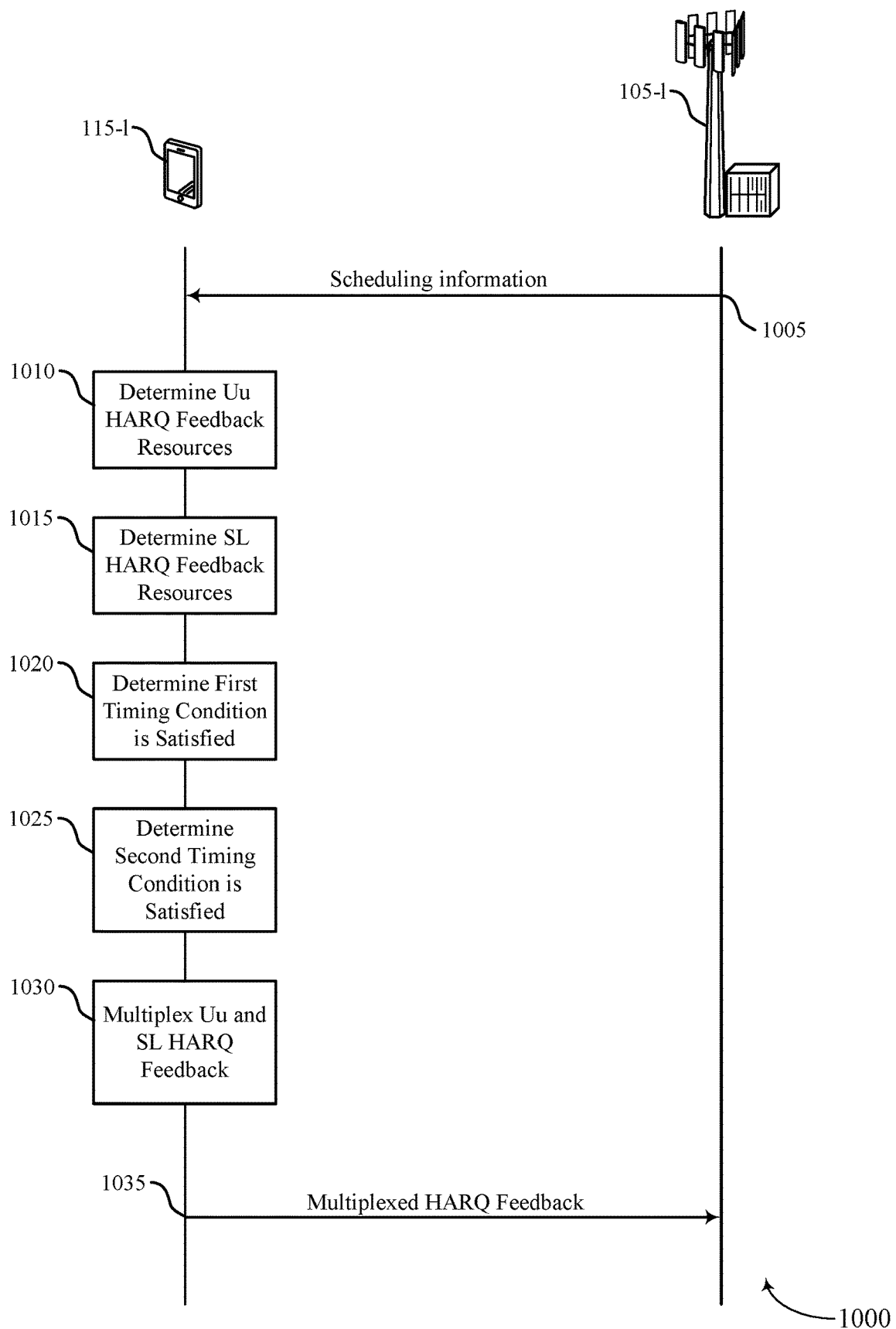
FIG. 10 illustrates an example of a process flow that supports feedback reporting for sidelink in accordance with aspects of the present disclosure.

FIG. 10 illustrates an example of a process flow 1000 that supports feedback reporting for sidelink in accordance with aspects of the present disclosure. In some examples, process flow 1000 may implement aspects of wireless communications systems 100, 200, 800, and 900. For example, process flow 1000 may include UE 115-*l* and base station 105-*l*, and these devices may implement aspects of the third solution as described herein and with respect to FIGS. 8 and 9. In the following description of the process flow 1000, the operations between base station 105-*l* and UE 115-*l* may occur in a different order than the exemplary order shown, or the operations performed by the devices may be performed in different orders or at different times. Certain operations may also be left out of the process flow 1000, or other operations may be added to the process flow 1000.

At 1005, base station 105-*l* may send scheduling information to UE 115-*l* that indicates one or more sets of control channel resources for HARQ feedback. For example, the scheduling information may include an indication of a first set of resources (e.g., PUSCH or PUCCH resources) for Uu HARQ feedback and a second set of resources (e.g., PUCCH resources) for sidelink HARQ feedback. At 1010, UE 115-*l* may determine that Uu HARQ feedback is scheduled in the first set of resources. At 1015, UE 115-*l* may determine that that sidelink HARQ feedback is scheduled in the second set of resources. UE 115-*l* may also determine that the second set of resources overlaps with the first of resources. Thus, UE 115-*l* may determine that transmission opportunities for the Uu and sidelink HARQ feedback overlap. Although described with reference to scheduling by base station 105-*l*, the conflict between resources may arise from independent actions by UE 115-*l* (e.g., UE 115-*l* may autonomously determine that it is to transmit Uu or sidelink HARQ feedback in certain resources based on a configuration of UE 115-*l* or feedback timing requirements).

At 1020, UE 115-*l* may determine that a first timing condition is satisfied. For example, UE 115-*l* may determine that a gap between the last symbol of a PSFCH carrying the sidelink HARQ data and a first symbol of the first set of resources or the second set of resources (whichever is earlier), exceeds a first threshold duration. In some cases, the first threshold duration is the sidelink processing time of UE 115-*l* (e.g., the first threshold duration may be equal to N").

At 1025, UE 115-*l* may determine that a second timing condition is satisfied. For example, UE 115-*l* may determine that a gap between the last symbol of a PSFCH carrying the sidelink HARQ data and a first symbol of the first set of resources or the second set of resources (whichever is earlier), exceeds a second threshold duration. In some cases, the second threshold duration is a function of the downlink processing time of UE 115-*l* and the uplink preparation time of UE 115-*l* (e.g., the second threshold duration may be equal to N1/N2).

At 1030, UE 115-*l* may multiplex the Uu HARQ feedback with the sidelink HARQ feedback based on the determination that both the first and second timing conditions are satisfied. In some cases, UE 115-*l* may determine whether to multiplex the HARQ feedback based on priorities of the Uu and sidelink HARQ feedback. For example, UE 115-*l* may opt to multiplex the HARQ feedback when the priorities are equal. Otherwise, UE 115-*l* may drop the lower priority HARQ feedback and transmit the higher priority HARQ feedback. At 1035, UE 115-*l* may transmit the multiplexed HARQ feedback in some or all of the first set of resources and/or the second set of resources.

Figure 11:
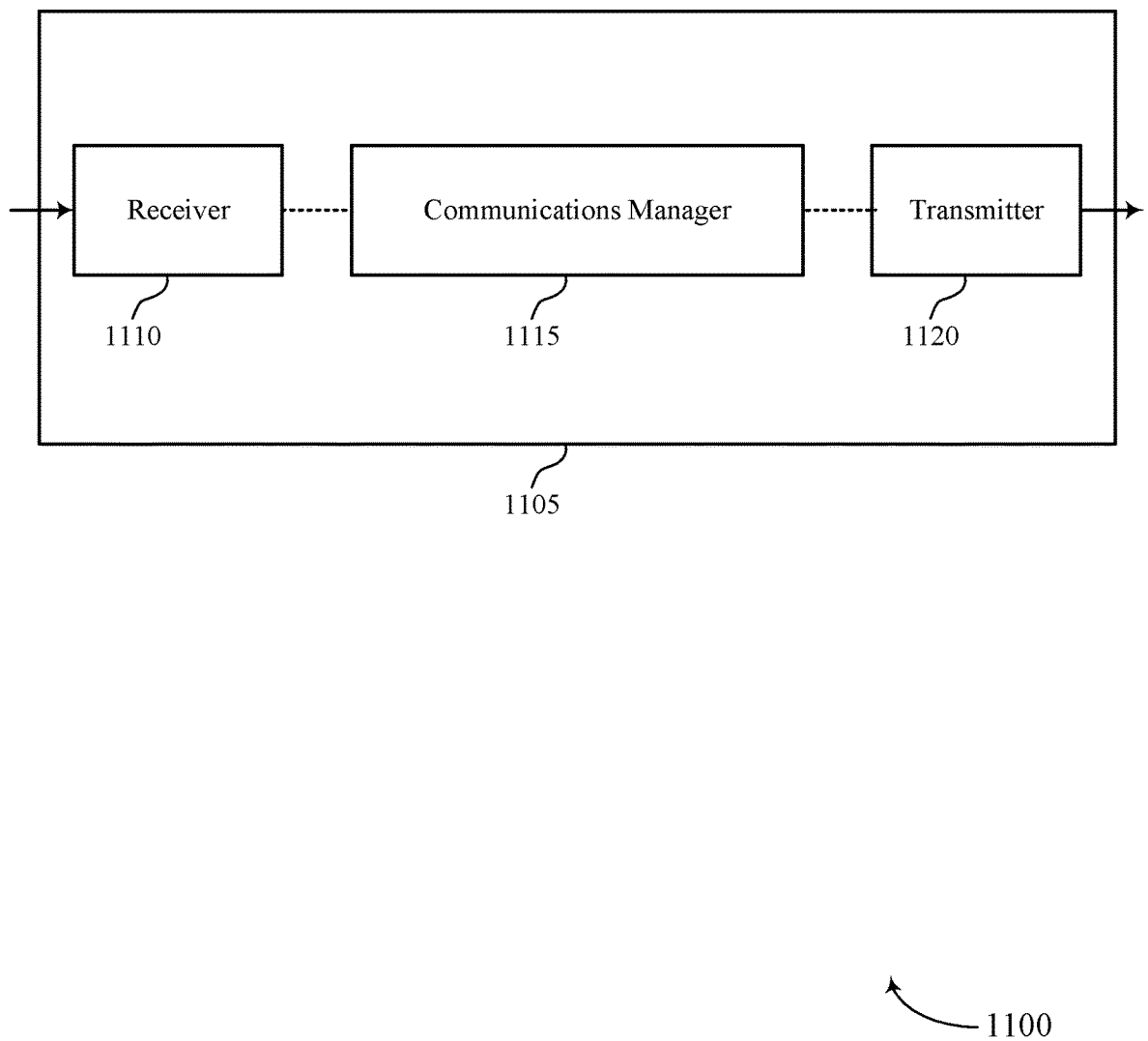
FIGS. 11 and 12 show block diagrams of devices that support feedback reporting for sidelink in accordance with aspects of the present disclosure.

FIG. 11 shows a block diagram 1100 of a device 1105 that supports feedback reporting for sidelink in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback reporting for sidelink, etc.). Information may be passed on to other components of the device 1105. The receiver 1110 may be an example of aspects of the transceiver 1420 described with reference to FIG. 14. The receiver 1110 may utilize a single antenna or a set of antennas.

In one example, the communications manager 1115 may receive, from a base station, an indication of a first set of resources within an uplink control channel that are reserved for providing feedback for downlink communications to the UE, receive, from the base station, an indication of a second set of resources within the uplink control channel that are reserved for providing feedback for sidelink communications between the UE and a second UE, and transmit, to the base station, at least one of feedback for downlink communications in the first set of resources of the uplink control channel or feedback for sidelink communications in the second set of resources of the uplink control channel.

In another example, communications manager 1115 may receive, from a base station, an indication of a set of resources within an uplink control channel that are reserved for providing feedback for communications to the UE, determine a first priority of feedback for downlink communications and a second priority of feedback for sidelink communications, and transmit, to the base station, feedback for a downlink communication in the set of resources or feedback for a sidelink communication in the set of resources based on the first and second priorities.

In another example, the communications manager 1115 may receive, from a base station, an indication of a set of resources that are reserved for an uplink transmission from the UE, determine a first priority of information related to downlink communications and a second priority of information related to sidelink communications, and transmit, to the base station in the set of resources based at least in part on the first and second priorities, information related to a downlink communication in the set of resources or information related to a sidelink communication.

In another example, the communications manager 1115 may determine that feedback for a downlink communication is scheduled in a first set of uplink control channel resources, determine that feedback for a sidelink communication is scheduled in a second set of uplink control channel resources that overlap at least partially in time with the first set of uplink control channel resources, determine that a timing condition is satisfied based on the first or second set of uplink control channel resources, and multiplex the feedback for the downlink communication and the feedback for the sidelink communication based on determining that the timing condition is satisfied. The communications manager 1115 may be an example of aspects of the communications manager 1410 described herein.

The actions performed by the communications manager 1115 as described herein may be implemented to realize one or more potential advantages. For example, the communications manager 1115 may be configured to facilitate any of the solutions described herein, which may improve feedback reporting. Further, facilitation of the first solution may permit device 1105 to transmit both types of HARQ feedback in a single control channel, which may improve downlink and sidelink communications. The first solution may also use fewer processing resources at device 1105 compared to other solutions because decisions about prioritization and multiplexing are avoided. Facilitation of the second solution may permit device 1105 to prioritize one type of HARQ feedback over the other, which may ensure that important data is communicated. The second solution may also decrease latency compared to other solutions, because the entire set of control channel resources reserved for HARQ feedback is used for a single type of HARQ feedback. And facilitation of the third solution may permit device 1105 to transmit both types of HARQ feedback in a smaller set of resources than the set reserved for both types of HARQ feedback. Thus, the third solution may increase efficiency by reducing the amount of time and frequency resources used to convey HARQ feedback.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
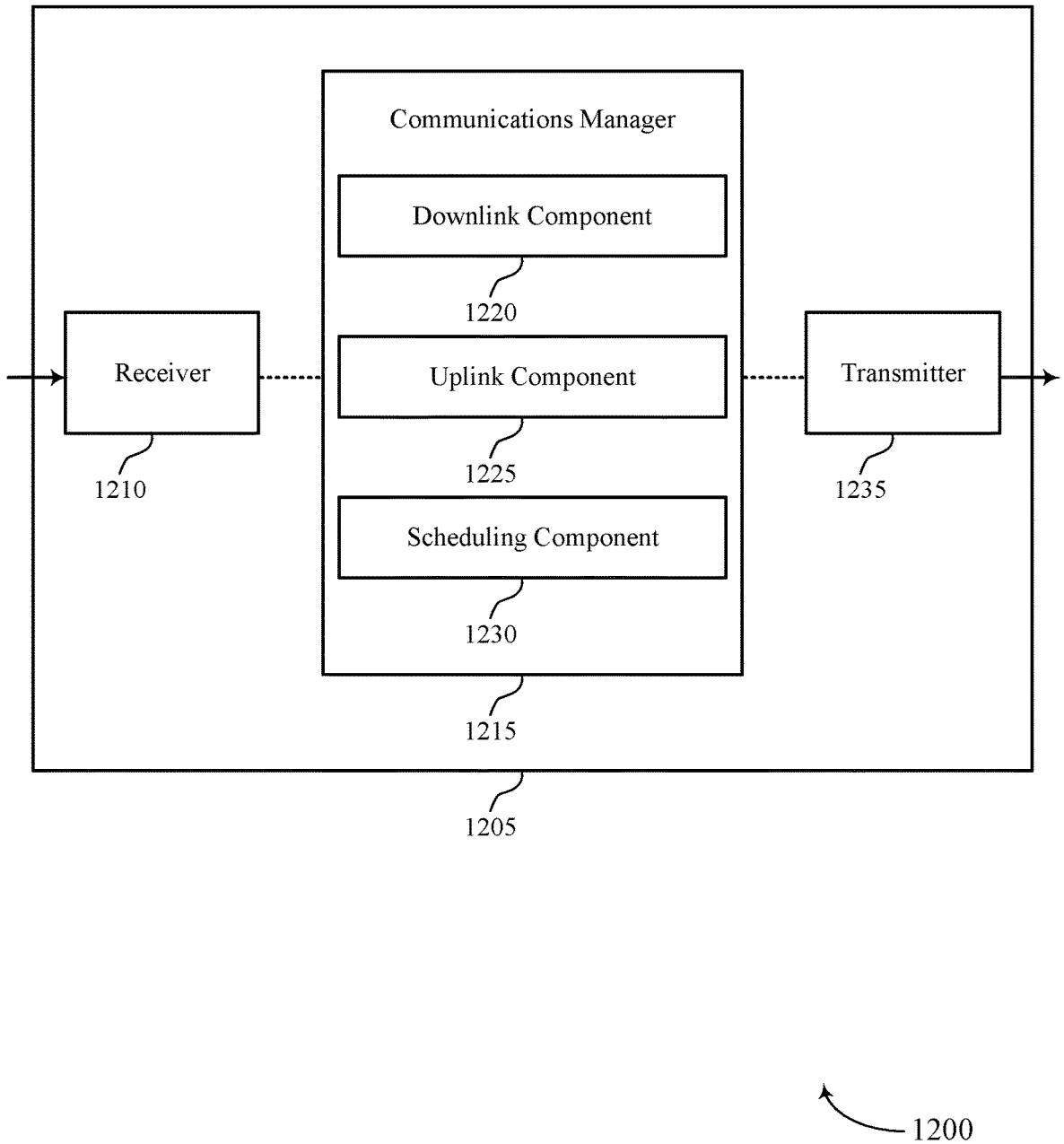

FIG. 12 shows a block diagram 1200 of a device 1205 that supports feedback reporting for sidelink in accordance with aspects of the present disclosure. The device 1205 may be an example of aspects of a device 1105, or a UE 115 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to feedback reporting for sidelink, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a downlink component 1220, an uplink component 1225, and a scheduling component 1230. The communications manager 1215 may be an example of aspects of the communications manager 1410 described herein.

In a first example the downlink component 1220 may receive, from a base station, an indication of a first set of resources within an uplink control channel that are reserved for providing feedback for downlink communications to the UE. The downlink component 1220 may also receive, from the base station, an indication of a second set of resources within the uplink control channel that are reserved for providing feedback for sidelink communications between the UE and a second UE. The uplink component 1225 may transmit, to the base station, at least one of feedback for downlink communications in the first set of resources of the uplink control channel or feedback for sidelink communications in the second set of resources of the uplink control channel.

In a second example the downlink component 1220 may receive, from a base station, an indication of a set of resources within an uplink control channel that are reserved for providing feedback for communications to the UE. The scheduling component 1230 may determine a first priority of feedback for downlink communications and a second priority of feedback for sidelink communications. And the uplink component 1225 may transmit, to the base station, feedback for a downlink communication in the set of resources or feedback for a sidelink communication in the set of resources based on the first and second priorities.

In a third example, the scheduling component 1230 may determine that feedback for a downlink communication is scheduled in a first set of uplink control channel resources, determine that feedback for a sidelink communication is scheduled in a second set of uplink control channel resources that overlap at least partially in time with the first set of uplink control channel resources, and determine that a timing condition is satisfied based on the first or second set of uplink control channel resources. The uplink component 1225 may multiplex the feedback for the downlink communication and the feedback for the sidelink communication based on determining that the timing condition is satisfied.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
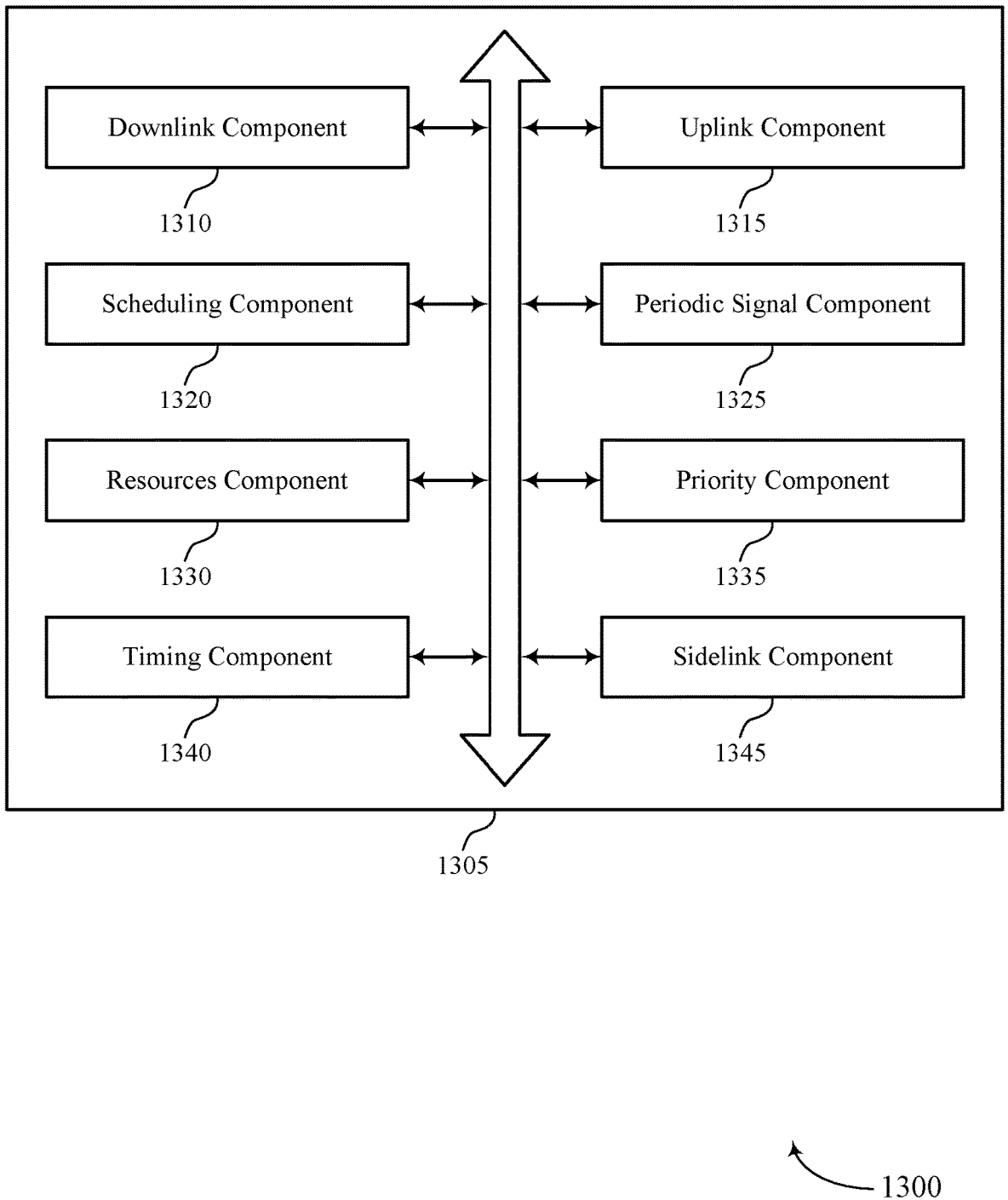
FIG. 13 shows a block diagram of a communications manager that supports feedback reporting for sidelink in accordance with aspects of the present disclosure.

FIG. 13 shows a block diagram 1300 of a communications manager 1305 that supports feedback reporting for sidelink in accordance with aspects of the present disclosure. The communications manager 1305 may be an example of aspects of a communications manager 1115, a communications manager 1215, or a communications manager 1410 described herein. The communications manager 1305 may include a downlink component 1310, an uplink component 1315, a scheduling component 1320, a periodic signal component 1325, a resources component 1330, a priority component 1335, a timing component 1340, and a sidelink component 1345. Each of these modules may communicate, directly or indirectly, with one another (e.g., via one or more buses).

In some examples, the communications manager 1305 may be configured to implement aspects of the first solution described herein. For example, the downlink component 1310 may receive, from a base station, an indication of a first set of resources within an uplink control channel that are reserved for providing feedback for downlink communications to the UE. The downlink component 1310 may also receive, from the base station, an indication of a second set of resources within the uplink control channel that are reserved for providing feedback for sidelink communications between the UE and a second UE. And the uplink component 1315 may transmit, to the base station, at least one of feedback for downlink communications in the first set of resources of the uplink control channel or feedback for sidelink communications in the second set of resources of the uplink control channel.

In some examples, the scheduling component 1320 may determine that the first and second sets of resources do not overlap in the time domain. In such cases, the uplink component 1315 may transmit the feedback for downlink communications in the first set of resources and transmit the feedback for sidelink communications in the second set of resources.

In some examples, the periodic signal component 1325 may determine that a periodic signal is scheduled for transmission in the second set of resources. In such cases, the uplink component 1315 may refrain from transmitting the periodic signal in the second set of resources. In some examples, the periodic signal component 1325 may determine that feedback for sidelink communications is scheduled for transmission in the second set of resources. In such cases, the uplink component 1315 may refrain from transmitting the periodic signal based on determining that the feedback for the sidelink communications is scheduled.

In some examples, the scheduling component 1320 may determine that the first and second sets of resources overlap in the time domain. In such cases, the uplink component 1315 may refrain from transmitting feedback for downlink communications in the first set of resources or refraining from transmitting feedback for sidelink communications in the second set of resources.

In some examples, the scheduling component 1320 may determine that feedback for downlink communications is scheduled for transmission in the first set of resources and that feedback for sidelink communications is scheduled for transmission in the second set of resources. In such cases, the scheduling component 1320 may flag the scheduling of the feedback for downlink communications or the scheduling of the feedback for sidelink communications as an error based on determining that feedback for downlink communications is scheduled for transmission in the first set of resources and that feedback for sidelink communications is scheduled for transmission in the second set of resources.

In some examples, the resources component 1330 may receive an indication that the second set of resources includes a first subset of resources and a second subset of resources, determine that the first subset of resources is associated with sidelink communications between the UE and the second UE, and determine that the second subset of resources is associated with sidelink communications between the UE and a third UE. In such cases, the uplink component 1315 may transmit feedback for sidelink communications between the UE and the second UE in the first subset of resources and transmit feedback for sidelink communications between the UE and the third UE in the second subset of resources.

In some examples, the resources component 1330 may receive an indication that the second set of resources includes a first subset of resources and a second subset of resources, determine that the first subset of resources is associated with a first cast type, and determine that the second subset of resources is associated with a second cast type. In such cases, the uplink component 1315 may transmit feedback for sidelink communications of the first cast type in the first subset of resources and transmit feedback for sidelink communications of the second cast type in the second subset of resources.

In some examples, the communications manager 1305 may be configured to implement aspects of the second solution described herein. For example, the downlink component 1310 may receive, from a base station, an indication of a set of resources within an uplink control channel that are reserved for providing feedback for communications to the UE. The scheduling component 1320 may determine a first priority of feedback for downlink communications and a second priority of feedback for sidelink communications. And the uplink component 1315 may transmit, to the base station, feedback for a downlink communication in the set of resources or feedback for a sidelink communication in the set of resources based on the first and second priorities.

In some examples, the priority component 1335 may determine that the first priority is a higher priority or a lower priority relative to the second priority. In such cases, the uplink component 1315 may transmit the feedback for the downlink communication when the first priority is a higher priority than the second priority and transmit the feedback for the sidelink communication when the first priority is a lower priority than the second priority. The uplink component 1315 may also refrain from transmitting the feedback for the sidelink communication when the first priority is a higher priority than the second priority and refrain from transmitting the feedback for the downlink communication when the first priority is a lower priority than the second priority.

In some examples, the priority component 1335 may determine that the first priority and the second priority are the same. In such cases, the uplink component 1315 may refrain from transmitting feedback for the downlink communication or feedback for the sidelink communication based on a configuration of the UE.

In some examples, the downlink component 1310 may receive a DCI message from the base station that schedules the downlink communication or sidelink communication. In such examples, the priority component 1335 may determine the first priority or the second priority based on a bit included in the DCI message, a size of the DCI message, or a format of the DCI message.

In some examples, the priority component 1335 may determine a first cast type for the downlink communication and a second cast type for the sidelink communication and determine the first priority or the second priority based on the first cast type or second cast type.

In some examples, the priority component 1335 may determine a priority of a logical channel associated with the sidelink communication and determine the second priority based on the priority of the logical channel.

In some examples, the priority component 1335 may determine a configuration of a set of sidelink resources used to convey the sidelink communication and determine the second priority based on the configuration of the set of sidelink resources.

In some examples, the priority component 1335 may identify a control region of the uplink control channel, a downlink control channel, or a sidelink control channel and determine the first priority or the second priority based on the control region.

In some examples, the priority component 1335 may identify a search space within a downlink control channel or sidelink control channel and determine the first priority or the second priority based on the search space.

In some examples, the priority component 1335 may identify a first codebook used for feedback for downlink communications and a second codebook used for feedback for sidelink communications and determine the first priority or the second priority based on the first and second codebooks.

In some examples, the communications manager 1305 may be configured to implement aspects of the third solution described herein. For example, the scheduling component 1320 may determine that feedback for a downlink communication is scheduled in a first set of uplink control channel resources, determine that feedback for a sidelink communication is scheduled in a second set of uplink control channel resources that overlap at least partially in time with the first set of uplink control channel resources, and determine that a timing condition is satisfied based on the first or second set of uplink control channel resources. Additionally, the uplink component 1315 may multiplex the feedback for the downlink communication and the feedback for the sidelink communication on determining that the timing condition is satisfied.

In some examples, the uplink component 1315 may transmit the multiplexed feedback in a portion of (or the entirety of) the first set of uplink control channel resources and/or the second set of uplink control channel resources. In some examples, the timing component 1340 may determine that a second timing condition is satisfied based on the first or second set of uplink control channel resources. In such cases, uplink component 1315 may multiplex the feedback based on determining that the second timing condition is satisfied. In some examples, the timing condition may be based on a processing time of the UE for sidelink communications. In such cases, the second timing condition may be based on a processing time of the UE for downlink communications and a preparation time of the UE for uplink communications.

In some examples, the sidelink component 1345 may receive an indication of the feedback for the sidelink communication in a sidelink control channel. In such cases, the timing component 1340 may determine a temporal gap between a last symbol of the sidelink control channel and a first symbol of the first set of uplink control channel resources or the second set of uplink control channel resources, whichever occurs earlier. In some cases, the scheduling component 1320 may determine that the timing condition is satisfied by determining that the temporal gap is greater than a threshold duration.

In some examples, the downlink component 1310 may receive, from a base station, an indication of a set of resources that are reserved for an uplink transmission from the UE. In some examples, the priority component 1335 may determine a first priority of information related to downlink communications and a second priority of information related to sidelink communications. In some examples, the uplink component 1315 may transmit, to the base station in the set of resources based at least in part on the first and second priorities, information related to a downlink communication in the set of resources or information related to a sidelink communication.

In some examples, the downlink component 1310 may receive a DCI message from the base station that schedules the downlink communication or the sidelink communication. In some examples, the priority component 1335 may determine the first priority or the second priority based at least in part on a bit included in the DCI message, a size of the DCI message, or a format of the DCI message.

In some examples, the scheduling component 1320 may determine a first cast type for the downlink communication and a second cast type for the sidelink communication. In some examples the priority component 1335 may determine the first priority or the second priority based at least in part on the first cast type or second cast type.

In some examples, the priority component 1335 may determine a priority of a logical channel associated with the sidelink communication. In some examples, the priority component 1335 may determine the second priority based at least in part on the priority of the logical channel.

In some examples, the resources component 1330 may determine a configuration of a set of sidelink resources used to convey the sidelink communication. In some examples, the priority component 1335 may determine the second priority based at least in part on the configuration of the set of sidelink resources.

In some examples, the set of resources is within an uplink control channel. In some examples, the resources component 1330 may identify a control region of the uplink control channel, a downlink control channel, or a sidelink control channel. In some examples, the priority component 1335 may determine the first priority or the second priority based at least in part on the control region.

In some examples, the resources component 1330 may identify a search space within a downlink control channel or sidelink control channel. In some examples, the priority component 1335 may determine the first priority or the second priority based at least in part on the search space.

In some examples, the scheduling component 1320 may identify a first codebook used for information related to downlink communications and a second codebook used for information related to sidelink communications. In some examples, the priority component 1335 may determine the first priority or the second priority based at least in part on the first and second codebooks.

In some examples, the priority component 1335 may determine that the first priority is a higher priority or a lower priority relative to the second priority. In some examples, the uplink component 1315 may transmit the information related to the downlink communication when the first priority is a higher priority than the second priority and transmitting the information related to the sidelink communication when the first priority is a lower priority than the second priority. In some examples, the uplink component 1315 may refrain from transmitting information related to the sidelink communication when the first priority is a higher priority than the second priority and refrain from transmitting information related to the downlink communication when the first priority is a lower priority than the second priority.

In some examples, the priority component 1335 may determine that the first priority and the second priority are the same. In some examples, the uplink component 1315 may refrain from transmitting information related to the downlink communication or information related to the sidelink communication based at least in part on a configuration of the UE.

Figure 14:
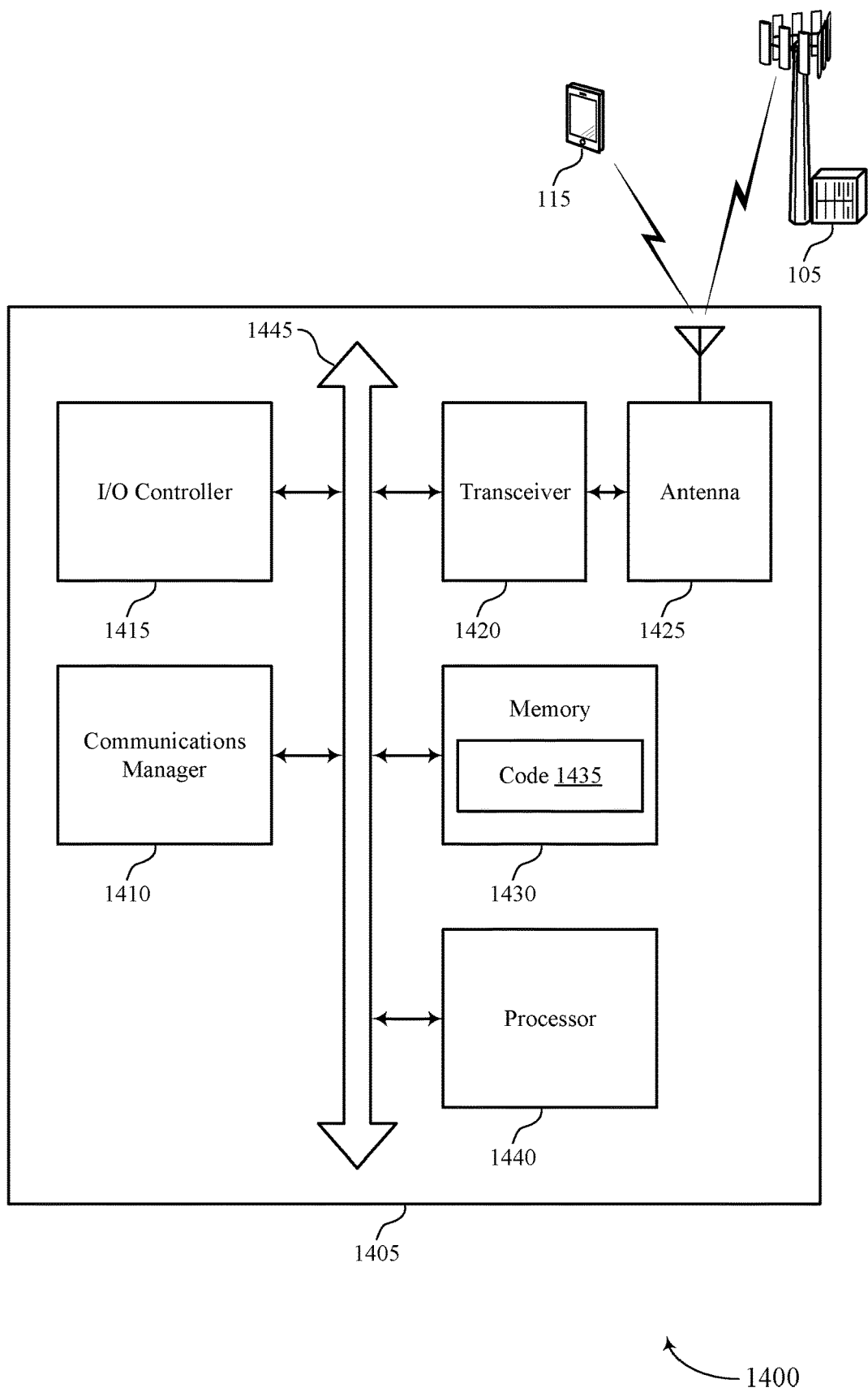
FIG. 14 shows a diagram of a system including a device that supports feedback reporting for sidelink in accordance with aspects of the present disclosure.

FIG. 14 shows a diagram of a system 1400 including a device 1405 that supports feedback reporting for sidelink in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

In a first example, the communications manager 1410 may receive, from a base station, an indication of a first set of resources within an uplink control channel that are reserved for providing feedback for downlink communications to the UE, receive, from the base station, an indication of a second set of resources within the uplink control channel that are reserved for providing feedback for sidelink communications between the UE and a second UE, and transmit, to the base station, at least one of feedback for downlink communications in the first set of resources of the uplink control channel or feedback for sidelink communications in the second set of resources of the uplink control channel.

In a second example, the communications manager 1410 may also receive, from a base station, an indication of a set of resources within an uplink control channel that are reserved for providing feedback for communications to the UE, determine a first priority of feedback for downlink communications and a second priority of feedback for sidelink communications, and transmit, to the base station, feedback for a downlink communication in the set of resources or feedback for a sidelink communication in the set of resources based on the first and second priorities.

In a third example, the communications manager 1410 may also determine that feedback for a downlink communication is scheduled in a first set of uplink control channel resources, determine that feedback for a sidelink communication is scheduled in a second set of uplink control channel resources that overlap at least partially in time with the first set of uplink control channel resources, determine that a timing condition is satisfied based on the first or second set of uplink control channel resources, and multiplex the feedback for the downlink communication and the feedback for the sidelink communication based on determining that the timing condition is satisfied.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting feedback reporting for sidelink).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
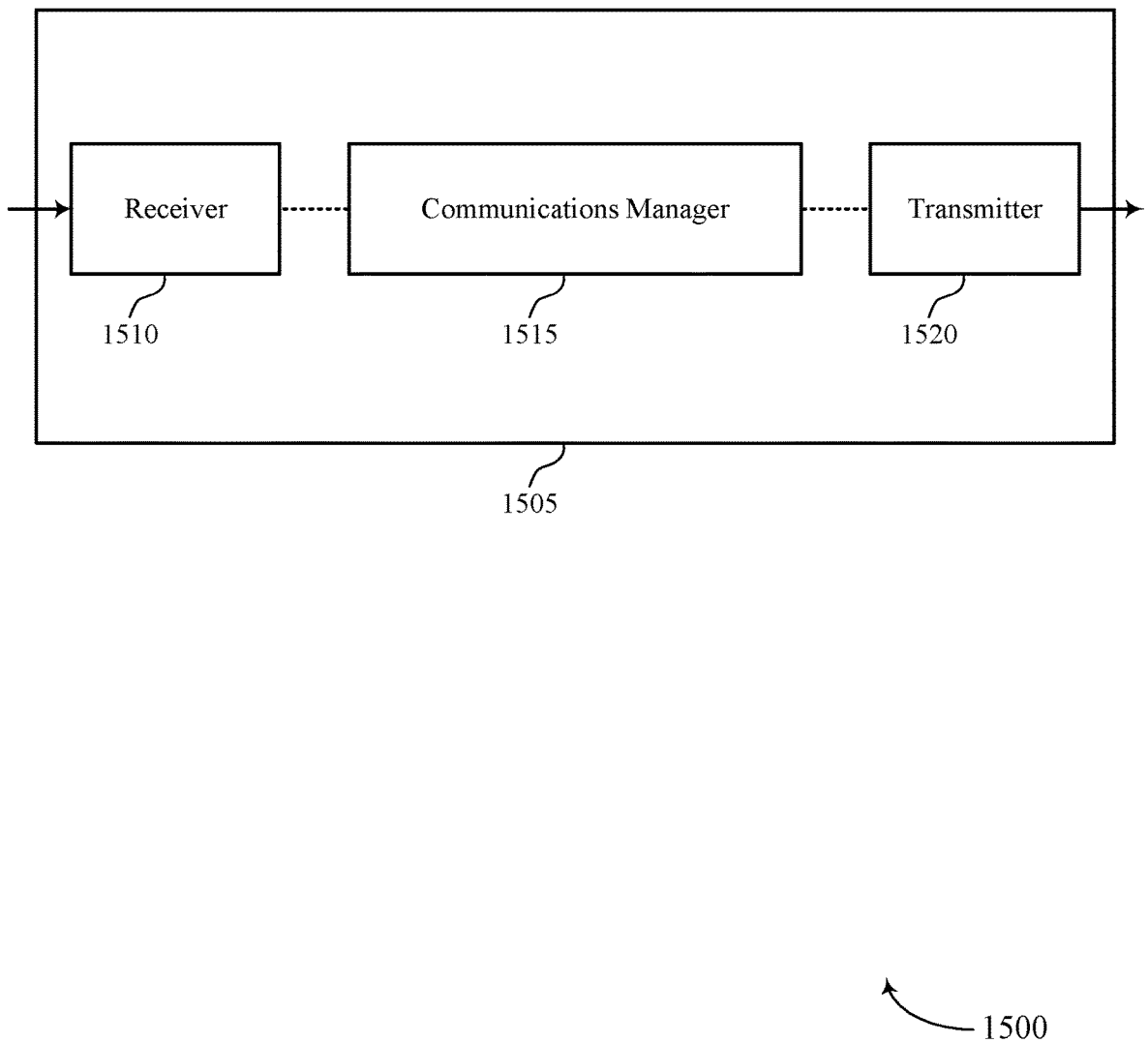
FIGS. 15 and 16 show block diagrams of devices that support feedback reporting for sidelink in accordance with aspects of the present disclosure.

FIG. 15 shows a block diagram 1500 of a device 1505 that supports feedback reporting for sidelink in accordance with aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to feedback reporting for sidelink, etc.). Information may be passed on to other components of the device 1505. The receiver 1510 may be an example of aspects of the transceiver 1820 described with reference to FIG. 18. The receiver 1510 may utilize a single antenna or a set of antennas.

In a first example, the communications manager 1515 may transmit, to a UE, an indication of a first set of resources within an uplink control channel that are reserved for providing feedback for downlink communications to the UE, transmit, to the UE, an indication of a second set of resources within the uplink control channel that are reserved for providing feedback for sidelink communications between the UE and a second UE, and receive at least one of feedback for downlink communications in the first set of resources of the uplink control channel or feedback for sidelink communications in the second set of resources of the uplink control channel.

In a second example, the communications manager 1515 may transmit, to a UE, an indication of a set of resources within an uplink control channel that are reserved for providing feedback for communications to the UE, transmit an indication of a first priority of feedback for downlink communications to the UE, transmit an indication of a second priority of feedback for sidelink communications between the UE and a second UE, and receive feedback for a downlink communication or feedback for a sidelink communication in the set of resources based on indicating the first and second priorities.

In a third example, the communications manager 1515 may schedule a UE to transmit feedback for a downlink communication in a first set of uplink control channel resources, schedule the UE to transmit feedback for a sidelink communication in a second set of uplink control channel resources, and receive multiplexed feedback for the downlink communication and the sidelink communication in the first set of uplink control channel resources, the second set of uplink control channel resources, or a combination thereof, based on a timing condition being satisfied. The communications manager 1515 may be an example of aspects of the communications manager 1810 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
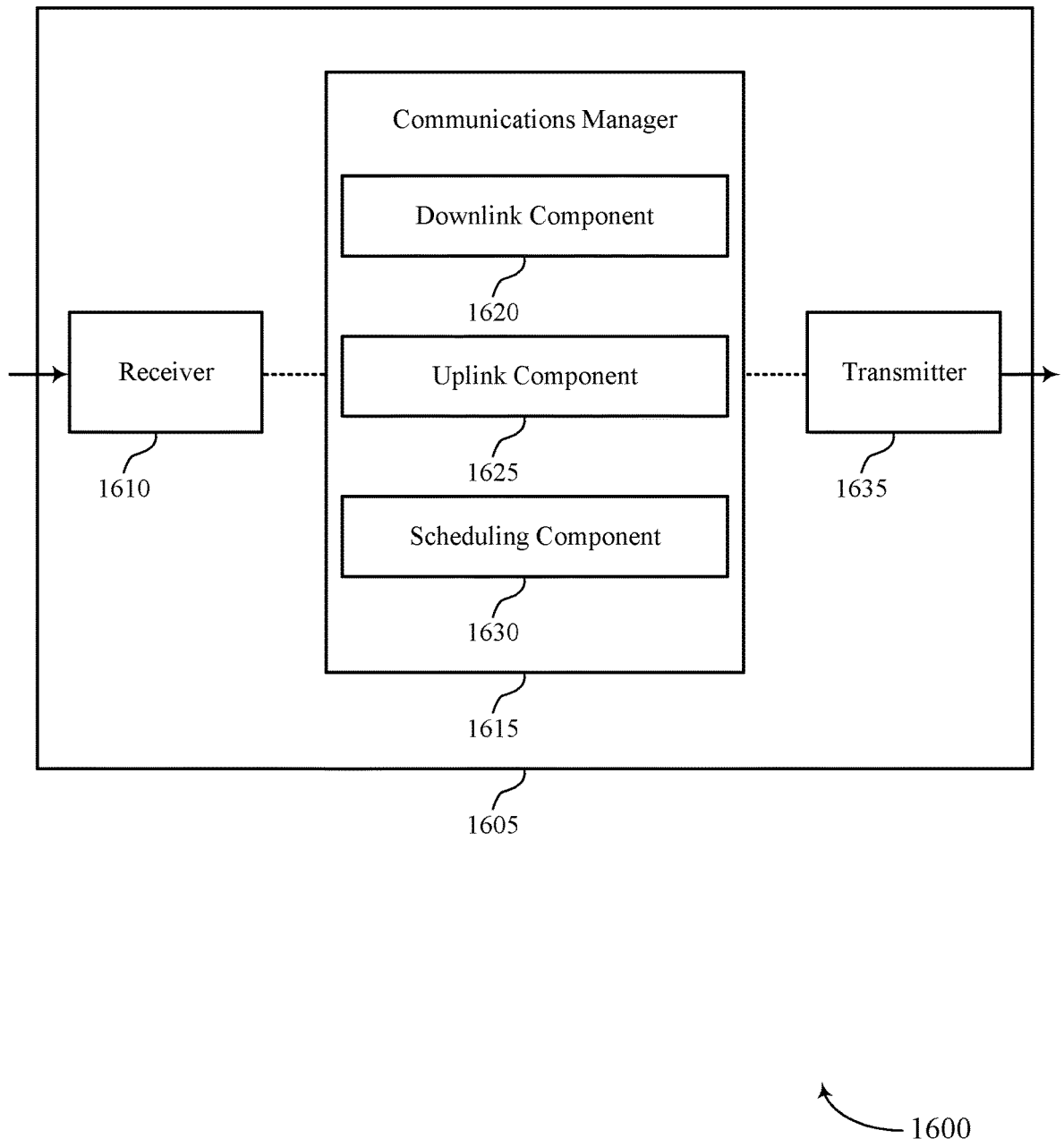

FIG. 16 shows a block diagram 1600 of a device 1605 that supports feedback reporting for sidelink in accordance with aspects of the present disclosure. The device 1605 may be an example of aspects of a device 1505, or a base station 105 as described herein. The device 1605 may include a receiver 1610, a communications manager 1615, and a transmitter 1635. The device 1605 may also include a processor. Each of these components may be in communication with one another (e.g., via one or more buses).

The receiver 1610 may receive information such as packets, user data, or control information associated with various information channels (e.g., control channels, data channels, and information related to feedback reporting for sidelink, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a downlink component 1620, an uplink component 1625, and a scheduling component 1630. The communications manager 1615 may be an example of aspects of the communications manager 1810 described herein.

In a first example, the downlink component 1620 may transmit, to a UE, an indication of a first set of resources within an uplink control channel that are reserved for providing feedback for downlink communications to the UE. The downlink component 1620 may also transmit, to the UE, an indication of a second set of resources within the uplink control channel that are reserved for providing feedback for sidelink communications between the UE and a second UE. And the uplink component 1625 may receive at least one of feedback for downlink communications in the first set of resources of the uplink control channel or feedback for sidelink communications in the second set of resources of the uplink control channel.

In a second example, the downlink component 1620 may transmit, to a UE, an indication of a set of resources within an uplink control channel that are reserved for providing feedback for communications to the UE, transmit an indication of a first priority of feedback for downlink communications to the UE, and transmit an indication of a second priority of feedback for sidelink communications between the UE and a second UE. The uplink component 1625 may receive feedback for a downlink communication or feedback for a sidelink communication in the set of resources based on indicating the first and second priorities.

In a third example, the scheduling component 1630 may schedule a UE to transmit feedback for a downlink communication in a first set of uplink control channel resources and schedule the UE to transmit feedback for a sidelink communication in a second set of uplink control channel resources. The uplink component 1625 may receive multiplexed feedback for the downlink communication and the sidelink communication in the first set of uplink control channel resources and/or the second set of uplink control channel resources based on a timing condition being satisfied.

The transmitter 1635 may transmit signals generated by other components of the device 1605. In some examples, the transmitter 1635 may be collocated with a receiver 1610 in a transceiver module. For example, the transmitter 1635 may be an example of aspects of the transceiver 1820 described with reference to FIG. 18. The transmitter 1635 may utilize a single antenna or a set of antennas.

Figure 17:
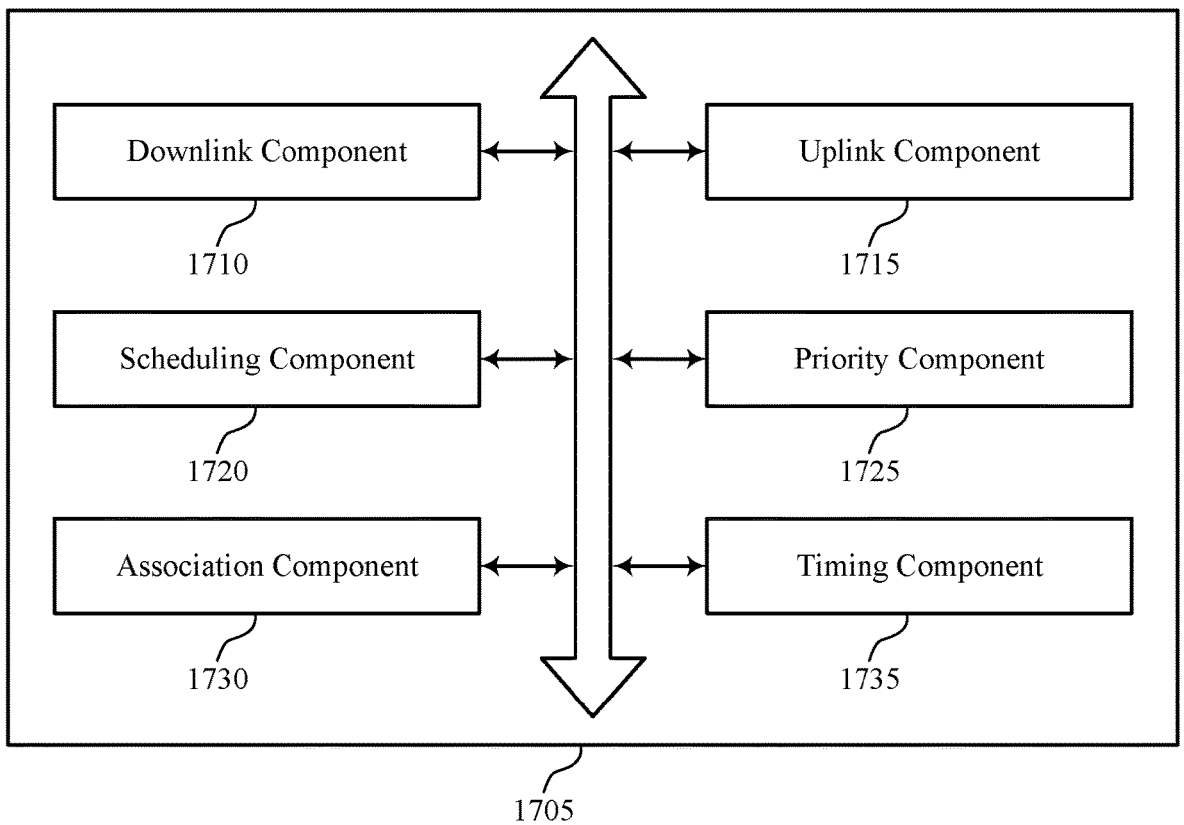
FIG. 17 shows a block diagram of a communications manager that supports feedback reporting for sidelink in accordance with aspects of the present disclosure.

FIG. 17 shows a block diagram 1700 of a communications manager 1705 that supports feedback reporting for sidelink in accordance with aspects of the present disclosure. The communications manager 1705 may be an example of aspects of a communications manager 1515, a communications manager 1615, or a communications manager 1810 described herein. The communications manager 1705 may include a downlink component 1710, an uplink component 1715, a scheduling component 1720, a priority component 1725, an association component 1730, and a timing component 1735. Each of these modules may communicate, directly or indirectly, with one another (e.g., via one or more buses).

In some examples, the communications manager 1705 may be configured to implement aspects of the first solution described herein. For example, the downlink component 1710 may transmit, to a UE, an indication of a first set of resources within an uplink control channel that are reserved for providing feedback for downlink communications to the UE. The downlink component 1710 may also transmit, to the UE, an indication of a second set of resources within the uplink control channel that are reserved for providing feedback for sidelink communications between the UE and a second UE. And the uplink component 1715 may receive at least one of feedback for downlink communications in the first set of resources of the uplink control channel or feedback for sidelink communications in the second set of resources of the uplink control channel.

In some examples, the scheduling component 1720 may determine that the first and second sets of resources do not overlap in the time domain. In such cases, the uplink component 1715 may receive the feedback for downlink communications in the first set of resources and receive the feedback for sidelink communications in the second set of resources.

In some examples, the scheduling component 1720 may determine that the first and second sets of resources overlap in the time domain. In such cases, the uplink component 1715 may receive only the feedback for downlink communications or receive only the feedback for sidelink communications.

In some examples, the downlink component 1710 may transmit an indication that the second set of resources includes a first subset of resources and a second subset of resources. In such cases, the downlink component 1710 may also transmit an indication that the first subset of resources is associated with sidelink communications between the UE and the second UE and transmit an indication that the second subset of resources is associated with sidelink communications between the UE and a third UE.

In some examples, the uplink component 1715 may receive feedback for sidelink communications between the UE and the second UE in the first subset of resources and receive feedback for sidelink communications between the UE and the third UE in the second subset of resources.

In some examples, the downlink component 1710 may transmit an indication that the first subset of resources is associated with a first cast type and transmit an indication that the second subset of resources is associated with a second cast type. In such cases, the uplink component 1715 may receive feedback for sidelink communications of the first cast type in the first subset of resources and receive feedback for sidelink communications of the second cast type in the second subset of resources.

In some examples, the communications manager 1705 may be configured to implement aspects of the second solution described herein. For example, the downlink component 1710 may transmit, to a UE, an indication of a set of resources within an uplink control channel that are reserved for providing feedback for communications to the UE. The downlink component 1710 may transmit an indication of a first priority of feedback for downlink communications to the UE. And the downlink component 1710 may transmit an indication of a second priority of feedback for sidelink communications between the UE and a second UE. The uplink component 1715 may receive feedback for a downlink communication or feedback for a sidelink communication in the set of resources based on indicating the first and second priorities.

In some examples, the priority component 1725 may determine that the first priority is a higher priority or a lower priority relative to the second priority. In such cases, the uplink component 1715 may receive the feedback for the downlink communication when the first priority is a higher priority than the second priority and receive the feedback for the sidelink communication when the first priority is a lower priority than the second priority.

In some examples, the downlink component 1710 may transmit the indication of the first or second priority by transmitting a DCI message to the UE that schedules the downlink communication or sidelink communication. In such cases, a bit included in the DCI message, a size of the DCI message, or a format of the DCI message may be indicative of the first or second priority.

In some examples, the association component 1730 may associate the first priority with a first cast type for downlink communications. In such cases, the indication of the first priority may be or include an indication of the association of the first priority with the first cast type. The association component 1730 may also associate the second priority with a second cast type for sidelink communications. In such cases, the indication of the second priority may be or include an indication of the association of the second priority with the second cast type.

In some examples, the association component 1730 may associate the second priority with a configuration of a set of sidelink resources used to convey the sidelink communication. In such cases, the indication of the second priority may be or include an indication of the configuration.

In some examples, the association component 1730 may associate the first or second priority with a control region of the uplink control channel, a downlink control channel, or a sidelink control channel. In such cases, the indication of the first or second priority may be or include an indication of the association of the first or second priority with the control region.

In some examples, the association component 1730 may associate the first priority or the second priority with a search space of a control channel. In such cases, the indication of the first or second priority may be or include an indication of the association of the first or second priority with the search space.

In some examples, the association component 1730 may associate the first priority with a first codebook. In such cases, the indication of the first priority may be or include an indication of the association of the first priority with the first codebook. The association component 1730 may also associate the second priority with a second codebook. In such cases, the indication of the second priority may be or include an indication of the association of the second priority with the second codebook.

In some examples, the communications manager 1705 may be configured to implement aspects of the third solution described herein. For example, the scheduling component 1720 may schedule a UE to transmit feedback for a downlink communication in a first set of uplink control channel resources. The scheduling component 1720 may also schedule the UE to transmit feedback for a sidelink communication in a second set of uplink control channel resources. The uplink component 1715 may receive multiplexed feedback for the downlink communication and the sidelink communication in the first set of uplink control channel resources, the second set of uplink control channel resources, or a combination thereof, based on a timing condition being satisfied.

In some examples, the scheduling component 1720 may determine that the timing condition is satisfied based on the first or second set of uplink control channel resources.

In some examples, the timing component 1735 may determine that a second timing condition is satisfied based on the first or second set of uplink control channel resources, where the multiplexed feedback is received based on determining that the second timing condition is satisfied. In such cases, the timing condition may be based on a processing time of the UE for sidelink communications. And the second timing condition may be based on a processing time of the UE for downlink communications and a preparation time of the UE for uplink communications.

In some examples, the timing component 1735 may determine a last symbol of a sidelink control channel reserved for providing feedback for sidelink communications and determine a temporal gap between the last symbol of the sidelink control channel and a first symbol of the first set of uplink control channel resources or the second set of uplink control channel resources, whichever occurs earlier. In such cases, the timing component 1735 may determine that the timing condition is satisfied based on the temporal gap being greater than a threshold duration.

Figure 18:
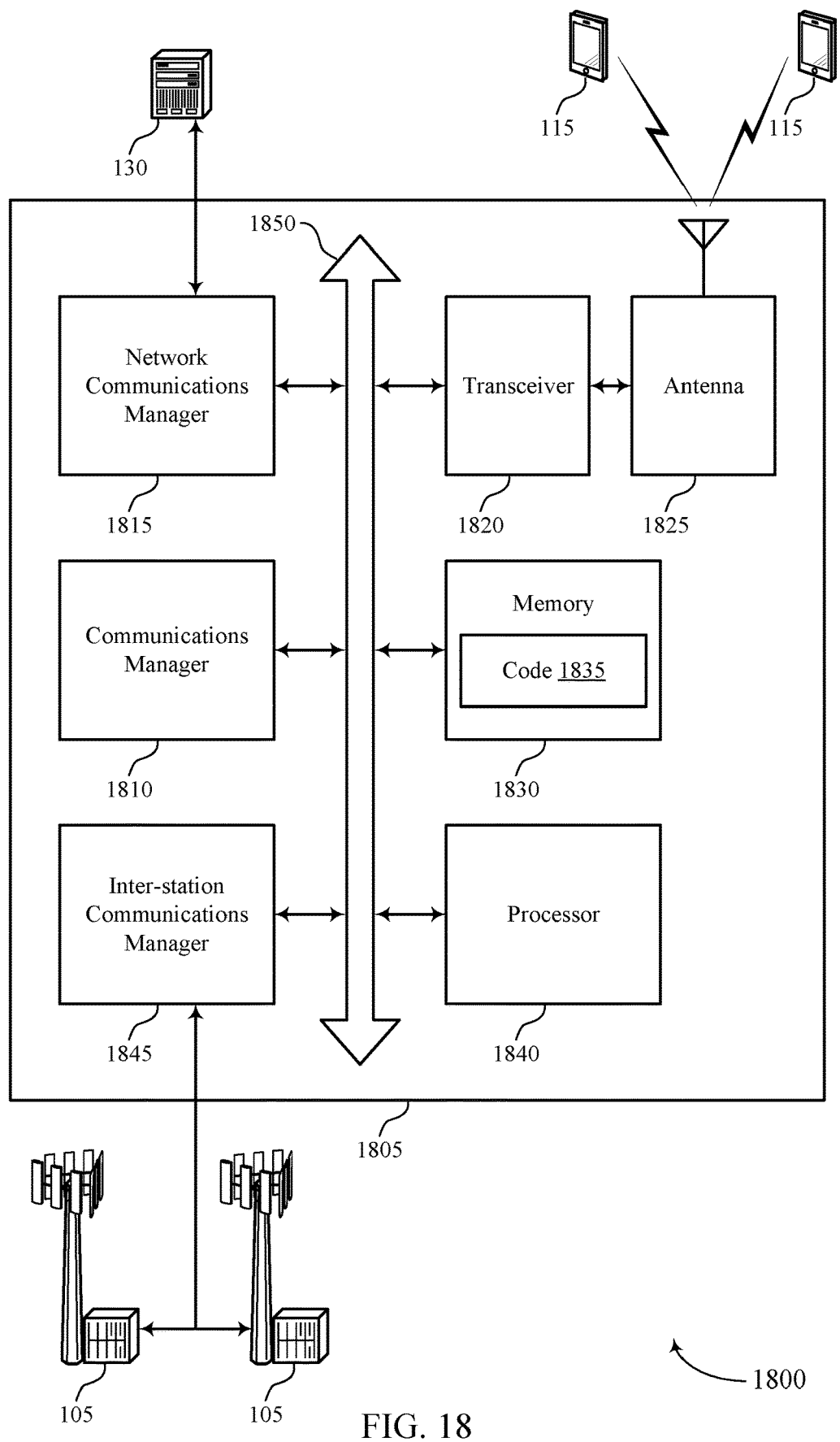
FIG. 18 shows a diagram of a system including a device that supports feedback reporting for sidelink in accordance with aspects of the present disclosure.

FIG. 18 shows a diagram of a system 1800 including a device 1805 that supports feedback reporting for sidelink in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

In one example, the communications manager 1810 may transmit, to a UE, an indication of a first set of resources within an uplink control channel that are reserved for providing feedback for downlink communications to the UE, transmit, to the UE, an indication of a second set of resources within the uplink control channel that are reserved for providing feedback for sidelink communications between the UE and a second UE, and receive at least one of feedback for downlink communications in the first set of resources of the uplink control channel or feedback for sidelink communications in the second set of resources of the uplink control channel.

In another example the communications manager 1810 may transmit, to a UE, an indication of a set of resources within an uplink control channel that are reserved for providing feedback for communications to the UE, transmit an indication of a first priority of feedback for downlink communications to the UE, transmit an indication of a second priority of feedback for sidelink communications between the UE and a second UE, and receive feedback for a downlink communication or feedback for a sidelink communication in the set of resources based on indicating the first and second priorities.

In another example the communications manager 1810 may schedule a UE to transmit feedback for a downlink communication in a first set of uplink control channel resources, schedule the UE to transmit feedback for a sidelink communication in a second set of uplink control channel resources, and receive multiplexed feedback for the downlink communication and the sidelink communication in the first set of uplink control channel resources, the second set of uplink control channel resources, or a combination thereof, based on a timing condition being satisfied.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting feedback reporting for sidelink).

The inter-station communications manager 1845 may manage communications with other base station 105 and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
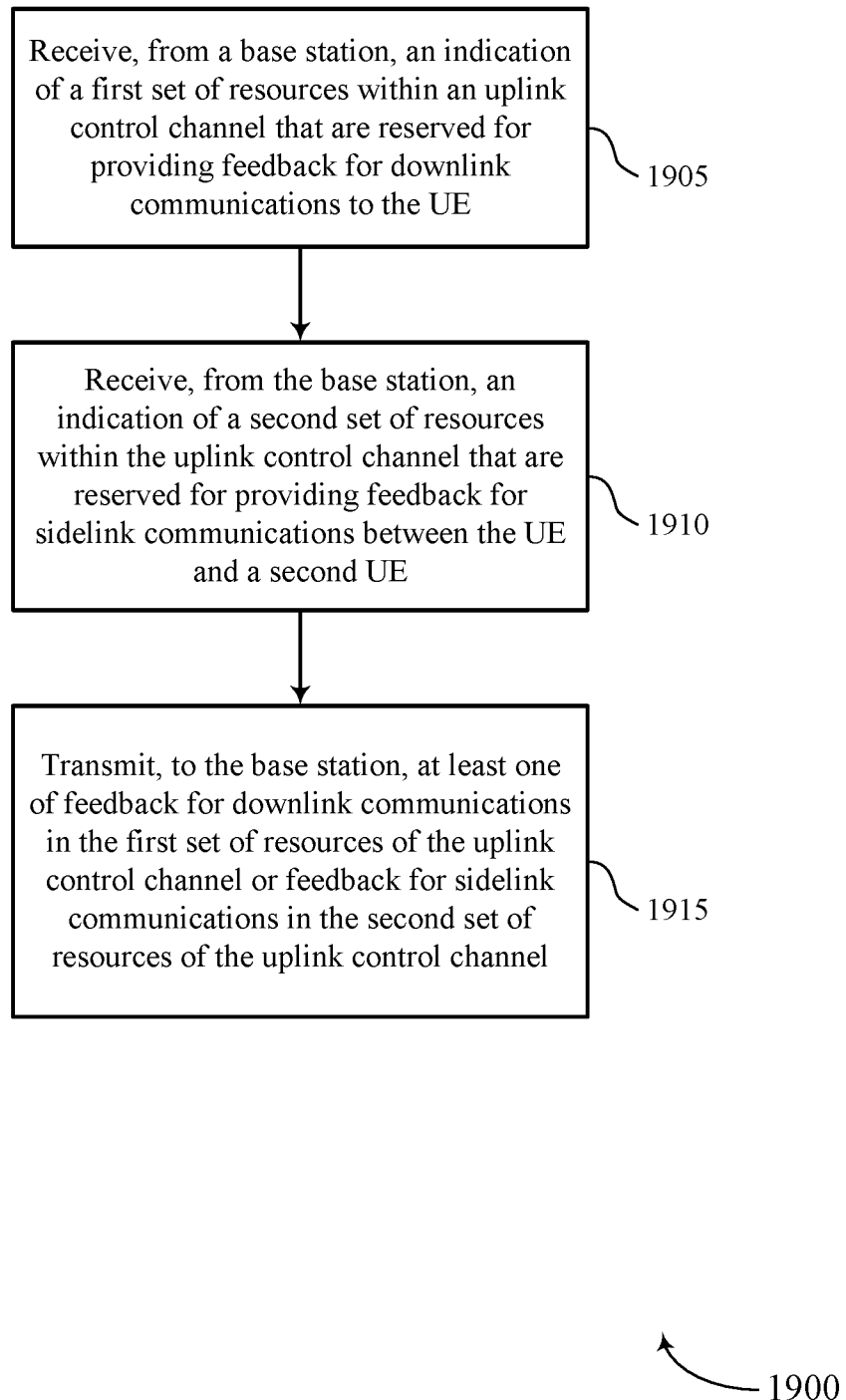
FIGS. 19 through 24 show flowcharts illustrating methods that support feedback reporting for sidelink in accordance with aspects of the present disclosure.

FIG. 19 shows a flowchart illustrating a method 1900 that supports feedback reporting for sidelink in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, an indication of a first set of resources within an uplink control channel that are reserved for providing feedback for downlink communications to the UE. The operations of 1905 may be performed according to the methods described herein. In some examples, aspects of the operations of 1905 may be performed by a downlink component as described with reference to FIGS. 11 through 14.

At 1910, the UE may receive, from the base station, an indication of a second set of resources within the uplink control channel that are reserved for providing feedback for sidelink communications between the UE and a second UE. The operations of 1910 may be performed according to the methods described herein. In some examples, aspects of the operations of 1910 may be performed by a downlink component as described with reference to FIGS. 11 through 14.

At 1915, the UE may transmit, to the base station, at least one of feedback for downlink communications in the first set of resources of the uplink control channel or feedback for sidelink communications in the second set of resources of the uplink control channel. The operations of 1915 may be performed according to the methods described herein. In some examples, aspects of the operations of 1915 may be performed by an uplink component as described with reference to FIGS. 11 through 14.

Figure 20:
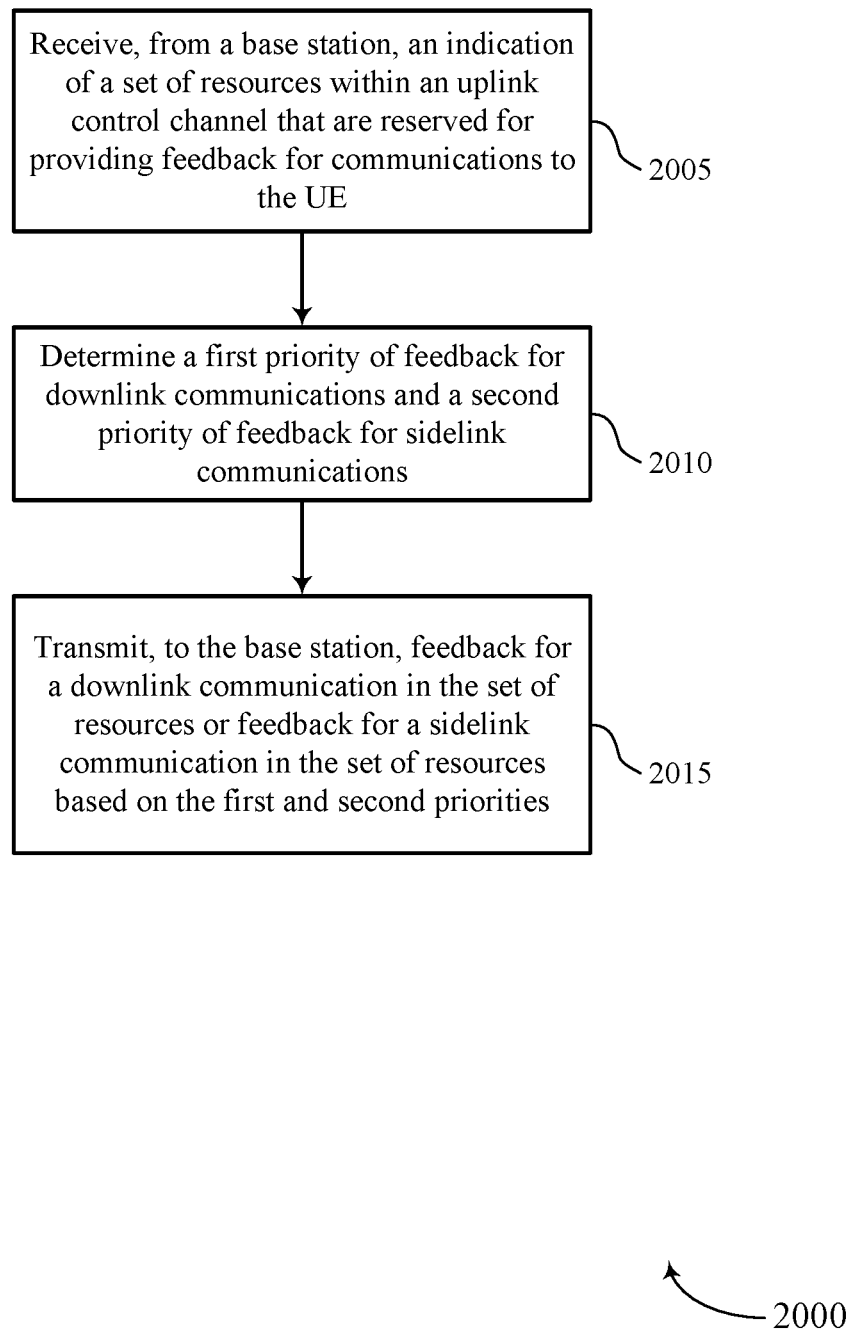

FIG. 20 shows a flowchart illustrating a method 2000 that supports feedback reporting for sidelink in accordance with aspects of the present disclosure. The operations of method 2000 may be implemented by a UE 115 or its components as described herein. For example, the operations of method 2000 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, an indication of a set of resources within an uplink control channel that are reserved for providing feedback for communications to the UE. The operations of 2005 may be performed according to the methods described herein. In some examples, aspects of the operations of 2005 may be performed by a downlink component as described with reference to FIGS. 11 through 14.

At 2010, the UE may determine a first priority of feedback for downlink communications and a second priority of feedback for sidelink communications. The operations of 2010 may be performed according to the methods described herein. In some examples, aspects of the operations of 2010 may be performed by a scheduling component as described with reference to FIGS. 11 through 14.

At 2015, the UE may transmit, to the base station, feedback for a downlink communication in the set of resources or feedback for a sidelink communication in the set of resources based on the first and second priorities. The operations of 2015 may be performed according to the methods described herein. In some examples, aspects of the operations of 2015 may be performed by an uplink component as described with reference to FIGS. 11 through 14.

Figure 21:
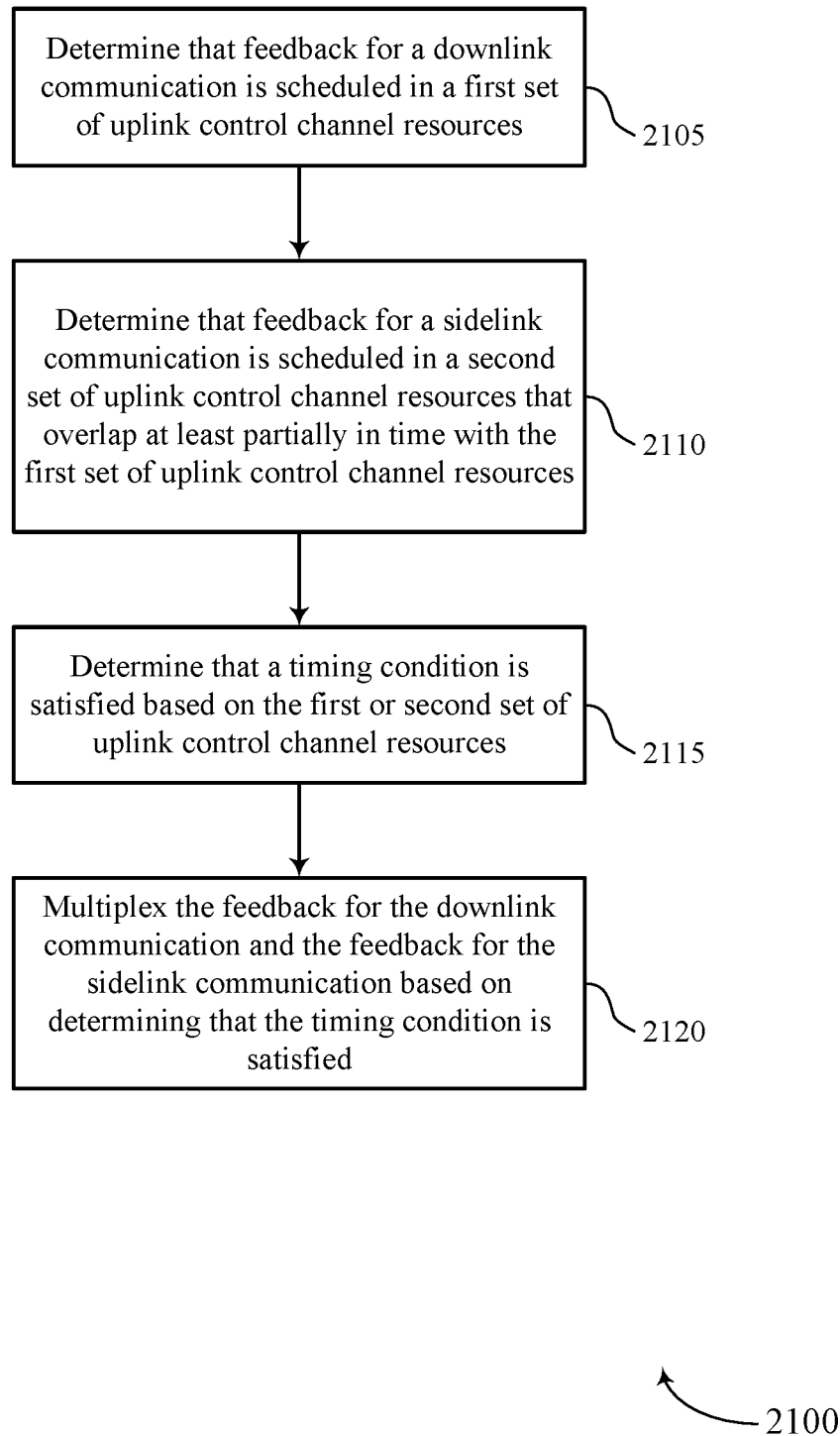

FIG. 21 shows a flowchart illustrating a method 2100 that supports feedback reporting for sidelink in accordance with aspects of the present disclosure. The operations of method 2100 may be implemented by a UE 115 or its components as described herein. For example, the operations of method 2100 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2105, the UE may determine that feedback for a downlink communication is scheduled in a first set of uplink control channel resources. The operations of 2105 may be performed according to the methods described herein. In some examples, aspects of the operations of 2105 may be performed by a scheduling component as described with reference to FIGS. 11 through 14.

At 2110, the UE may determine that feedback for a sidelink communication is scheduled in a second set of uplink control channel resources that overlap at least partially in time with the first set of uplink control channel resources. The operations of 2110 may be performed according to the methods described herein. In some examples, aspects of the operations of 2110 may be performed by a scheduling component as described with reference to FIGS. 11 through 14.

At 2115, the UE may determine that a timing condition is satisfied based on the first or second set of uplink control channel resources. The operations of 2115 may be performed according to the methods described herein. In some examples, aspects of the operations of 2115 may be performed by a scheduling component as described with reference to FIGS. 11 through 14.

At 2120, the UE may multiplex the feedback for the downlink communication and the feedback for the sidelink communication based on determining that the timing condition is satisfied. The operations of 2120 may be performed according to the methods described herein. In some examples, aspects of the operations of 2120 may be performed by an uplink component as described with reference to FIGS. 11 through 14.

Figure 22:
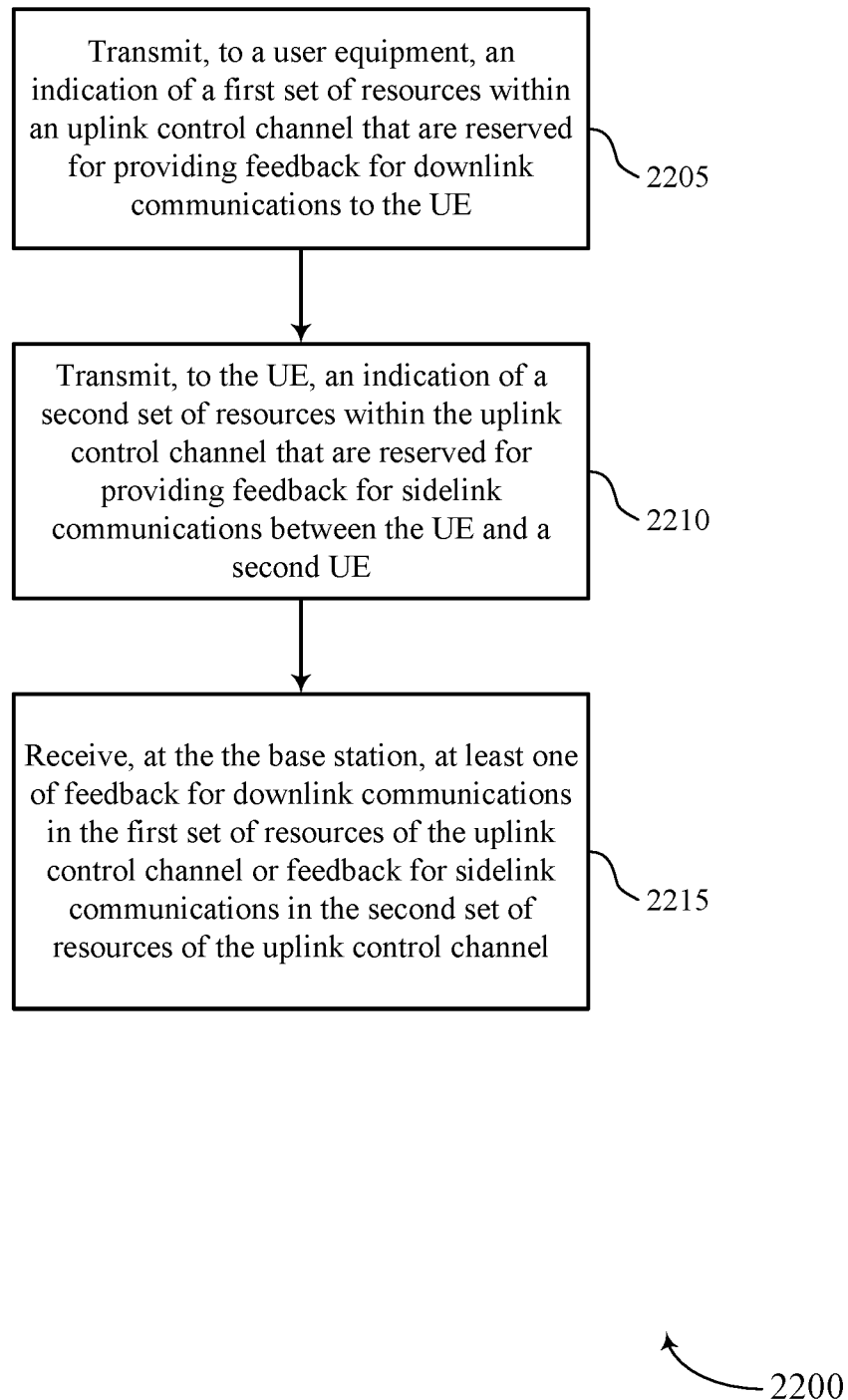

FIG. 22 shows a flowchart illustrating a method 2200 that supports feedback reporting for sidelink in accordance with aspects of the present disclosure. The operations of method 2200 may be implemented by a base station 105 or its components as described herein. For example, the operations of method 2200 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, an indication of a first set of resources within an uplink control channel that are reserved for providing feedback for downlink communications to the UE. The operations of 2205 may be performed according to the methods described herein. In some examples, aspects of the operations of 2205 may be performed by a downlink component as described with reference to FIGS. 15 through 18.

At 2210, the base station may transmit, to the UE, an indication of a second set of resources within the uplink control channel that are reserved for providing feedback for sidelink communications between the UE and a second UE. The operations of 2210 may be performed according to the methods described herein. In some examples, aspects of the operations of 2210 may be performed by a downlink component as described with reference to FIGS. 15 through 18.

At 2215, the base station may receive at least one of feedback for downlink communications in the first set of resources of the uplink control channel or feedback for sidelink communications in the second set of resources of the uplink control channel. The operations of 2215 may be performed according to the methods described herein. In some examples, aspects of the operations of 2215 may be performed by an uplink component as described with reference to FIGS. 15 through 18.

Figure 23:
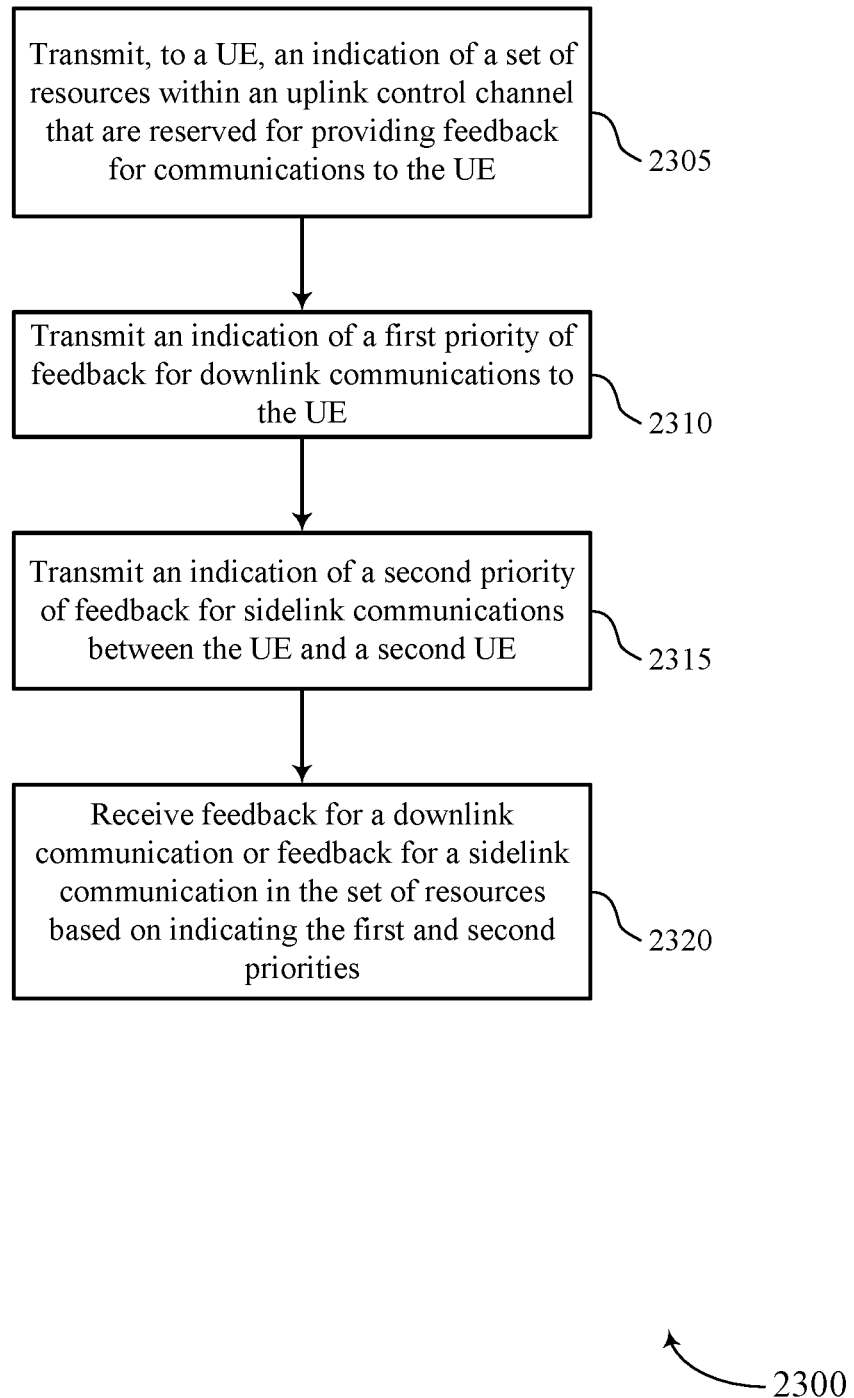

FIG. 23 shows a flowchart illustrating a method 2300 that supports feedback reporting for sidelink in accordance with aspects of the present disclosure. The operations of method 2300 may be implemented by a base station 105 or its components as described herein. For example, the operations of method 2300 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE, an indication of a set of resources within an uplink control channel that are reserved for providing feedback for communications to the UE. The operations of 2305 may be performed according to the methods described herein. In some examples, aspects of the operations of 2305 may be performed by a downlink component as described with reference to FIGS. 15 through 18.

At 2310, the base station may transmit an indication of a first priority of feedback for downlink communications to the UE. The operations of 2310 may be performed according to the methods described herein. In some examples, aspects of the operations of 2310 may be performed by a downlink component as described with reference to FIGS. 15 through 18.

At 2315, the base station may transmit an indication of a second priority of feedback for sidelink communications between the UE and a second UE. The operations of 2315 may be performed according to the methods described herein. In some examples, aspects of the operations of 2315 may be performed by a downlink component as described with reference to FIGS. 15 through 18.

At 2320, the base station may receive feedback for a downlink communication or feedback for a sidelink communication in the set of resources based on indicating the first and second priorities. The operations of 2320 may be performed according to the methods described herein. In some examples, aspects of the operations of 2320 may be performed by an uplink component as described with reference to FIGS. 15 through 18.

Figure 24:
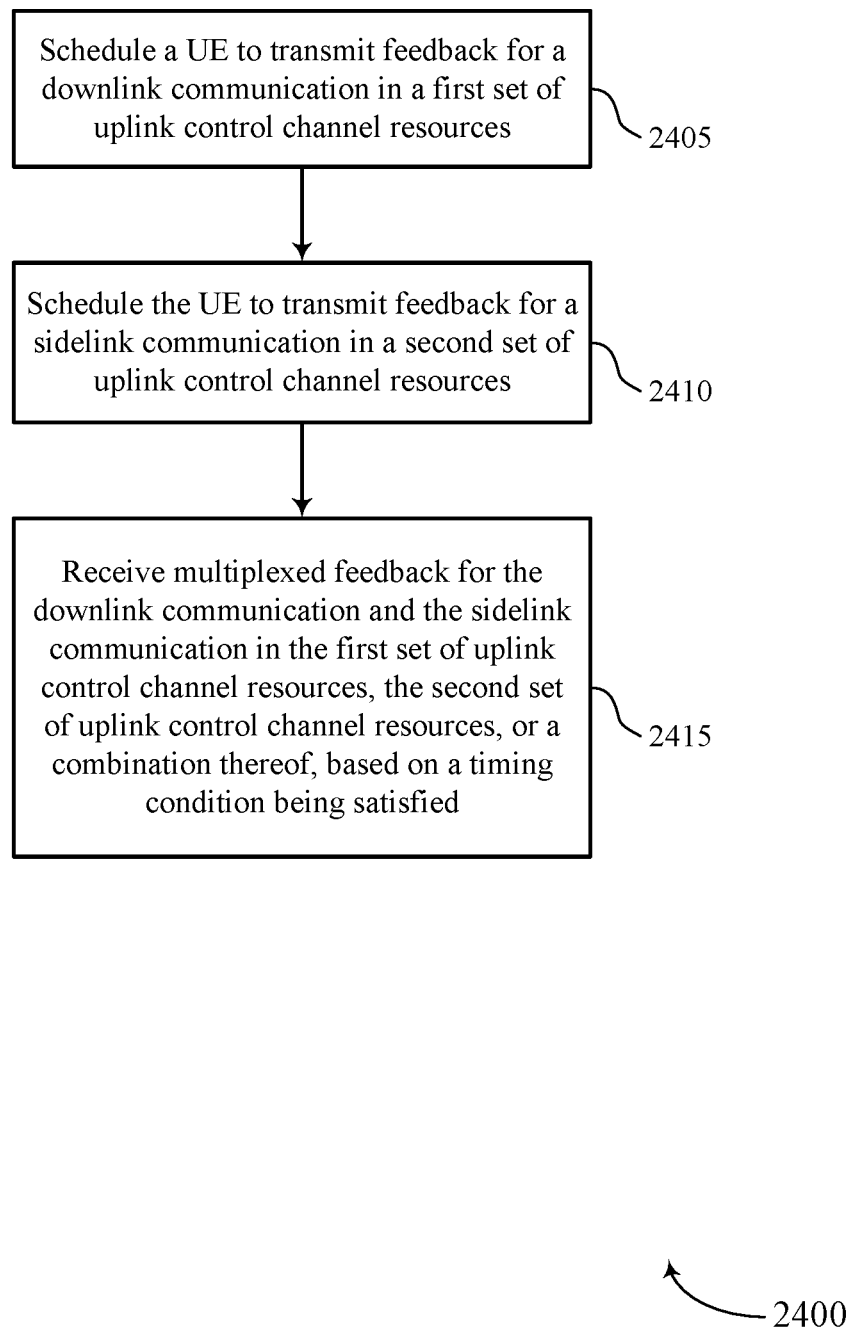

FIG. 24 shows a flowchart illustrating a method 2400 that supports feedback reporting for sidelink in accordance with aspects of the present disclosure. The operations of method 2400 may be implemented by a base station 105 or its components as described herein. For example, the operations of method 2400 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2405, the base station may schedule a UE to transmit feedback for a downlink communication in a first set of uplink control channel resources. The operations of 2405 may be performed according to the methods described herein. In some examples, aspects of the operations of 2405 may be performed by a scheduling component as described with reference to FIGS. 15 through 18.

At 2410, the base station may schedule the UE to transmit feedback for a sidelink communication in a second set of uplink control channel resources. The operations of 2410 may be performed according to the methods described herein. In some examples, aspects of the operations of 2410 may be performed by a scheduling component as described with reference to FIGS. 15 through 18.

At 2415, the base station may receive multiplexed feedback for the downlink communication and the sidelink communication in the first set of uplink control channel resources, the second set of uplink control channel resources, or a combination thereof, based on a timing condition being satisfied. The operations of 2415 may be performed according to the methods described herein. In some examples, aspects of the operations of 2415 may be performed by an uplink component as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

Aspect 1: A method for wireless communication at a UE, comprising: receiving, from a base station, an indication of a first set of resources within an uplink control channel that are reserved for providing feedback for downlink communications to the UE; receiving, from the base station, an indication of a second set of resources within the uplink control channel that are reserved for providing feedback for sidelink communications between the UE and a second UE; and transmitting, to the base station, at least one of feedback for downlink communications in the first set of resources of the uplink control channel or feedback for sidelink communications in the second set of resources of the uplink control channel.

Aspect 2: The method of aspect 1, further comprising: determining that the first and second sets of resources do not overlap in the time domain, wherein transmitting comprises transmitting the feedback for downlink communications in the first set of resources and transmitting the feedback for sidelink communications in the second set of resources.

Aspect 3: The method of any of aspect 1, further comprising: determining that a periodic signal is scheduled for transmission in the second set of resources; and refraining from transmitting the periodic signal in the second set of resources.

Aspect 4: The method of aspect 3, further comprising: determining that feedback for sidelink communications is scheduled for transmission in the second set of resources, wherein refraining from transmitting the periodic signal is based at least in part on determining that the feedback for the sidelink communications is scheduled.

Aspect 5: The method of any of aspect 1, further comprising: determining that the first and second sets of resources overlap in the time domain; and refraining from transmitting feedback for downlink communications in the first set of resources or refraining from transmitting feedback for sidelink communications in the second set of resources.

Aspect 6: The method of aspect 5, further comprising: determining that feedback for downlink communications is scheduled for transmission in the first set of resources and that feedback for sidelink communications is scheduled for transmission in the second set of resources; and flagging the scheduling of the feedback for downlink communications or the scheduling of the feedback for sidelink communications as an error based at least in part on the determining that feedback for downlink communications is scheduled for transmission in the first set of resources and that feedback for sidelink communications is scheduled for transmission in the second set of resources.

Aspect 7: The method of aspect 1, further comprising: receiving an indication that the second set of resources comprises a first subset of resources and a second subset of resources; and determining that the first subset of resources is associated with sidelink communications between the UE and the second UE; and determining that the second subset of resources is associated with sidelink communications between the UE and a third UE.

Aspect 8: The method of aspect 7, wherein transmitting comprises transmitting feedback for sidelink communications between the UE and the second UE in the first subset of resources; and transmitting feedback for sidelink communications between the UE and the third UE in the second subset of resources.

Aspect 9: The method of aspect 1, further comprising: receiving an indication that the second set of resources comprises a first subset of resources and a second subset of resources; and determining that the first subset of resources is associated with a first cast type; and determining that the second subset of resources is associated with a second cast type.

Aspect 10: The method of aspect 9, wherein transmitting comprises transmitting feedback for sidelink communications of the first cast type in the first subset of resources; and transmitting feedback for sidelink communications of the second cast type in the second subset of resources.

Aspect 11: A method for wireless communication at a UE, comprising: receiving, from a base station, an indication of a set of resources within an uplink control channel that are reserved for providing feedback for communications to the UE; determining a first priority of feedback for downlink communications and a second priority of feedback for sidelink communications; and transmitting, to the base station, feedback for a downlink communication in the set of resources or feedback for a sidelink communication in the set of resources based at least in part on the first and second priorities.

Aspect 12: The method of aspect 11, further comprising: determining that the first priority is a higher priority or a lower priority relative to the second priority; and transmitting the feedback for the downlink communication when the first priority is a higher priority than the second priority and transmitting the feedback for the sidelink communication when the first priority is a lower priority than the second priority.

Aspect 13: The method of aspect 12, further comprising: refraining from transmitting the feedback for the sidelink communication when the first priority is a higher priority than the second priority and refraining from transmitting the feedback for the downlink communication when the first priority is a lower priority than the second priority.

Aspect 14: The method of aspect 11, further comprising: determining that the first priority and the second priority are the same; and refraining from transmitting feedback for the downlink communication or feedback for the sidelink communication based at least in part on a configuration of the UE.

Aspect 15: The method of any of aspects 11 through 14, further comprising: receiving a DCI message from the base station that schedules the downlink communication or sidelink communication; and determining the first priority or the second priority based at least in part on a bit included in the DCI message, a size of the DCI message, or a format of the DCI message.

Aspect 16: The method of any of aspects 11 through 15, further comprising: determining a first cast type for the downlink communication and a second cast type for the sidelink communication; and determining the first priority or the second priority based at least in part on the first cast type or second cast type.

Aspect 17: The method of any of aspects 11 through 16, further comprising: determining a priority of a logical channel associated with the sidelink communication; and determining the second priority based at least in part on the priority of the logical channel.

Aspect 18: The method of any of aspects 11 through 17, further comprising: determining a configuration of a set of sidelink resources used to convey the sidelink communication; and determining the second priority based at least in part on the configuration of the set of sidelink resources.

Aspect 19: The method of any of aspects 11 through 18, further comprising: identifying a control region of the uplink control channel, a downlink control channel, or a sidelink control channel; and determining the first priority or the second priority based at least in part on the control region.

Aspect 20: The method of any of aspects 11 through 19, further comprising: identifying a search space within a downlink control channel or sidelink control channel; and determining the first priority or the second priority based at least in part on the search space.

Aspect 21: The method of any of aspects 11 through 20, further comprising: identifying a first codebook used for feedback for downlink communications and a second codebook used for feedback for sidelink communications; and determining the first priority or the second priority based at least in part on the first and second codebooks.

Aspect 22: A method for wireless communication at a UE, comprising: determining that feedback for a downlink communication is scheduled in a first set of uplink control channel resources; determining that feedback for a sidelink communication is scheduled in a second set of uplink control channel resources that overlap at least partially in time with the first set of uplink control channel resources; determining that a timing condition is satisfied based at least in part on the first or second set of uplink control channel resources; and multiplexing the feedback for the downlink communication and the feedback for the sidelink communication based at least in part on determining that the timing condition is satisfied.

Aspect 23: The method of aspect 22, further comprising: transmitting the multiplexed feedback in the first set of uplink control channel resources, the second set of uplink control channel resources, or a combination thereof.

Aspect 24: The method of any of aspects 22 through 23, further comprising: determining that a second timing condition is satisfied based at least in part on the first or second set of uplink control channel resources, wherein the feedback is multiplexed based at least in part on determining that the second timing condition is satisfied.

Aspect 25: The method of aspect 24, wherein the timing condition is based at least in part on a processing time of the UE for sidelink communications, and the second timing condition is based at least in part on a processing time of the UE for downlink communications and a preparation time of the UE for uplink communications.

Aspect 26: The method of any of aspects 22 through 25, further comprising: receiving an indication of the feedback for the sidelink communication in a sidelink control channel; and determining a temporal gap between a last symbol of the sidelink control channel and a first symbol of the first set of uplink control channel resources or the second set of uplink control channel resources, whichever occurs earlier.

Aspect 27: The method of aspect 26, wherein determining that the timing condition is satisfied comprises: determining that the temporal gap is greater than a threshold duration.

Aspect 28: A method for wireless communication at a base station, comprising: transmitting, to a UE, an indication of a first set of resources within an uplink control channel that are reserved for providing feedback for downlink communications to the UE; transmitting, to the UE, an indication of a second set of resources within the uplink control channel that are reserved for providing feedback for sidelink communications between the UE and a second UE; and receiving, at the base station, at least one of feedback for downlink communications in the first set of resources of the uplink control channel or feedback for sidelink communications in the second set of resources of the uplink control channel.

Aspect 29: The method of aspect 28, further comprising: determining that the first and second sets of resources do not overlap in the time domain, wherein receiving comprising receiving the feedback for downlink communications in the first set of resources and receiving the feedback for sidelink communications in the second set of resources.

Aspect 30: The method of aspect 28, further comprising: determining that the first and second sets of resources overlap in the time domain, wherein receiving comprises receiving only the feedback for downlink communications or receiving only the feedback for sidelink communications.

Aspect 31: The method of any of aspects 28 through 30, further comprising: transmitting an indication that the second set of resources comprises a first subset of resources and a second subset of resources.

Aspect 32: The method of aspect 31, further comprising: transmitting an indication that the first subset of resources is associated with sidelink communications between the UE and the second UE; and transmitting an indication that the second subset of resources is associated with sidelink communications between the UE and a third UE.

Aspect 33: The method of aspect 32, wherein receiving comprises receiving feedback for sidelink communications between the UE and the second UE in the first subset of resources; and receiving feedback for sidelink communications between the UE and the third UE in the second subset of resources.

Aspect 34: The method of any of aspects 31 through 33, further comprising: transmitting an indication that the first subset of resources is associated with a first cast type; and transmitting an indication that the second subset of resources is associated with a second cast type.

Aspect 35: The method of aspect 34, wherein receiving comprises receiving feedback for sidelink communications of the first cast type in the first subset of resources; and receiving feedback for sidelink communications of the second cast type in the second subset of resources.

Aspect 36: A method for wireless communication at a base station, comprising: transmitting, to a UE, an indication of a set of resources within an uplink control channel that are reserved for providing feedback for communications to the UE; transmitting an indication of a first priority of feedback for downlink communications to the UE; transmitting an indication of a second priority of feedback for sidelink communications between the UE and a second UE; and receiving feedback for a downlink communication or feedback for a sidelink communication in the set of resources based at least in part on indicating the first and second priorities.

Aspect 37: The method of aspect 36, further comprising: determining that the first priority is a higher priority or a lower priority relative to the second priority; and receiving the feedback for the downlink communication when the first priority is a higher priority than the second priority and receiving the feedback for the sidelink communication when the first priority is a lower priority than the second priority.

Aspect 38: The method of any of aspects 36 through 37, wherein transmitting the indication of the first priority or transmitting the indication of the second priority comprises: transmitting a DCI message to the UE that schedules the downlink communication or sidelink communication, wherein a bit included in the DCI message, a size of the DCI message, or a format of the DCI message is indicative of the first or second priority.

Aspect 39: The method of any of aspects 36 through 38, further comprising: associating the first priority with a first cast type for downlink communications, wherein the indication of the first priority comprises an indication of the association of the first priority with the first cast type; and associating the second priority with a second cast type for sidelink communications, wherein the indication of the second priority comprises an indication of the association of the second priority with the second cast type.

Aspect 40: The method of any of aspects 36 through 39, further comprising: associating the second priority with a configuration of a set of sidelink resources used to convey the sidelink communication, wherein the indication of the second priority comprises an indication of the configuration.

Aspect 41: The method of any of aspects 36 through 40, further comprising: associating the first or second priority with a control region of the uplink control channel, a downlink control channel, or a sidelink control channel, wherein the indication of the first or second priority comprises an indication of the association of the first or second priority with the control region.

Aspect 42: The method of any of aspects 36 through 41, further comprising: associating the first priority or the second priority with a search space of a control channel, wherein the indication of the first or second priority comprises an indication of the association of the first or second priority with the search space.

Aspect 43: The method of any of aspects 36 through 42, further comprising: associating the first priority with a first codebook wherein the indication of the first priority comprises an indication of the association of the first priority with the first codebook; and associating the second priority with a second codebook, wherein an indication of the second priority comprises an indication of the association of the second priority with the second codebook.

Aspect 44: A method for wireless communication at a base station, comprising: scheduling a UE to transmit feedback for a downlink communication in a first set of uplink control channel resources; scheduling the UE to transmit feedback for a sidelink communication in a second set of uplink control channel resources; and receiving multiplexed feedback for the downlink communication and the sidelink communication in the first set of uplink control channel resources, the second set of uplink control channel resources, or a combination thereof, based at least in part on a timing condition being satisfied.

Aspect 45: The method of aspect 44, further comprising: determining that the timing condition is satisfied based at least in part on the first or second set of uplink control channel resources.

Aspect 46: The method of aspect 45, wherein the determining comprises: determining a last symbol of a sidelink control channel reserved for providing feedback for sidelink communications; and determining a temporal gap between the last symbol of the sidelink control channel and a first symbol of the first set of uplink control channel resources or the second set of uplink control channel resources, whichever occurs earlier.

Aspect 47: The method of aspect 46, further comprising: determining that the timing condition is satisfied based at least in part on the temporal gap being greater than a threshold duration.

Aspect 48: The method of any of aspects 44 through 47, further comprising: determining that a second timing condition is satisfied based at least in part on the first or second set of uplink control channel resources, wherein the multiplexed feedback is received based at least in part on determining that the second timing condition is satisfied.

Aspect 49: The method of aspect 48, wherein the timing condition is based at least in part on a processing time of the UE for sidelink communications, and the second timing condition is based at least in part on a processing time of the UE for downlink communications and a preparation time of the UE for uplink communications.

Aspect 50: A method for wireless communication at a UE, comprising: receiving, from a base station, an indication of a set of resources that are reserved for an uplink transmission from the UE; determining a first priority of information related to downlink communications and a second priority of information related to sidelink communications; and transmitting, to the base station in the set of resources based at least in part on the first and second priorities, information related to a downlink communication in the set of resources or information related to a sidelink communication.

Aspect 51: The method of aspect 50, further comprising: receiving a DCI message from the base station that schedules the downlink communication or the sidelink communication; and determining the first priority or the second priority based at least in part on a bit included in the DCI message, a size of the DCI message, or a format of the DCI message.

Aspect 52: The method of any of aspects 50 through 51, further comprising: determining a first cast type for the downlink communication and a second cast type for the sidelink communication; and determining the first priority or the second priority based at least in part on the first cast type or second cast type.

Aspect 53: The method of any of aspects 50 through 52, further comprising: determining a priority of a logical channel associated with the sidelink communication; and determining the second priority based at least in part on the priority of the logical channel.

Aspect 54: The method of any of aspects 50 through 53, further comprising: determining a configuration of a set of sidelink resources used to convey the sidelink communication; and determining the second priority based at least in part on the configuration of the set of sidelink resources.

Aspect 55: The method of any of aspects 50 through 54, wherein the set of resources is within an uplink control channel, the method further comprising: identifying a control region of the uplink control channel, a downlink control channel, or a sidelink control channel; and determining the first priority or the second priority based at least in part on the control region.

Aspect 56: The method of any of aspects 50 through 55, further comprising: identifying a search space within a downlink control channel or sidelink control channel; and determining the first priority or the second priority based at least in part on the search space.

Aspect 57: The method of any of aspects 50 through 56, further comprising: identifying a first codebook used for information related to downlink communications and a second codebook used for information related to sidelink communications; and determining the first priority or the second priority based at least in part on the first and second codebooks.

Aspect 58: The method of any of aspects 50 through 57, further comprising: determining that the first priority is a higher priority or a lower priority relative to the second priority; and transmitting the information related to the downlink communication when the first priority is a higher priority than the second priority and transmitting the information related to the sidelink communication when the first priority is a lower priority than the second priority.

Aspect 59: The method of aspect 58, further comprising: refraining from transmitting information related to the sidelink communication when the first priority is a higher priority than the second priority and refraining from transmitting information related to the downlink communication when the first priority is a lower priority than the second priority.

Aspect 60: The method of any of aspects 50 through 57, further comprising: determining that the first priority and the second priority are the same; and refraining from transmitting information related to the downlink communication or information related to the sidelink communication based at least in part on a configuration of the UE.

Aspect 61: An apparatus for wireless communication at a UE, comprising a processor; memory coupled with the processor; and instructions stored in the memory and executable by the processor to cause the apparatus to perform a method of any of aspects 1 through 10.

Aspect 62: An apparatus for wireless communication at a UE, comprising at least one means for performing a method of any of aspects 1 through 10.

Aspect 63: A non-transitory computer-readable medium storing code for wireless communication at a UE, the code comprising instructions executable by a processor to perform a method of any of aspects 1 through 10.

Aspect 64: An apparatus for wireless communication at a UE, comprising a processor; memory coupled with the processor; and instructions stored in the memory and executable by the processor to cause the apparatus to perform a method of any of aspects 11 through 21.

Aspect 65: An apparatus for wireless communication at a UE, comprising at least one means for performing a method of any of aspects 11 through 21.

Aspect 66: A non-transitory computer-readable medium storing code for wireless communication at a UE, the code comprising instructions executable by a processor to perform a method of any of aspects 11 through 21.

Aspect 67: An apparatus for wireless communication at a UE, comprising a processor; memory coupled with the processor; and instructions stored in the memory and executable by the processor to cause the apparatus to perform a method of any of aspects 22 through 27.

Aspect 68: An apparatus for wireless communication at a UE, comprising at least one means for performing a method of any of aspects 22 through 27.

Aspect 69: A non-transitory computer-readable medium storing code for wireless communication at a UE, the code comprising instructions executable by a processor to perform a method of any of aspects 22 through 27.

Aspect 70: An apparatus for wireless communication at a base station, comprising a processor; memory coupled with the processor; and instructions stored in the memory and executable by the processor to cause the apparatus to perform a method of any of aspects 28 through 35.

Aspect 71: An apparatus for wireless communication at a base station, comprising at least one means for performing a method of any of aspects 28 through 35.

Aspect 72: A non-transitory computer-readable medium storing code for wireless communication at a base station, the code comprising instructions executable by a processor to perform a method of any of aspects 28 through 35.

Aspect 73: An apparatus for wireless communication at a base station, comprising a processor; memory coupled with the processor; and instructions stored in the memory and executable by the processor to cause the apparatus to perform a method of any of aspects 36 through 43.

Aspect 74: An apparatus for wireless communication at a base station, comprising at least one means for performing a method of any of aspects 36 through 43.

Aspect 75: A non-transitory computer-readable medium storing code for wireless communication at a base station, the code comprising instructions executable by a processor to perform a method of any of aspects 36 through 43.

Aspect 76: An apparatus for wireless communication at a base station, comprising a processor; memory coupled with the processor; and instructions stored in the memory and executable by the processor to cause the apparatus to perform a method of any of aspects 44 through 49.

Aspect 77: An apparatus for wireless communication at a base station, comprising at least one means for performing a method of any of aspects 44 through 49.

Aspect 78: A non-transitory computer-readable medium storing code for wireless communication at a base station, the code comprising instructions executable by a processor to perform a method of any of aspects 44 through 49.

Aspect 79: An apparatus for wireless communication at a UE, comprising a processor; memory coupled with the processor; and instructions stored in the memory and executable by the processor to cause the apparatus to perform a method of any of aspects 50 through 60.

Aspect 80: An apparatus for wireless communication at a UE, comprising at least one means for performing a method of any of aspects 50 through 60.

Aspect 81: A non-transitory computer-readable medium storing code for wireless communication at a UE, the code comprising instructions executable by a processor to perform a method of any of aspects 50 through 60.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving, from a network entity, an indication of a set of resources within an uplink control channel that are reserved for providing feedback for communications to the UE;
determining a first priority of feedback for a downlink communication and a second priority of feedback for a sidelink communication from a second UE, wherein the first priority is determined based at least in part on a priority indicated by a first downlink control information message that scheduled the downlink communication and the second priority is determined based at least in part on a priority indicated by a second downlink control information message, received from the network entity, that scheduled the sidelink communication; and
transmitting, to the network entity, feedback for the downlink communication in the set of resources or feedback for the sidelink communication in the set of resources based at least in part on the first and second priorities.

2. The method of claim 1, further comprising:
receiving the first downlink control information message from the network entity, wherein the priority is indicated by a bit included in the first downlink control information message, by a size of the first downlink control information message, or by a format of the first downlink control information message.

3. The method of claim 1, further comprising:
determining a first cast type for the downlink communication and a second cast type for the sidelink communication; and
determining the first priority or the second priority based at least in part on the first cast type or second cast type.

4. The method of claim 1, further comprising:
determining a priority of a logical channel associated with the sidelink communication; and
determining the second priority based at least in part on the priority of the logical channel.

5. The method of claim 1, further comprising:
determining a configuration of a set of sidelink resources used to convey the sidelink communication; and
determining the second priority based at least in part on the configuration of the set of sidelink resources.

6. The method of claim 1, further comprising:
identifying a control region of the uplink control channel, a downlink control channel, or a sidelink control channel; and
determining the first priority or the second priority based at least in part on the control region.

7. The method of claim 1, further comprising:
identifying a search space within a downlink control channel or sidelink control channel; and
determining the first priority or the second priority based at least in part on the search space.

8. The method of claim 1, further comprising:
identifying a first codebook used for feedback for downlink communications and a second codebook used for feedback for sidelink communications; and
determining the first priority or the second priority based at least in part on the first and second codebooks.

9. The method of claim 1, further comprising:
determining that the first priority is a higher priority or a lower priority relative to the second priority; and
transmitting the feedback for the downlink communication when the first priority is a higher priority than the second priority and transmitting the feedback for the sidelink communication when the first priority is a lower priority than the second priority.

10. The method of claim 9, further comprising:
refraining from transmitting the feedback for the sidelink communication when the first priority is a higher priority than the second priority and refraining from transmitting the feedback for the downlink communication when the first priority is a lower priority than the second priority.

11. The method of claim 1, further comprising:
determining that the first priority and the second priority are the same; and
refraining from transmitting feedback for the downlink communication or feedback for the sidelink communication based at least in part on a configuration of the UE.

12. A method for wireless communication at a user equipment (UE), comprising:
receiving, from a network entity, an indication of a set of resources that are reserved for an uplink transmission from the UE;
determining a first priority of information related to a downlink communication based at least in part on a priority of the downlink communication indicated by a first downlink control information message that scheduled the downlink communication, and determining a second priority of information related to a sidelink communication from a second UE based at least in part on a priority for the sidelink communication indicated by a second downlink control information message, received from the network entity, that scheduled the sidelink communication; and
transmitting, to the network entity in the set of resources based at least in part on the first and second priorities, the information related to the downlink communication in the set of resources or the information related to the sidelink communication.

13. The method of claim 12, further comprising:
receiving the first downlink control information message from the network entity, wherein the priority of the downlink communication is indicated by a bit included in the first downlink control information message, by a size of the first downlink control information message, or by a format of the first downlink control information message.

14. The method of claim 12, further comprising:
determining a first cast type for the downlink communication and a second cast type for the sidelink communication; and
determining the first priority or the second priority based at least in part on the first cast type or second cast type.

15. The method of claim 12, further comprising:
determining a priority of a logical channel associated with the sidelink communication; and
determining the second priority based at least in part on the priority of the logical channel.

16. The method of claim 12, further comprising:
determining a configuration of a set of sidelink resources used to convey the sidelink communication; and
determining the second priority based at least in part on the configuration of the set of sidelink resources.

17. The method of claim 12, wherein the set of resources is within an uplink control channel, the method further comprising:
identifying a control region of the uplink control channel, a downlink control channel, or a sidelink control channel; and
determining the first priority or the second priority based at least in part on the control region.

18. The method of claim 12, further comprising:
identifying a search space within a downlink control channel or sidelink control channel; and
determining the first priority or the second priority based at least in part on the search space.

19. The method of claim 12, further comprising:
identifying a first codebook used for information related to downlink communications and a second codebook used for information related to sidelink communications; and
determining the first priority or the second priority based at least in part on the first and second codebooks.

20. The method of claim 12, further comprising:
determining that the first priority is a higher priority or a lower priority relative to the second priority; and
transmitting the information related to the downlink communication when the first priority is a higher priority than the second priority and transmitting the information related to the sidelink communication when the first priority is a lower priority than the second priority.

21. The method of claim 20, further comprising:
refraining from transmitting information related to the sidelink communication when the first priority is a higher priority than the second priority and refraining from transmitting information related to the downlink communication when the first priority is a lower priority than the second priority.

22. The method of claim 12, further comprising:
determining that the first priority and the second priority are the same; and
refraining from transmitting information related to the downlink communication or information related to the sidelink communication based at least in part on a configuration of the UE.

23. An apparatus for wireless communication at a user equipment (UE), comprising:
a processor, memory coupled with the processor; and
instructions stored in the memory and executable by the processor to cause the apparatus to:
receive, from a network entity, an indication of a set of resources within an uplink control channel that are reserved for providing feedback for communications to the UE;
determine a first priority of feedback for a downlink communication and a second priority of feedback for a sidelink communication from a second UE, wherein the first priority is determined based at least in part on a priority indicated by a first downlink control information message that scheduled the downlink communication and the second priority is determined based at least in part on a priority indicated by a second downlink control information message, received from the network entity, that scheduled the sidelink communication; and
transmit, to the network entity, feedback for the downlink communication in the set of resources or feedback for the sidelink communication in the set of resources based at least in part on the first and second priorities.

24. The apparatus of claim 23, wherein the instructions are further executable by the processor to cause the apparatus to:
receive the first downlink control information message from the network entity, wherein the priority is indicated by a bit included in the first downlink control information message, by a size of the first downlink control information message, or by a format of the first downlink control information message.

25. The apparatus of claim 23, wherein the instructions are further executable by the processor to cause the apparatus to:
determine a first cast type for the downlink communication and a second cast type for the sidelink communication; and
determine the first priority or the second priority based at least in part on the first cast type or second cast type.

26. The apparatus of claim 23, wherein the instructions are further executable by the processor to cause the apparatus to:
determine a priority of a logical channel associated with the sidelink communication; and
determine the second priority based at least in part on the priority of the logical channel.

27. An apparatus for wireless communication at a user equipment (UE), comprising:
a processor,
memory coupled with the processor; and
instructions stored in the memory and executable by the processor to cause the apparatus to:
receive, from a network entity, an indication of a set of resources that are reserved for an uplink transmission from the UE;
determine a first priority of information related to a downlink communication based at least in part on a priority of the downlink communication indicated by a first downlink control information message that scheduled the downlink communication, and determining a second priority of information related to a sidelink communication from a second UE based at least in part on a priority for the sidelink communication indicated by a second downlink control information message, received from the network entity, that scheduled the sidelink communication; and
transmit, to the network entity in the set of resources based at least in part on the first and second priorities, the information related to the downlink communication in the set of resources or the information related to the sidelink communication.

28. The apparatus of claim 27, wherein the instructions are further executable by the processor to cause the apparatus to:
receive the first downlink control information message from the network entity wherein the priority of the downlink communication is indicated by a bit included in the first downlink control information message, by a size of the first downlink control information message, or by a format of the first downlink control information message.

29. The apparatus of claim 27, wherein the instructions are further executable by the processor to cause the apparatus to:
determine a first cast type for the downlink communication and a second cast type for the sidelink communication; and
determine the first priority or the second priority based at least in part on the first cast type or second cast type.

30. The apparatus of claim 27, wherein the instructions are further executable by the processor to cause the apparatus to:
determine a priority of a logical channel associated with the sidelink communication; and
determine the second priority based at least in part on the priority of the logical channel.

* * * * *